(12) United States Patent
Sasaki et al.

(10) Patent No.: US 7,375,925 B2
(45) Date of Patent: May 20, 2008

(54) MAGNETIC HEAD FOR PERPENDICULAR MAGNETIC RECORDING AND METHOD OF MANUFACTURING SAME

(75) Inventors: Yoshitaka Sasaki, Milpitas, CA (US); Hiroyuki Itoh, Milpitas, CA (US); Hironori Araki, Milpitas, CA (US); Shigeki Tanemura, Milpitas, CA (US); Kazuo Ishizaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 540 days.

(21) Appl. No.: 11/138,968

(22) Filed: May 27, 2005

(65) Prior Publication Data
US 2006/0268456 A1    Nov. 30, 2006

(51) Int. Cl.
*G11B 5/147* (2006.01)

(52) U.S. Cl. ........................................ 360/126

(58) Field of Classification Search ................. 360/126
See application file for complete search history.

(56) References Cited

U.S. PATENT DOCUMENTS

| | | | |
|---|---|---|---|
| 4,656,546 A | 4/1987 | Mallory | |
| 5,726,839 A | 3/1998 | Shinohara et al. | |
| 6,504,675 B1 | 1/2003 | Shukh et al. | |
| 7,212,378 B2 * | 5/2007 | Sato et al. | 360/126 |
| 7,248,431 B1 * | 7/2007 | Liu et al. | 360/120 |
| 7,248,437 B2 * | 7/2007 | Yazawa et al. | 360/126 |
| 7,268,973 B2 * | 9/2007 | Lille et al. | 360/125 |
| 2002/0034043 A1 | 3/2002 | Okada et al. | |
| 2002/0080524 A1 | 6/2002 | Takahashi et al. | |
| 2003/0080084 A1 | 5/2003 | Kamijima et al. | |
| 2003/0151850 A1 | 8/2003 | Nakamura et al. | |
| 2003/0193744 A1 | 10/2003 | Takahashi et al. | |
| 2004/0228033 A1 | 11/2004 | Aoki et al. | |
| 2005/0041337 A1 | 2/2005 | Yazawa et al. | |

FOREIGN PATENT DOCUMENTS

| | | |
|---|---|---|
| JP | A 7-161019 | 6/1995 |
| JP | A 2002-133610 | 5/2002 |
| JP | A 2002-197615 | 7/2002 |
| JP | A 2003-6811 | 1/2003 |
| JP | A-2003-142422 | 5/2003 |
| JP | A 2003-242607 | 8/2003 |
| JP | A 2004-342210 | 12/2004 |
| JP | A-2005-071429 | 3/2005 |

* cited by examiner

*Primary Examiner*—Angel Castro
(74) *Attorney, Agent, or Firm*—Oliff & Berridge, PLC

(57) ABSTRACT

A pole layer incorporates: a first portion having an end face located in a medium facing surface; and a second portion having a thickness greater than that of the first portion. A surface of the first portion closer to a substrate is located farther from the substrate than a surface of the second portion closer to the substrate. A surface of the first portion farther from the substrate is located closer to the substrate than a surface of the second portion farther from the substrate. At least a portion of the pole layer is placed in an encasing groove formed in a region extending from a first encasing layer through a second encasing layer to a nonmagnetic metal layer.

29 Claims, 28 Drawing Sheets

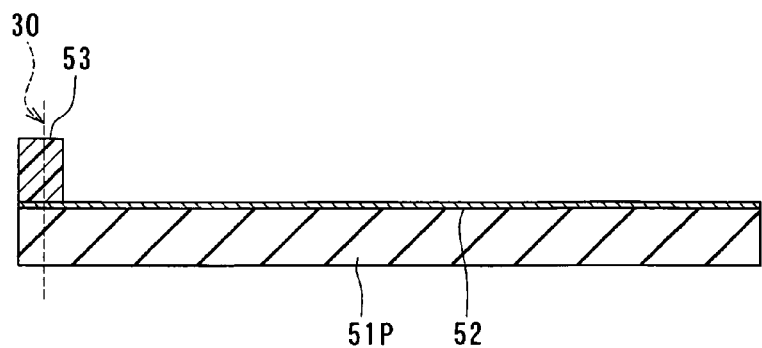 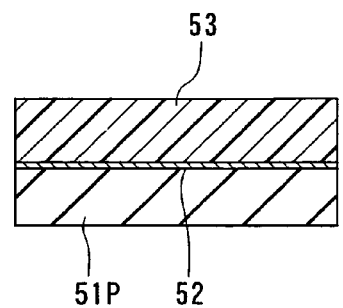
FIG. 6A  FIG. 6B
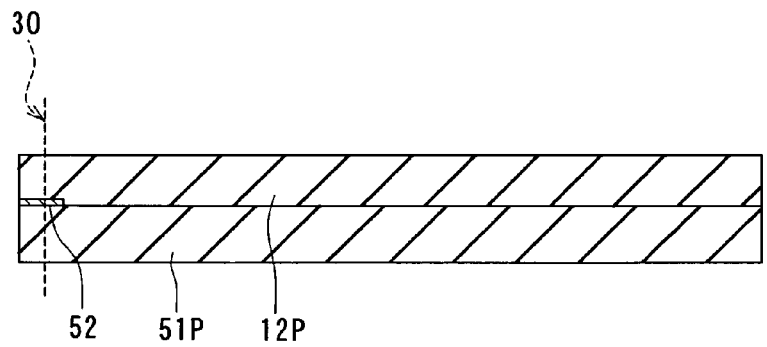 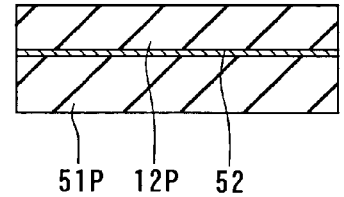
FIG. 7A  FIG. 7B

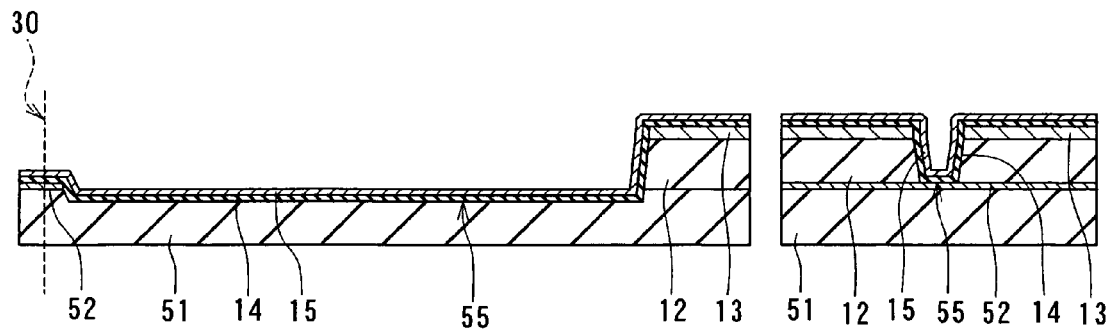
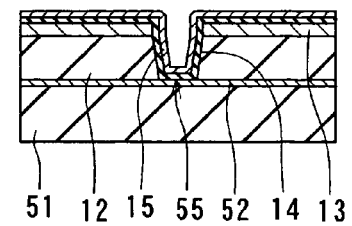
FIG. 10A          FIG. 10B
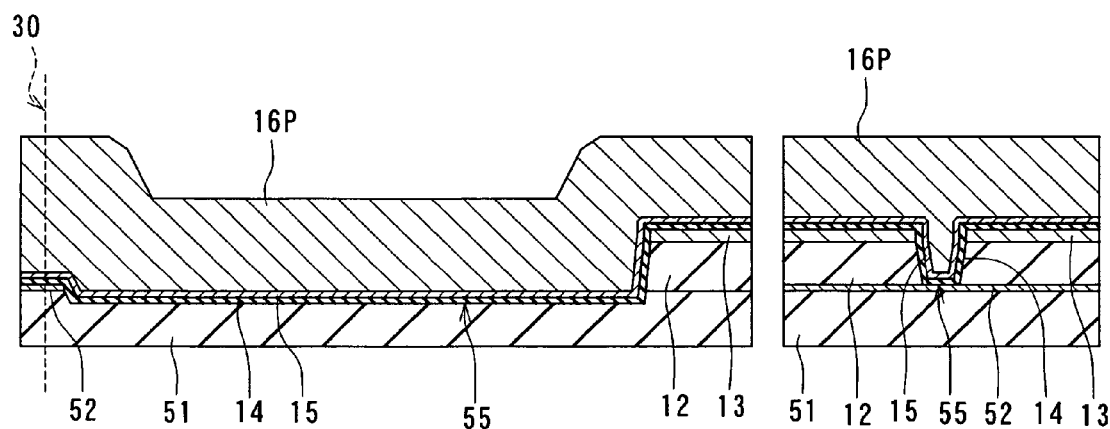
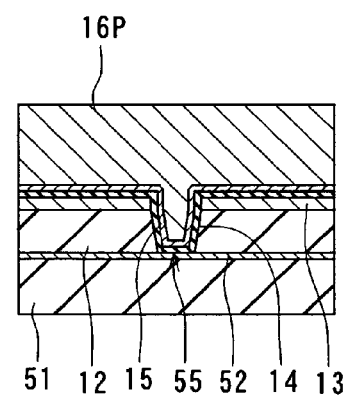
FIG. 11A          FIG. 11B

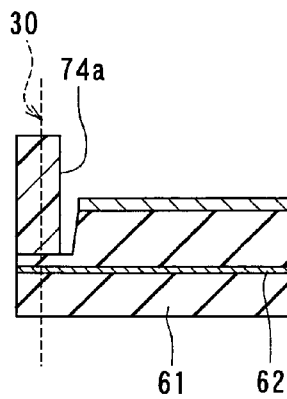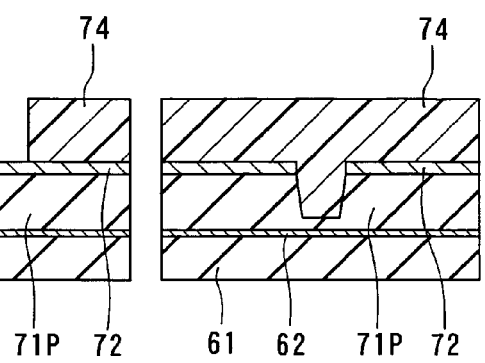
FIG. 23A  FIG. 23B
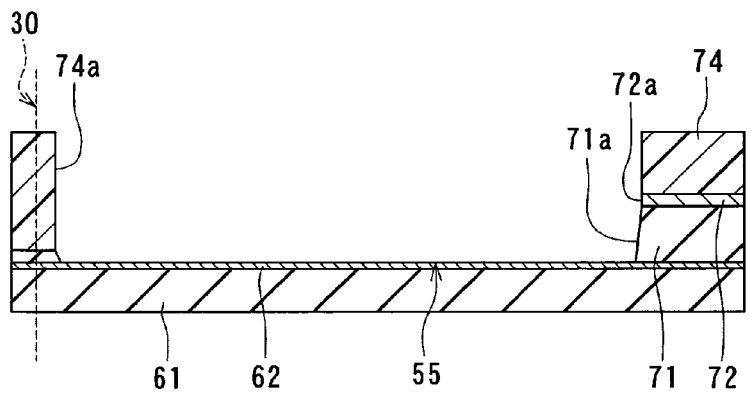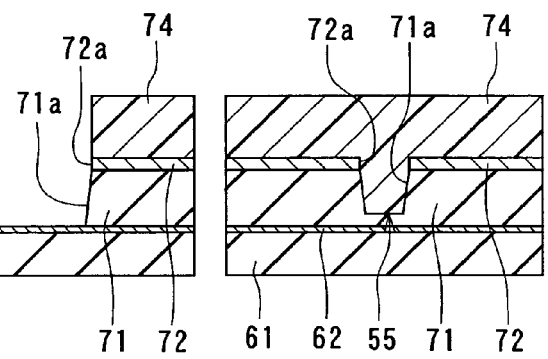
FIG. 24A  FIG. 24B

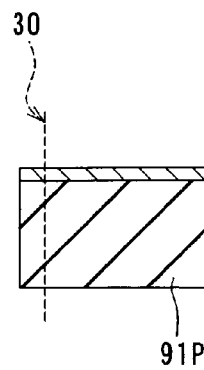 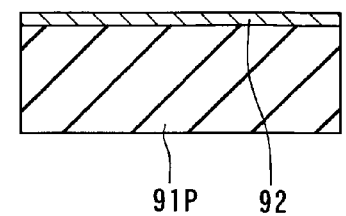
FIG. 32A   FIG. 32B
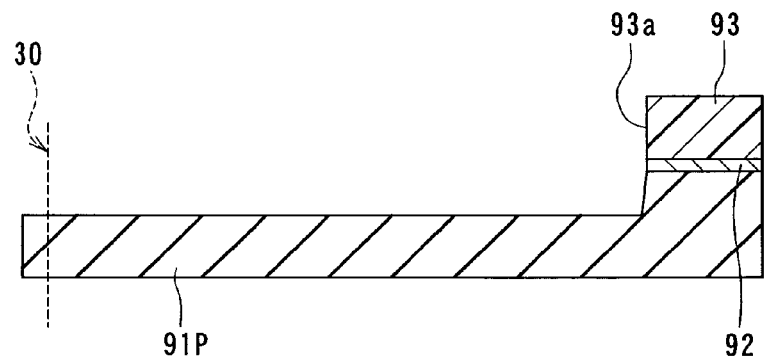 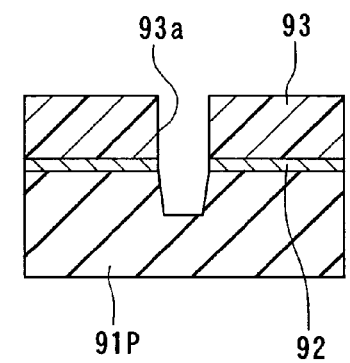
FIG. 33A   FIG. 33B

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for writing data on a recording medium by using a perpendicular magnetic recording system and to a method of manufacturing such a magnetic head.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction orthogonal to the surface of the recording medium. It is known that the perpendicular magnetic recording system is harder to be affected by thermal fluctuation of the recording medium and capable of implementing higher linear recording density, compared with the longitudinal magnetic recording system.

Like magnetic heads for longitudinal magnetic recording, magnetic heads for perpendicular magnetic recording typically used have a structure in which a reproducing (read) head having a magnetoresistive element (that may be hereinafter called an MR element) for reading and a recording (write) head having an induction-type electromagnetic transducer for writing are stacked on a substrate. The write head comprises a magnetic pole layer that produces a magnetic field in the direction orthogonal to the surface of the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

For the perpendicular magnetic recording system, it is an improvement in recording medium and an improvement in write head that mainly contributes to an improvement in recording density. It is a reduction in track width and an improvement in writing characteristics that is particularly required for the write head to achieve higher recording density. On the other hand, if the track width is reduced, the writing characteristics, such as an overwrite property that is a parameter indicating an overwriting capability, are reduced. It is therefore required to achieve better writing characteristics as the track width is reduced. Here, the length of the track width defining portion orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, problems arise, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in the U.S. Patent Application Publication No. US2003/0151850 A1 and the U.S. Pat. No. 6,504,675B1, for example. According to this technique, the end face of the track width defining portion located in the medium facing surface is made to have a shape in which the side located backward in the direction of travel of the recording medium (that is, the side located on the air-inflow-end side of the slider) is shorter than the opposite side. Typically, in the medium facing surface of a magnetic head, the end farther from the substrate is located forward in the direction of travel of the recording medium (that is, on the air-outflow-end side of the slider). Therefore, the above-mentioned shape of the end face of the track width defining portion located in the medium facing surface is such a shape that the side closer to the substrate is shorter than the side farther from the substrate.

As a magnetic head for perpendicular magnetic recording, a magnetic head comprising a pole layer and a shield is known, as disclosed in the U.S. Pat. No. 4,656,546, for example. In the medium facing surface of this magnetic head, an end face of the shield is located forward of an end face of the pole layer along the direction of travel of the recording medium with a specific small space therebetween. Such a magnetic head will be hereinafter called a shield-type head. In the shield-type head, the shield prevents a magnetic flux from reaching the recording medium, the flux being generated from the end face of the pole layer and extending in directions except the direction orthogonal to the surface of the recording medium. The shield-type head achieves a further improvement in linear recording density.

The U.S. Pat. No. 5,726,839 discloses a technique for reducing the thickness of a portion of the pole layer (the main pole) near the medium facing surface such that this portion is thinner than the other portion of the pole layer.

The U.S. Patent Application Publication No. US2002/0034043 A1 discloses a technique in which a portion of the pole layer (the main pole) near the medium facing surface is made to have a thickness that decreases as the distance from the medium facing surface decreases.

The U.S. Patent Application Publication No. US2002/0080524 A1 and the U.S. Patent Application Publication No. US2003/0193744 A1 disclose a technique in which a yoke layer thicker than a main pole layer is magnetically coupled to the main pole layer. An end face of the yoke layer closer to the medium facing surface is located at a distance from the medium facing surface. To form the main pole layer and the yoke layer, these layers are individually patterned, according to the U.S. Patent Application Publication No. US2002/0080524 A1 and the U.S. Patent Application Publication No. US2003/0193744 A1.

The Published Unexamined Japanese Patent Application 2003-6811 discloses a technique in which a portion of a pole layer (a second magnetic layer) near the medium facing surface is made to have a thickness smaller than that of the other portion of the pole layer. In this publication, one of surfaces of the portion of the pole layer near the medium facing surface closer to the substrate is located farther form the substrate than one of surfaces of the other portion of the pole layer closer to the substrate. In addition, this publication discloses a method of forming the pole layer in the following manner. In this method, first, a base of the pole layer is etched to define the shape of the base. Next, the pole layer is formed on the base by frame plating. A protection layer is then formed to cover the pole layer. Next, the top surfaces of the protection layer and the pole layer are polished to flatten these top surfaces. Through this polishing, the thickness of the pole layer taken in the medium facing surface is determined.

The U.S. Patent Application Publication No. US2004/0228033 A1 discloses a technique for reducing the thickness of a portion of a pole layer (main pole layer) near the medium facing surface so that this thickness is made smaller than that of the other portion of the pole layer. In this publication, one of surfaces of the portion of the pole layer near the medium facing surface closer to the substrate is located farther form the substrate than one of surfaces of the other portion of the pole layer closer to the substrate. In this publication, the pole layer incorporates a first layer and a second layer stacked on the first layer. This publication discloses a method of forming the pole layer in the following manner. In this method, first, a base of the pole layer is etched to form a concave portion in which the first layer is to be formed in a top surface of the base. Next, the first layer is formed in the concave portion by sputtering. Next, a magnetic layer to be the second layer is formed on the first layer by sputtering. The magnetic layer and the first layer are then selectively etched. The magnetic layer is formed into the second layer through this etching. Next, an insulating layer is formed to cover the second layer. Next, the insulating layer and the second layer are polished until the second layer is exposed, and the top surfaces of the insulating layer and the second layer are thereby flattened. Through this polishing, the thickness of the pole layer taken in the medium facing surface is defined.

Here, a combination of the main pole layer and the yoke layer that are disclosed in the U.S. Patent Application Publication No. US2002/0080524 A1 and the U.S. Patent Application Publication No. US2003/0193744A1 is called a pole layer for convenience. It is a technique for making a portion of the pole layer near the medium facing surface have a thickness smaller than that of the other portion of the pole layer that is disclosed in each of the U.S. Pat. No. 5,726,839, the U.S. Patent Application Publication No. US2002/0034043 A1, the U.S. Patent Application Publication No. US2002/0080524 A1, the U.S. Patent Application Publication No. US2003/0193744 A1, the Published Unexamined Japanese Patent Application 2003-6811, and the U.S. Patent Application Publication No. US2004/0228033 A1.

Consideration will now be given to a method of forming a pole layer having a track width defining portion with an end face that is located in the medium facing surface and that has a shape in which the side closer to the substrate is shorter than the side farther from the substrate as described above.

It is frame plating that has been often used in prior art for forming such a pole layer. In a method of forming the pole layer by frame plating, an electrode film is first formed on a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, the electrode film except a portion located below the pole layer is removed. Next, an insulating layer made of alumina, for example, is formed to cover the pole layer. Next, the insulating layer and the pole layer are polished by chemical mechanical polishing (hereinafter referred to as CMP), for example. Through the polishing, the top surface of the pole layer is flattened, and the thickness of the pole layer is controlled to be of a desired value.

It is difficult through the foregoing method of forming the pole layer to control the level at which polishing is stopped with precision. If the polishing is stopped at a level other than a desired level, the thickness of the pole layer is made other than a desired thickness, and the track width defined by the length of the above-mentioned side farther from the substrate is thereby made other than a desired value. Therefore, the foregoing method of forming the pole layer has a problem that it is difficult to control the track width with precision.

The U.S. Patent Application Publication No. US2003/0151850 A1 discloses a technique in which a groove having a shape corresponding to a pole layer is formed in an inorganic insulating film, and the pole layer is formed in the groove by plating or sputtering. In this method, the width of the pole layer, that is, the track width, is determined by the width of the groove formed in the inorganic insulating film. In addition, this publication discloses a technique in which the end face of the track width defining portion located in the medium facing surface is made to have a shape having a first portion and a second portion. The first portion has a width that continuously increases from an end on the air-inflow-end side to an end on the air-outflow-end side. The second portion is located on the air-outflow-end side of the first portion and has a uniform width that is equal to the width of the end of the first portion on the air-outflow-end side. Accorsing to this technique, it is possible to reduce variations in track width.

To solve the problems resulting from the skew, it is also effective to reduce the thickness of the track width defining portion taken in the medium facing surface. However, if the thickness of the entire pole layer is reduced, the cross-sectional area of the pole layer orthogonal to the direction in which the magnetic flux flows is reduced. As a result, it is impossible that the pole layer introduces a magnetic flux of great magnitude to the medium facing surface, and the overwrite property is thereby reduced.

As disclosed in the U.S. Pat. No. 5,726,839, the U.S. Patent Application Publication No. US2002/0034043 A1, the U.S. Patent Application Publication No. US2002/0080524 A1, the U.S. Patent Application Publication No. US2003/0193744 A1, the Published Unexamined Japanese Patent Application 2003-6811, and the U.S. Patent Application Publication No. US2004/0228033 A1, a portion of the pole layer near the medium facing surface is made to have a thickness smaller than that of the other portion of the pole layer. This results in a reduction in thickness of the track width defining portion taken in the medium facing surface, and it is thereby possible that the pole layer introduces a magnetic flux of great magnitude to the medium facing surface. However, it is difficult to precisely form the pole layer having such a shape that the portion near the medium facing surface has a thickness smaller than that of the other portion.

According to the technique disclosed in each of the U.S. Patent Application Publication No. US2002/0080524 A1 and the U.S. Patent Application Publication No. US2003/0193744 A1, the pole layer is made up of the two layers including the main pole layer and the yoke layer. The main pole layer and the yoke layer are formed by patterning individually. In this case, however, there arises a problem that it is difficult to align the main pole layer and the yoke layer with accuracy and the writing characteristic varies if the main pole layer and the yoke layer are misaligned.

According to the technique disclosed in each of the U.S. Patent Application Publication No. US2002/0080524 A1 and the U.S. Patent Application Publication No. US2003/0193744 A1, the yoke layer is thicker than the main pole layer. As a result, there is a great variation in thickness of a portion of the pole layer in the location of the end face of the yoke layer closer to the medium facing surface. In this portion in which the thickness varies, it is likely that flux leakage from the pole layer occurs. Consequently, if the portion is close to the medium facing surface, the leakage flux from the portion reaches the medium facing surface and further leaks to the outside from the medium facing surface. As a result, the effective track width is increased and/or the above-mentioned problems resulting from the skew occur.

Here, a case is considered in which the end face of the yoke layer closer to the medium facing surface is divided into two portions that are disposed on both sides of a surface that passes through the middle of the end face of the main pole layer in the medium facing surface and that is orthogonal to the medium facing surface and the substrate surface, the middle of the end face being taken along the direction of track width. In the technique disclosed in each of the U.S. Patent Application Publication No. US2002/0080524 A1 and the U.S. Patent Application Publication No. US2003/0193744 A1, if the locations of the main pole layer and the yoke layer are greatly shifted in the direction of track width, it is likely that flux leakage occurs from one of the above-mentioned two portions that has a greater area. As a result, the effective track width increases and/or the above-mentioned problems resulting from the skew occur.

In the method of forming the pole layer disclosed in the Japanese Published Unexamined Patent Application 2003-6811, the thickness of the pole layer taken in the medium facing surface is determined by polishing and flattening the top surface of the pole layer formed by frame plating. However, it is difficult to control the level at which the polishing is stopped with precision in this method as described above, and it is therefore difficult to control the track width with precision.

In the method of forming the pole layer disclosed in the U.S. Patent Application Publication No. US2004/0228033 A1, the thickness of the pole layer taken in the medium facing surface is determined by polishing and flattening the top surface of the second layer. However, it is difficult to control the level at which the polishing is stopped with precision in this method as described above, and it is therefore difficult to control the track width with precision.

OBJECT AND SUMMARY OF THE INVENTION

It is an object of the invention to provide a magnetic head for perpendicular magnetic recording that is capable of preventing problems resulting from the skew and capable of precisely forming a pole layer capable of introducing a magnetic flux of great magnitude to the medium facing surface, and to provide a method of manufacturing such a magnetic head.

A magnetic head for perpendicular magnetic recording of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; an encasing section made of a nonmagnetic material and having an encasing groove that opens in a top surface thereof and that accommodates at least part of the pole layer; and a substrate on which the encasing section, the pole layer and the coil are stacked.

In the magnetic head of the invention, the pole layer incorporates: a first portion having the end face located in the medium facing surface; and a second portion that is located farther from the medium facing surface than the first portion and has a thickness greater than a thickness of the first portion. A surface of the first portion closer to the substrate is located farther from the substrate than a surface of the second portion closer to the substrate. The end face of the pole layer located in the medium facing surface has a side located away from the substrate, this side defining a track width. The encasing section incorporates: an encasing layer that is made of a nonmagnetic material and defines geometries of a bottom and sidewalls of the encasing groove; and a nonmagnetic metal layer that is made of a nonmagnetic metal material, is disposed on the encasing layer, and defines a plane geometry of the encasing groove.

In the magnetic head of the invention, the first portion may include a portion having a width that is equal to the track width and that does not change in accordance with a distance from the medium facing surface, and a greatest width of the second portion may be greater than the track width. The surface of the first portion closer to the substrate may be parallel to a surface of the first portion farther from the substrate.

In the magnetic head of the invention, the end face of the pole layer located in the medium facing surface may have a width that decreases as the distance from the substrate decreases. In this case, the end face of the pole layer located in the medium facing surface may have a first region and a second region connected to the first region and located farther from the substrate than the first region. In addition, the first region may have a width that decreases as the distance from the substrate decreases, and the second region may have a uniform width that defines the track width. Furthermore, in the medium facing surface, the nonmagnetic metal layer may exist on both sides of the second region, the sides being opposed to each other in the direction of track width.

In the magnetic head of the invention, a difference in level between the surface of the first portion closer to the substrate and the surface of the second portion closer to the substrate may be smaller than the thickness of the first portion. The thickness of the first portion may fall within a range of 0.10 to 0.30 µm inclusive, and the difference in level between the surface of the first portion closer to the substrate and the surface of the second portion closer to the substrate may fall within a range of 0.05 to 0.30 µm inclusive.

In the magnetic head of the invention, the surface of the first portion farther from the substrate may be located closer to the substrate than a surface of the second portion farther from the substrate. In this case, the magnetic head may further comprise: a shield layer having an end face located in the medium facing surface and having a portion that is located away from the medium facing surface and coupled to the pole layer; and a gap layer made of a nonmagnetic material and provided between the pole layer and the shield layer. In addition, in the medium facing surface, the end face of the shield layer may be located forward of the end face of the pole layer along the direction of travel of the recording medium with a specific space created by a thickness of the gap layer. Moreover, the second portion may have a front end face that couples the surface of the first portion farther from the substrate to the surface of the second portion farther from the substrate, and the shield layer may incorporate a portion that is sandwiched between the front end face and the medium facing surface and located closer to the substrate than the surface of the second portion farther from the substrate. The end face of the pole layer located in the medium facing surface may have a first region and a second region connected to the first region and located farther from the substrate than the first region, the first region may have a width that decreases as the distance from the substrate decreases, and the second region may have a uniform width that defines the track width. Furthermore, in the medium facing surface, the nonmagnetic metal layer may exist on both sides of the second region, the sides being opposed to each other in a direction of track width.

Each of a difference in level between the surface of the first portion closer to the substrate and the surface of the second portion closer to the substrate and a difference in level between the surface of the first portion farther from the substrate and the surface of the second portion farther from the substrate may be smaller than the thickness of the first portion. The thickness of the first portion may fall within a range of 0.10 to 0.30 μm inclusive, the difference in level between the surface of the first portion closer to the substrate and the surface of the second portion closer to the substrate may fall within a range of 0.05 to 0.30 μm inclusive, and the difference in level between the surface of the first portion farther from the substrate and the surface of the second portion farther from the substrate may fall within a range of 0.05 to 0.30 μm inclusive.

In the magnetic head of the invention, the encasing layer may include a first layer and a second layer disposed on the first layer, and the encasing section may further incorporate a bottom forming layer selectively disposed on a region of the first layer that faces toward the surface of the first portion of the pole layer closer to the substrate. In this case, a portion of a bottom of the encasing groove is formed of a top surface of the bottom forming layer, the portion facing toward the surface of the first portion of the pole layer closer to the substrate, and another portion of the bottom of the encasing groove is formed in the first layer, the portion facing toward the surface of the second portion of the pole layer closer to the substrate.

In the magnetic head of the invention, the encasing section may further incorporate a bottom forming layer located below the encasing layer. In addition, a portion of the bottom of the encasing groove may be formed in the encasing layer, the portion facing toward the surface of the first portion of the pole layer closer to the substrate, and another portion of the bottom of the encasing groove may be formed of a top surface of the bottom forming layer, the portion facing toward the surface of the second portion of the pole layer closer to the substrate.

A magnetic head for perpendicular magnetic recording manufactured through a method of the invention comprises: a medium facing surface that faces toward a recording medium; a coil for generating a magnetic field corresponding to data to be written on the recording medium; a pole layer having an end face located in the medium facing surface, allowing a magnetic flux corresponding to the field generated by the coil to pass therethrough, and generating a write magnetic field for writing the data on the recording medium through the use of a perpendicular magnetic recording system; an encasing section made of a nonmagnetic material and having an encasing groove that opens in a top surface thereof and that accommodates at least part of the pole layer; and a substrate on which the encasing section, the pole layer and the coil are stacked. The pole layer incorporates: a first portion having the end face located in the medium facing surface; and a second portion that is located farther from the medium facing surface than the first portion and has a thickness greater than that of the first portion. A surface of the first portion closer to the substrate is located farther from the substrate than a surface of the second portion closer to the substrate. The end face of the pole layer located in the medium facing surface has a side located away from the substrate, this side defining the track width.

The method of manufacturing the magnetic head for perpendicular magnetic recording of the invention comprises the steps of forming the encasing section; forming the pole layer such that the at least part of the pole layer is placed in the encasing groove of the encasing section; and forming the coil.

In the method of the invention, the first portion may include a portion having a width that is equal to the track width and that does not change in accordance with a distance from the medium facing surface, and a greatest width of the second portion may be greater than the track width. The surface of the first portion closer to the substrate may be made parallel to a surface of the first portion farther from the substrate.

In the method of the invention, the end face of the pole layer located in the medium facing surface may have a width that decreases as the distance from the substrate decreases. In this case, the encasing section may incorporate: an encasing layer that is made of a nonmagnetic material and defines geometries of a bottom and sidewalls of the encasing groove; and a nonmagnetic metal layer that is made of a nonmagnetic metal material, is disposed on the encasing layer, and defines a plane geometry of the encasing groove. In addition, the end face of the pole layer located in the medium facing surface may have a first region and a second region connected to the first region and located farther from the substrate than the first region, the first region may have a width that decreases as the distance from the substrate decreases, and the second region may have a uniform width that defines the track width. Moreover, in the step of forming the pole layer, the pole layer may be formed such that, in the medium facing surface, the nonmagnetic metal layer exists on both sides of the second region, the sides being opposed to each other in a direction of track width.

In the method of the invention, a difference in level between the surface of the first portion closer to the substrate and the surface of the second portion closer to the substrate may be smaller than the thickness of the first portion. The thickness of the first portion may fall within a range of 0.10 to 0.30 μm inclusive, and the difference in level between the surface of the first portion closer to the substrate and the surface of the second portion closer to the substrate may fall within a range of 0.05 to 0.30 µm inclusive.

In the method of the invention, the surface of the first portion farther from the substrate may be located closer to the substrate than a surface of the second portion farther from the substrate. In this case, the step of forming the pole layer may include the steps of: forming a magnetic layer to be the pole layer such that the encasing groove is filled with the magnetic layer; and etching a portion of the magnetic layer so that the magnetic layer is formed into the pole layer by forming the surface of the first portion farther from the substrate and the surface of the second portion farther from the substrate.

In the method of the invention, the magnetic head may further comprise: a shield layer having an end face located in the medium facing surface and having a portion that is located away from the medium facing surface and coupled to the pole layer; and a gap layer made of a nonmagnetic material and provided between the pole layer and the shield layer. In addition, in the medium facing surface, the end face of the shield layer may be located forward of the end face of the pole layer along the direction of travel of the recording medium with a specific space created by the thickness of the gap layer. Moreover, the second portion may have a front end face that couples the surface of the first portion farther from the substrate to the surface of the second portion farther from the substrate, and the shield layer may incorporate a portion that is sandwiched between the front end face and the medium facing surface and located closer to the substrate than the surface of the second portion farther from the substrate. The method of the invention may further comprise the steps of forming the gap layer on the pole layer; and forming the shield layer on the gap layer.

The encasing section may incorporate: an encasing layer that is made of a nonmagnetic material and defines geometries of a bottom and sidewalls of the encasing groove; and a nonmagnetic metal layer that is made of a nonmagnetic metal material, is disposed on the encasing layer, and defines a plane geometry of the encasing groove. In addition, the end face of the pole layer located in the medium facing surface may have a first region and a second region connected to the first region and located farther from the substrate than the first region, the first region may have a width that decreases as the distance from the substrate decreases, and the second region may have a uniform width that defines the track width. The pole layer may be formed in the step of forming the pole layer such that, in the medium facing surface, the nonmagnetic metal layer exists on both sides of the second region, the sides being opposed to each other in a direction of track width.

Each of a difference in level between the surface of the first portion closer to the substrate and the surface of the second portion closer to the substrate and a difference in level between the surface of the first portion farther from the substrate and the surface of the second portion farther from the substrate may be smaller than the thickness of the first portion. The thickness of the first portion may fall within a range of 0.10 to 0.30 µm inclusive, the difference in level between the surface of the first portion closer to the substrate and the surface of the second portion closer to the substrate may fall within a range of 0.05 to 0.30 µm inclusive, and the difference in level between the surface of the first portion farther from the substrate and the surface of the second portion farther from the substrate may fall within a range of 0.05 to 0.30 µm inclusive.

In the method of the invention, the step of forming the encasing section may include the steps of forming a first nonmagnetic layer made of a nonmagnetic material; forming an etching stopper layer in a region on the first nonmagnetic layer, the region facing toward the surface of the first portion of the pole layer closer to the substrate, the etching stopper layer having a function of stopping etching performed later; forming a second nonmagnetic layer made of a nonmagnetic material on the etching stopper layer and the first nonmagnetic layer; and forming the encasing groove in the first and second nonmagnetic layers by etching respective portions of the first and second nonmagnetic layers. In this case, in the step of forming the encasing groove, a portion of the first nonmagnetic layer located below the etching stopper layer is not etched, and a portion of a bottom of the encasing groove is formed of a top surface of the etching stopper layer, the portion facing toward the surface of the first portion of the pole layer closer to the substrate. In addition, another portion of the bottom of the encasing groove is formed in the first layer, the portion facing toward the surface of the second portion of the pole layer closer to the substrate.

In the method of the invention, the step of forming the encasing section may include: the step of forming an etching stopper layer having a function of stopping etching performed later; the step of forming a nonmagnetic layer made of a nonmagnetic material on the etching stopper layer; the first etching step of forming a portion of the encasing groove in which the first portion of the pole layer is placed by etching a portion of the nonmagnetic layer; and the second etching step of forming a portion of the encasing groove in which the second portion of the pole layer is placed by etching a portion of the nonmagnetic layer after the first etching step. In this case, the first etching step is completed before a bottom of a groove formed in the nonmagnetic layer by etching reaches the etching stopper layer, and the second etching step is performed until a bottom of a groove formed in the nonmagnetic layer by etching reaches the etching stopper layer. A portion of a bottom of the encasing groove is formed in the nonmagnetic layer, the portion facing toward the surface of the first portion of the pole layer closer to the substrate, and another portion of the bottom of the encasing groove is formed of a top surface of the etching stopper layer, the portion facing toward the surface of the second portion of the pole layer closer to the substrate.

In the method of the invention, the step of forming the encasing section may include: the step of forming a nonmagnetic layer made of a nonmagnetic material; the first etching step of forming a portion of the encasing groove in which the first portion of the pole layer is placed by etching a portion of the nonmagnetic layer; and the second etching step of forming a portion of the encasing groove in which the second portion of the pole layer is placed by etching a portion of the nonmagnetic layer after the first etching step.

According to the magnetic head for perpendicular magnetic recording of the invention or the method of manufacturing the magnetic head for perpendicular magnetic recording of the invention, the pole layer incorporates the first and second portions, and the surface of the first portion closer to the substrate is located farther from the substrate than the surface of the second portion closer to the substrate. According to the invention, it is possible to form the encasing groove in advance and to form the pole layer such that at least part of the pole layer is placed in the encasing groove. As a result, according to the invention, it is possible to prevent problems resulting from the skew and to form the pole layer with precision that is capable of introducing a magnetic flux of great magnitude to the medium facing surface.

In the invention, the first portion may include a portion having a width equal to the track width and having a width that does not change in accordance with the distance from the medium facing surface, and a greatest width of the second portion may be greater than the track width. In this case, it is possible to effectively introduce a magnetic flux of great magnitude to the medium facing surface through the pole layer while reducing the thickness of the pole layer taken in the medium facing surface.

In the invention, the surface of the first portion closer to the substrate may be parallel to the surface of the first portion farther from the substrate. In this case, it is possible to prevent variations in thickness of the pole layer in the medium facing surface.

In the invention, the surface of the first portion farther from the substrate may be located closer to the substrate than the surface of the second portion farther from the substrate. In this case, it is possible to more effectively introduce a magnetic flux of great magnitude to the medium facing surface through the pole layer while reducing the thickness of the pole layer taken in the medium facing surface.

In the magnetic head of the invention, the encasing layer may include the first layer and the second layer disposed on the first layer, and the encasing section may further incorporate the bottom forming layer selectively disposed on the region of the first layer that faces toward the surface of the first portion of the pole layer closer to the substrate. In addition, a portion of a bottom of the encasing groove may be formed of a top surface of the bottom forming layer, the portion facing toward the surface of the first portion of the pole layer closer to the substrate, and another portion of the bottom of the encasing groove may be formed in the first layer, the portion facing toward the surface of the second portion of the pole layer closer to the substrate. In this case, it is possible to define the location of the boundary between the first and second portions of the pole layer with precision.

In the magnetic head of the invention, the encasing section may incorporate the bottom forming layer located below the encasing layer. In addition, a portion of the bottom of the encasing groove may be formed in the encasing layer, the portion facing toward the surface of the first portion of the pole layer closer to the substrate, and another portion of the bottom of the encasing groove may be formed of the top surface of the bottom forming layer, the portion facing toward the surface of the second portion of the pole layer closer to the substrate. In this case, it is possible to control the thickness of the second portion with accuracy.

In the method of manufacturing the magnetic head of the invention, the step of forming the encasing section may include the steps of forming the first nonmagnetic layer made of a nonmagnetic material; forming the etching stopper layer in the region on the first nonmagnetic layer, the region facing toward the surface of the first portion of the pole layer closer to the substrate, the etching stopper layer having the function of stopping etching performed later; forming the second nonmagnetic layer made of a nonmagnetic material on the etching stopper layer and the first nonmagnetic layer; and forming the encasing groove in the first and second nonmagnetic layers by etching respective portions of the first and second nonmagnetic layers. In this case, it is possible to define the location of the boundary between the first and second portions of the pole layer with precision.

In the method of the invention, the step of forming the encasing section may include: the step of forming the etching stopper layer having the function of stopping etching performed later; the step of forming the nonmagnetic layer made of a nonmagnetic material on the etching stopper layer; the first etching step of forming the portion of the encasing groove in which the first portion of the pole layer is placed by etching a portion of the nonmagnetic layer; and the second etching step of forming the portion of the encasing groove in which the second portion of the pole layer is placed by etching a portion of the nonmagnetic layer after the first etching step. In this case, it is possible to control the thickness of the second portion with accuracy.

Other and further objects, features and advantages of the invention will appear more fully from the following description.

BRIEF DESCRIPTION OF THE DRAWINGS

FIG. 6A and FIG. 6B are views for illustrating a step of a method of manufacturing the magnetic head of the first embodiment of the invention.

FIG. 7A and FIG. 7B are views for illustrating a step that follows the step shown in FIG. 6A and FIG. 6B.

FIG. 10A and FIG. 10B are views for illustrating a step that follows the step shown in FIG. 9A and FIG. 9B.

FIG. 1A and FIG. 11B are views for illustrating a step that follows the step shown in FIG. 10A and FIG. 10B.

FIG. 23A and FIG. 23B are views for illustrating a step that follows the step shown in FIG. 22A and FIG. 22B.

FIG. 24A and FIG. 24B are views for illustrating a step that follows the step shown in FIG. 23A and FIG. 23B.

FIG. 32A and FIG. 32B are views for illustrating a step of a method of manufacturing a magnetic head of a third embodiment of the invention.

FIG. 33A and FIG. 33B are views for illustrating a step that follows the step shown in FIG. 32A and FIG. 32B.

DETAILED DESCRIPTION OF THE PREFERRED EMBODIMENTS

First Embodiment

Figure 2:
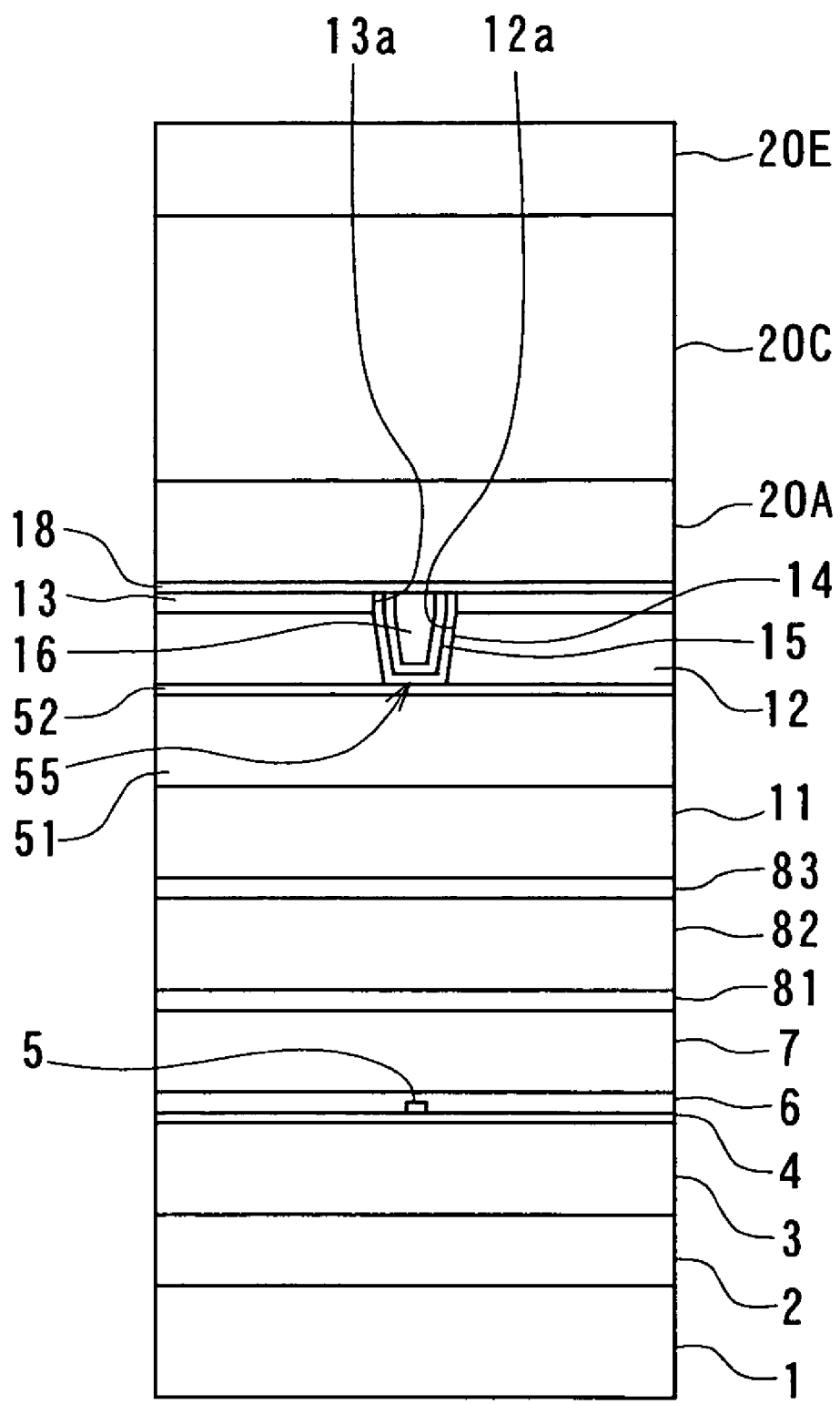
FIG. 2 is a front view of the medium facing surface of the magnetic head of the first embodiment of the invention.
Figure 3:
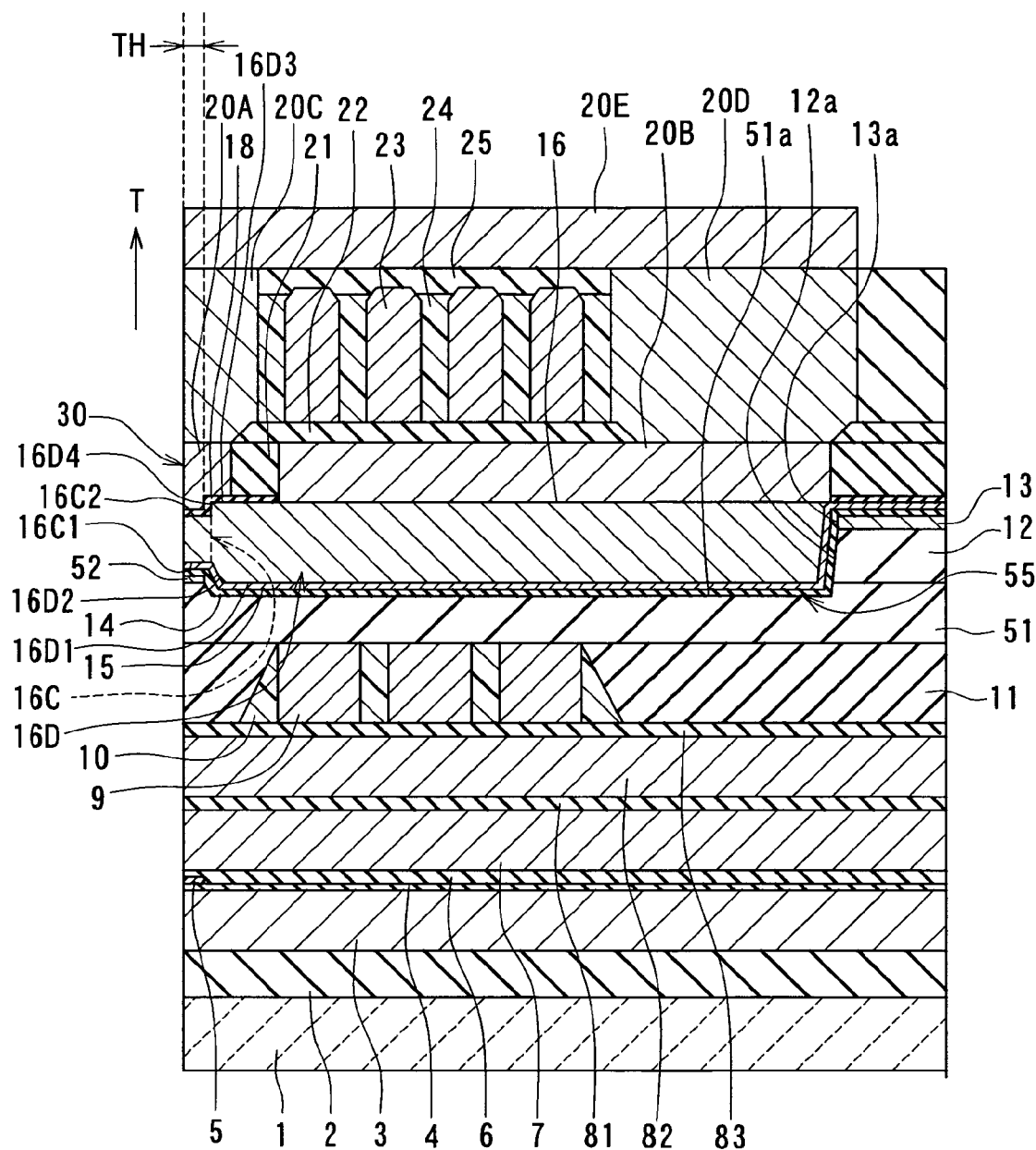
FIG. 3 is a cross-sectional view for illustrating the configuration of the magnetic head of the first embodiment of the invention.

Preferred embodiments of the invention will now be described in detail with reference to the accompanying drawings. Reference is now made to FIG. 2 and FIG. 3 to describe the configuration of a magnetic head for perpendicular magnetic recording of a first embodiment of the invention. FIG. 2 is a front view for illustrating the medium facing surface of the magnetic head of the embodiment. FIG. 3 is a cross-sectional view for illustrating the configuration of the magnetic head of the embodiment. FIG. 3 illustrates a cross section orthogonal to the medium facing surface and a surface of a substrate. The arrow indicated with T in FIG. 3 shows the direction of travel of a recording medium.

As shown in FIG. 2 and FIG. 3, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a nonmagnetic layer 81 and a second top shield layer 82 that are disposed on the first top shield layer 7 one by one. The nonmagnetic layer 81 is made of a nonmagnetic material such as alumina. The second top shield layer 82 is made of a magnetic material. The portions from the bottom shield layer 3 to the second top shield layer 82 make up the read head.

The magnetic head further comprises: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further comprises: a first encasing layer 51 made of a nonmagnetic material and disposed on the flattened top surfaces of the coil 9 and the insulating layers 10 and 11; and an etching stopper layer 52 disposed on the first encasing layer 51. The first encasing layer 51 is made of alumina, for example. The etching stopper layer 52 extends from the medium facing surface 30 to a point at a specific distance such as 0.1 to 0.3 µm from the medium facing surface 30. The etching stopper layer 52 has a thickness that falls within a range of 10 to 50 nm inclusive, for example. The etching stopper layer 52 may be made of any of Ru, NiB, NiP, NiCr, Pd, V, Cr, Nb, Te, Rh, Ir, Re, TaO, Rb, Cs, NiCu, NiPd, AlN, AlF, SiC, and TiC, for example. The etching stopper layer 52 may be made of a magnetic material. The first encasing layer 51 has a groove 51a formed in a region in which the etching stopper layer 52 is not located. The first encasing layer 51 corresponds to the first layer of the encasing layer of the invention.

The magnetic head further comprises a second encasing layer 12 made of a nonmagnetic material and disposed on the first encasing layer 51 and the etching stopper layer 52. The second encasing layer 12 has a groove 12a that opens in the top surface thereof. The second encasing layer 12 may be made of an insulating material such as alumina, silicon oxide ($SiO_x$), or silicon oxynitride (SiON), or a nonmagnetic metal material such as Ru, Ta, Mo, Ti, W, NiCu, NiB or NiPd. The groove 51a of the first encasing layer 51 is contiguous to the groove 12a of the second encasing layer 12. For the materials of the first encasing layer 51, the second encasing layer 12 and the etching stopper layer 52, such a combination of materials is chosen that, when etching is performed for forming an encasing groove 55 described later, the rate at which the first and second encasing layers 51 and 12 are etched is higher than the rate at which the stopper layer 52 is etched. The second encasing layer 12 corresponds to the second layer of the encasing layer of the invention.

The magnetic head further comprises a nonmagnetic metal layer 13 made of a nonmagnetic metal material and disposed on the top surface of the second encasing layer 12. The nonmagnetic metal layer 13 has an opening 13a that penetrates, and the edge of the opening 13a is located directly above the edge of the groove 12a in the top surface of the second encasing layer 12. It is preferred that the inner wall of the opening 13a is orthogonal to the top surface of the substrate 1. The nonmagnetic metal layer 13 may be made of any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example. The opening 13a of the nonmagnetic metal layer 13 is contiguous to the groove 12a of the second encasing layer 12. The groove made up of a combination of the groove 51a of the first encasing layer 51, the groove 12a of the second encasing layer 12, and the opening 13a of the nonmagnetic metal layer 13 is hereinafter called the encasing groove 55. The first encasing layer 51, the etching stopper layer 52, the second encasing layer 12 and the nonmagnetic metal layer 13 make up the encasing section of the embodiment. The encasing section incorporates the encasing groove 55 that is made of a nonmagnetic material, that opens in the top surface thereof, and that accommodates at least a portion of the pole layer 16. The encasing groove 55 opens in the top surface of the nonmagnetic metal layer 13. The first encasing layer 51, the etching stopper layer 52 and the second encasing layer 12 define the geometries of the bottom and the sidewalls of the encasing groove 55. The nonmagnetic metal layer 13 defines the plane geometry of the encasing groove 55.

The magnetic head further comprises a nonmagnetic film 14 made of a nonmagnetic material, a polishing stopper layer 15 and the pole layer 16 that are disposed in the encasing groove 55. The nonmagnetic film 14 is disposed to touch the surface of the encasing groove 55. The pole layer 16 is disposed apart from the surface of the encasing groove 55. The polishing stopper layer 15 is disposed between the nonmagnetic film 14 and the pole layer 16. The polishing stopper layer 15 also functions as a seed layer used for forming the pole layer 16 by plating. At least a portion of the pole layer 16 is placed in the encasing groove 55.

The nonmagnetic film 14 may be made of an insulating material or a semiconductor material, for example. The insulating material as the material of the nonmagnetic film 14 may be any of alumina, silicon oxide ($SiO_x$), and silicon oxynitride (SiON). The semiconductor material as the material of the nonmagnetic film 14 may be polycrystalline silicon or amorphous silicon.

The polishing stopper layer 15 is made of a nonmagnetic conductive material. The material of the polishing stopper layer 15 may be the same as that of the nonmagnetic metal layer 13.

The pole layer 16 may incorporate: a first layer disposed closer to the surface of the encasing groove 55; and a second layer disposed farther from the surface of the encasing groove 55. Each of the first layer and the second layer is made of a magnetic metal material. The first layer may be made of any of CoFeN, CoNiFe, NiFe, and CoFe, for example. The second layer may be made of any of NiFe, CoNiFe and CoFe, for example. The first layer may be omitted.

The magnetic head further comprises a gap layer 18 disposed on the top surfaces of the nonmagnetic metal layer 13, the nonmagnetic film 14, the polishing stopper layer 15 and the pole layer 16. The gap layer 18 has an opening located at a distance from the medium facing surface 30. The gap layer 18 may be made of an insulating material such as alumina or a nonmagnetic metal material such as Ru, NiCu, Ta, W, NiB or NiPd.

The magnetic head further comprises a shield layer 20. The shield layer 20 has: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C to the coupling layer 20D. The first layer 20A, the yoke layer 20B, the second layer 20C, the coupling layer 20D and the third layer 20E are each made of a magnetic material. These layers 20A to 20E may be made of any of CoFeN, CoNiFe, NiFe and CoFe, for example.

The magnetic head further comprises a nonmagnetic layer 21 made of a nonmagnetic material and disposed around the yoke layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, or Cu.

The magnetic head further comprises: an insulating layer 22 disposed on regions of the top surfaces of the yoke layer 20B and the nonmagnetic layer 21 in which a coil described later is disposed; the coil 23 disposed on the insulating layer 22; an insulating layer 24 disposed around the coil 23 and in the space between the respective adjacent turns of the coil 23; and an insulating layer 25 disposed to cover the coil 23 and the insulating layer 24. The coil 23 is flat-whorl-shaped. A portion of the coil 23 passes between the second layer 20C and the coupling layer 20D. The coil 23 is made of a conductive material such as copper. The second layer 20C, the coupling layer 20D, and the insulating layer 25 have flattened top surfaces. The insulating layer 24 is made of photoresist, for example. The insulating layers 22 and 25 are made of alumina, for example.

The portions from the coil 9 to the third layer 20E of the shield layer 20 make up the write head. Although not shown, the magnetic head further comprises a protection layer for covering the shield layer 20.

As described so far, the magnetic head of the embodiment comprises the medium facing surface 30 that faces toward a recording medium, the read head, and the write head. The read head and the write head are stacked on the substrate 1. The read head is disposed backward in the direction T of travel of the recording medium (that is, on the air-inflow-end side of the slider). The write head is disposed forward in the direction T of travel of the recording medium (that is, on the air-outflow-end side of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the first encasing layer 51, the second encasing layer 12, the nonmagnetic metal layer 13, the nonmagnetic film 14, the polishing stopper layer 15, the pole layer 16, the gap layer 18, the shield layer 20, and the coil 23. The coils 9 and 23 generate a magnetic field corresponding to data to be written on the recording medium. The coil 9 is not a component requisite for the write head and may be omitted. The nonmagnetic film 14 may be omitted.

The pole layer 16 has an end face located in the medium facing surface 30. The pole layer 16 allows a magnetic flux corresponding to the field generated by the coil 23 to pass therethrough and generates a write magnetic field for writing data on the medium by using the perpendicular magnetic recording system.

The shield layer 20 has an end face located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end face of the shield layer 20 is disposed forward of the end face of the pole layer 16 along the direction T of travel of the recording medium with a specific space created by the thickness of the gap layer 18. The thickness of the gap layer 18 falls within a range of 30 to 60 nm inclusive, for example. At least part of the coil 23 is disposed between the pole layer 16 and the shield layer 20 and insulated from the pole layer 16 and the shield layer 20.

The magnetic head comprises the encasing groove 55 that is formed to extend from the first encasing layer 51 through the second encasing layer 12 to the nonmagnetic metal layer 13. At least a portion of the pole layer 16 is disposed in the encasing groove 55. The nonmagnetic film 14 has a thickness that falls within a range of 10 to 40 nm inclusive, for example. However, the thickness of the nonmagnetic film 14 is not limited to this range but may be of any other value, depending on the track width. The polishing stopper layer 15 has a thickness that falls within a range of 30 to 100 nm inclusive, for example.

The shield layer 20 has: the first layer 20A disposed adjacent to the gap layer 18; the second layer 20C disposed on a side of the first layer 20A farther from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and the at least part of the coil 23.

The first layer 20A has: a first end located in the medium facing surface 30; and a second end opposite to the first end. The second layer 20C also has: a first end located in the medium facing surface 30; and a second end opposite to the first end. Throat height TH is the distance between the medium facing surface 30 and one of two points that is closer to the medium facing surface 30, wherein one of the two points is the one at which the space between the pole layer 16 and the shield layer 20 starts to increase when seen from the medium facing surface 30, and the other of the points is the one at which the gap layer 18 first bends when seen from the medium facing surface 30. In the embodiment, as will be described in detail later, the throat height TH is the distance between the medium facing surface 30 and the point at which the gap layer 18 first bends when seen from the medium facing surface 30. The throat height TH falls within a range of 0.05 to 0.3 μm inclusive, for example. The minimum distance between the first end and the second end of the portion of the second layer 20C facing toward the pole layer 16 with the gap layer 18 and the first layer 20A disposed in between falls within a range of 0.3 to 0.8 μm inclusive, for example. The first layer 20A and the yoke layer 28B have a thickness that falls within a range of 0.3 to 0.8 μm inclusive, for example. The second layer 20C and the coupling layer 20D have a thickness that falls within a range of 1.5 to 3.0 μm inclusive, for example. The third layer 20E has a thickness that falls within a range of 2.0 to 3.0 μm inclusive, for example. The coil 23 has a thickness that is equal to or smaller than the thickness of the second layer 20C and that falls within a range of 1.5 to 3.0 μm inclusive, for example.

Figure 1:
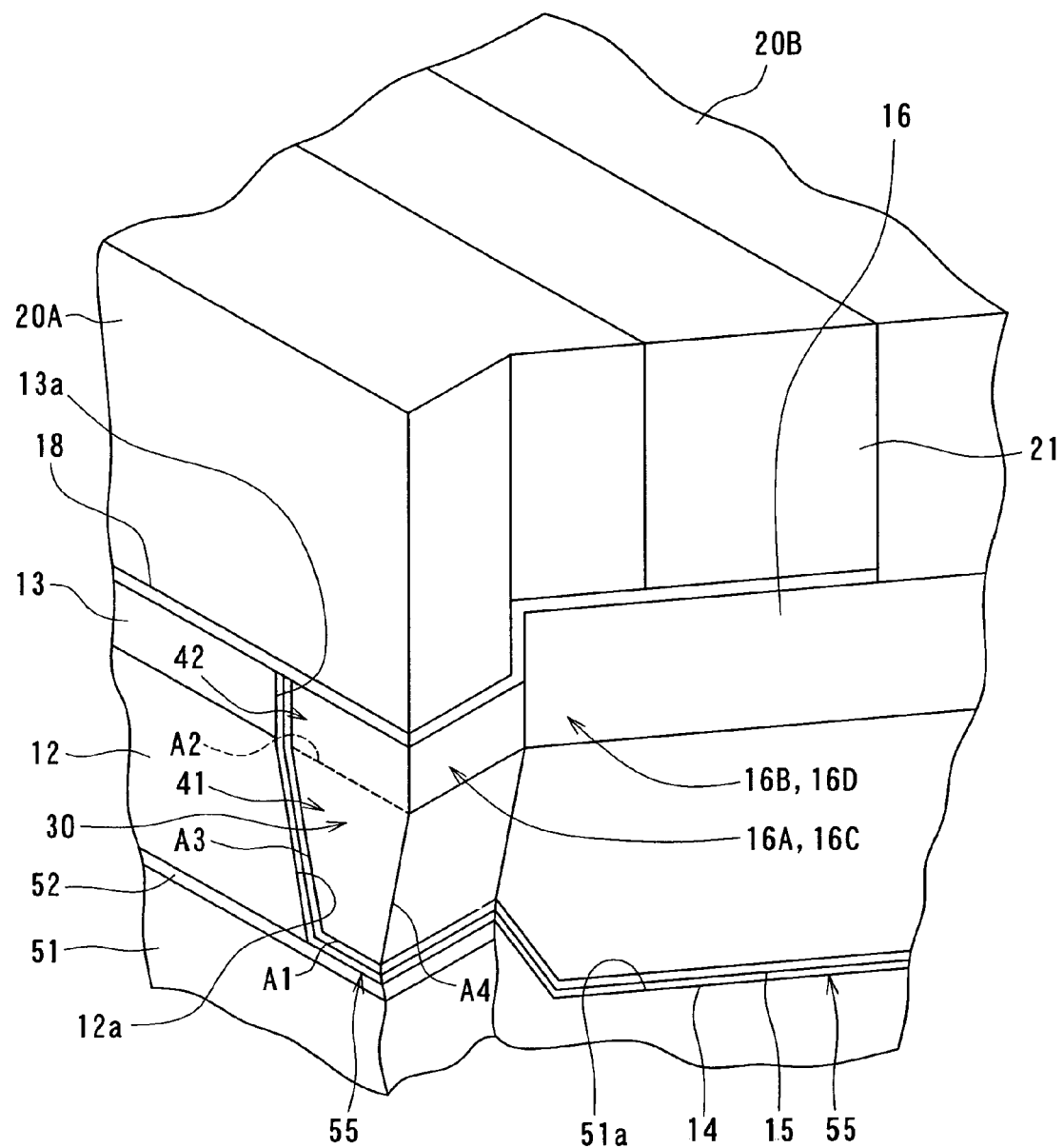
FIG. 1 is a perspective view illustrating a portion of a pole layer of a magnetic head of a first embodiment of the invention in a neighborhood of a medium facing surface.
Figure 4:
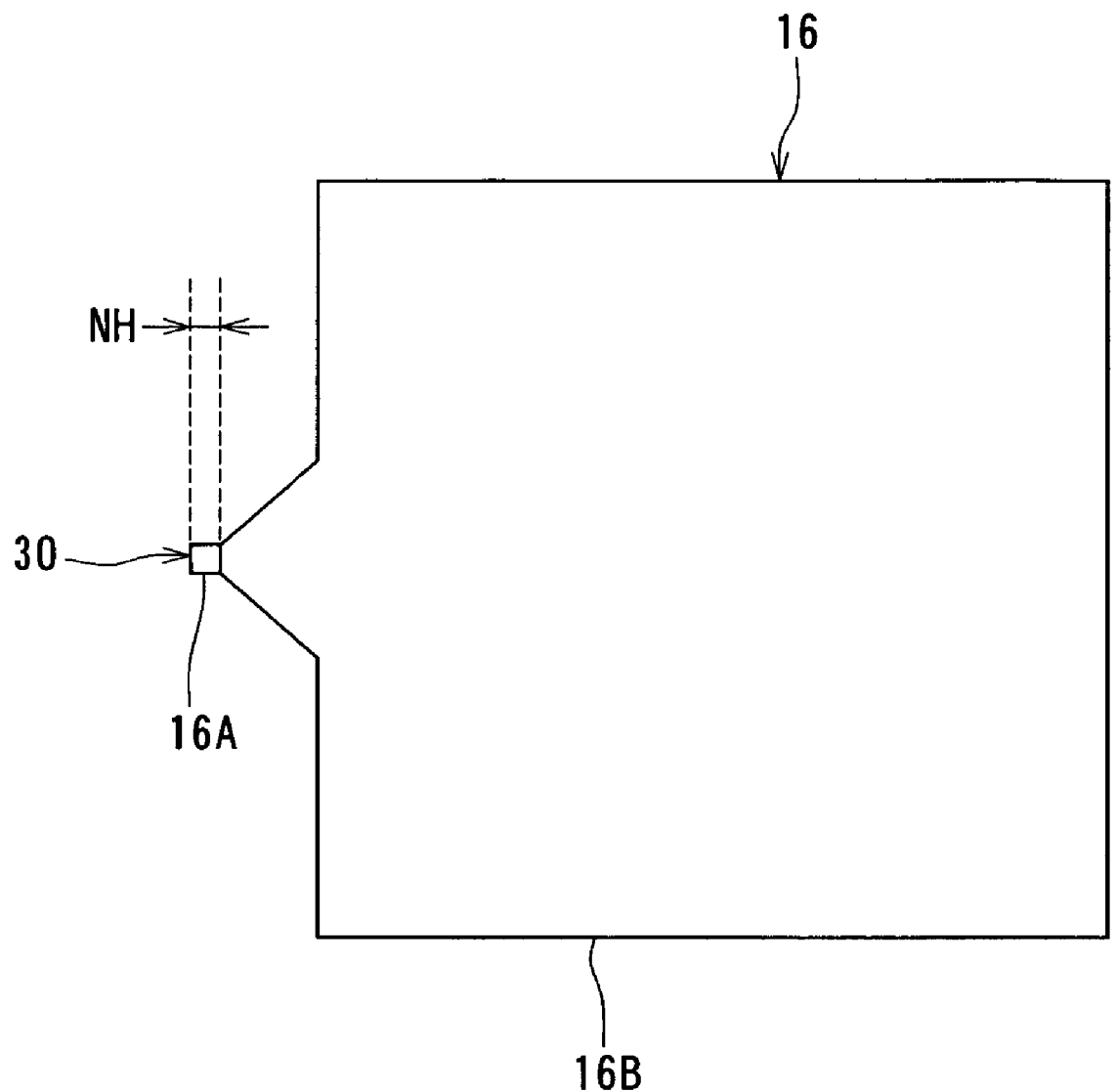
FIG. 4 is a top view of the pole layer of the magnetic head of the first embodiment of the invention.
Figure 5:
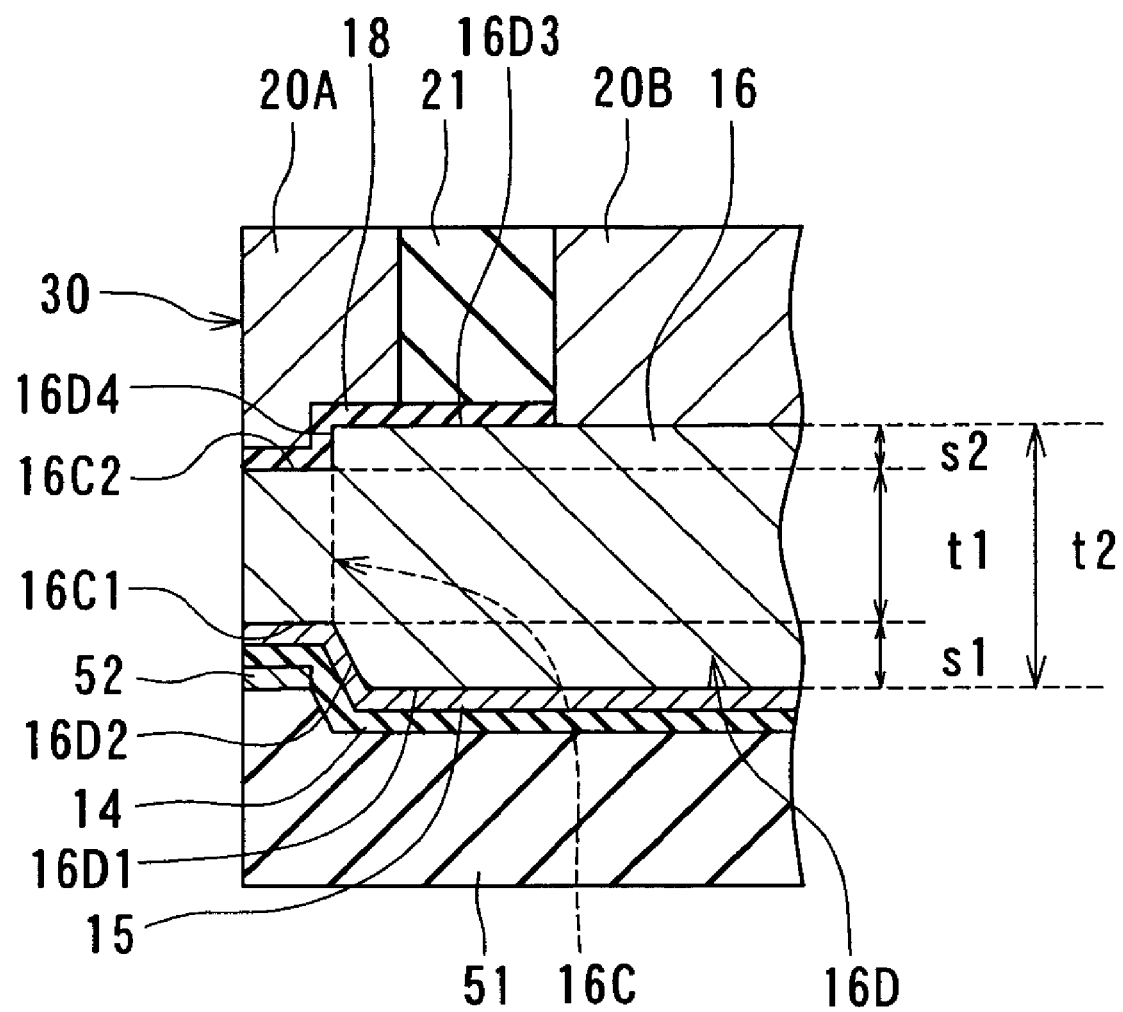
FIG. 5 is a cross-sectional view illustrating a portion of the pole layer of the magnetic head of the first embodiment of the invention in a neighborhood of the medium facing surface and illustrating a portion around this portion.

Reference is now made to FIG. 1, FIG. 4 and FIG. 5 to describe the shape of the pole layer 16 in detail. FIG. 1 is a perspective view of a portion of the pole layer 16 near the medium facing surface 30. FIG. 4 is a top view of the pole layer 16. FIG. 5 is a cross-sectional view illustrating the portion of the pole layer 16 near the medium facing surface 30 and a neighborhood thereof. As shown in FIG. 1 and FIG. 4, the pole layer 16 incorporates a track width defining portion 16A and a wide portion 16B. The track width defining portion 16A has an end face located in the medium facing surface 30. The wide portion 16B is located farther from the medium facing surface 30 than the track width defining portion 16A and has a width greater than the width of the track width defining portion 16A. The end face of the pole layer 16 located in the medium facing surface 30 has a side located away from the substrate 1, and this side defines the track width. The width of the track width defining portion 16A does not change in accordance with the distance from the medium facing surface 30. The wide portion 16B is equal in width to the track width defining portion 16A at the interface with the track width defining portion 16A, and gradually increases in width as the distance from the medium facing surface 30 increases and then maintains a specific width to the end of the wide portion 16B. Therefore, the maximum width of the wide portion 16B is greater than the track width. In the embodiment, the track width defining portion 16A is a portion of the pole layer 16 from the end face located in the medium facing surface 30 to the point at which the width of the pole layer 16 starts to increase. Here, the length of the track width defining portion 16A taken in the direction orthogonal to the medium facing surface 30 is called a neck height NH. The neck height NH falls within a range of 0.1 to 0.3 μm inclusive, for example.

As shown in FIG. 1 and FIG. 5, the pole layer 16 incorporates: a first portion 16C having the end face located in the medium facing surface 30; and a second portion 16D located farther from the medium facing surface 30 than the first portion 16C and having a thickness greater than that of the first portion 16C. A surface (the bottom surface) of the first portion 16C closer to the substrate 1 and a surface (the top surface) of the first portion 16C farther from the substrate 1 are parallel to each other. Therefore, the thickness of the first portion 16C does not change in accordance with the distance from the medium facing surface 30.

FIG. 1 and FIG. 5 illustrate an example in which the location of the boundary between the first portion 16C and the second portion 16D coincides with the location of the boundary between the track width defining portion 16A and the wide portion 16B. In this case, the first portion 16C coincides with the track width defining portion 16A, and the second portion 16D coincides with the wide portion 16B. However, the boundary between the first portion 16C and the second portion 16D may be located closer to or farther from the medium facing surface 30 than the boundary between the track width defining portion 16A and the wide portion 16B. The distance from the medium facing surface 30 to the boundary between the first portion 16C and the second portion 16D preferably falls within a range of 0.1 to 0.5 µm inclusive, for example. The example in which the location of the boundary between the first portion 16C and the second portion 16D coincides with the location of the boundary between the track width defining portion 16A and the wide portion 16B will now be described.

A surface (a bottom surface) 16C1 of the first portion 16C closer to the substrate 1 is located farther from the substrate 1 than a surface (a bottom surface) 16D1 of the second portion 16D closer to the substrate 1. The second portion 16D has a first front end face 16D2 that couples the surface 16C1 of the first portion 16C closer to the substrate 1 to the surface 16D1 of the second portion 16D closer to the substrate 1. The first front end face 16D2 may be nearly orthogonal to the top surface of the substrate 1. Here, the first front end face 16D2 nearly orthogonal to the top surface of the substrate 1 means that the first front end face 16D2 forms an angle that falls within a range of 80 to 90 degrees inclusive with respect to the top surface of the substrate 1. If the first front end face 16D2 forms an angle that is equal to or greater than 80 degrees and smaller than 90 degrees with respect to the top surface of the substrate 1, each of the angle formed between the surfaces 16C1 and 16D2 and the angle formed between the surfaces 16D1 and 16D2 is an obtuse angle. Alternatively, the first front end face 16D2 may be tilted with respect to the direction orthogonal to the top surface of the substrate 1 such that, in the region in which the first front end face 16D2 is located, the thickness of the pole layer 16 gradually increases as the distance from the medium facing surface 30 increases. In this case, the first front end face 16D2 preferably forms an angle that is equal to or greater than 30 degrees and smaller than 80 degrees with respect to the top surface of the substrate 1. FIG. 1 and FIG. 5 illustrate an example in which the first front end face 16D2 is tilted with respect to the direction orthogonal to the top surface of the substrate 1. The difference 's1' in level created between the surface 16C1 and the surface 16D1 preferably falls within a range of 0.05 to 0.30 µm inclusive.

A surface (a top surface) 16C2 of the first portion 16C farther from the substrate 1 is located closer to the substrate 1 than a surface (a top surface) 16D3 of the second portion 16D farther from the substrate 1. The second portion 16D has a second front end face 16D4 that couples the surface 16C2 of the first portion 16C farther from the substrate 1 to the surface 16D3 of the second portion 16D farther from the substrate 1. The second front end face 16D4 may be nearly orthogonal to the top surface of the substrate 1. Here, the second front end face 16D4 nearly orthogonal to the top surface of the substrate 1 means that the second front end face 16D4 forms an angle that falls within a range of 80 to 90 degrees inclusive with respect to the top surface of the substrate 1. If the front end face 16D4 forms an angle that is equal to or greater than 80 degrees and smaller than 90 degrees with respect to the top surface of the substrate 1, each of the angle formed between the surfaces 16C2 and 16D4 and the angle formed between the surfaces 16D3 and 16D4 is an obtuse angle. Alternatively, the second front end face 16D4 may be tilted with respect to the direction orthogonal to the top surface of the substrate 1 such that, in the region in which the second front end face 16D4 is located, the thickness of the pole layer 16 gradually increases as the distance from the medium facing surface 30 increases. In this case, the second front end face 16D4 preferably forms an angle that is equal to or greater than 30 degrees and smaller than 80 degrees with respect to the top surface of the substrate 1. FIG. 1 and FIG. 5 illustrate an example in which the second front end face 16D4 is nearly orthogonal to the top surface of the substrate 1. The difference 's2' in level created between the surface 16C2 and the surface 16D3 preferably falls within a range of 0.05 to 0.30 µm inclusive.

The thickness 't1' of the first portion 16C falls within a range of 0.10 to 0.30 µm inclusive, for example. The thickness 't2' of the second portion 16D falls within a range of 0.20 to 0.90 µm inclusive, for example. It is preferred that each of the differences in level s1 and s2 is smaller than the thickness t1 of the first portion 16C.

The shield layer 20 has a portion that is sandwiched between the second front end face 16D4 and the medium facing surface 30 and that is located in a region closer to the substrate 1 than the surface 16D3 of the second portion 16D farther from the substrate 1. To be specific, this portion is a portion of the first layer 20A closer to the substrate 1 than the surface 16D3.

FIG. 1, FIG. 3 and FIG. 5 illustrate an example in which the first layer 20A is located not only in a region above the first portion 16C of the pole layer 16 but also in a region above a portion of the second portion 16D. However, the first layer 20A may be located only in the region above the first portion 16C of the pole layer 16. In the example illustrated in FIG. 1, FIG. 3 and FIG. 5, the top surface of the pole layer 16 bends in the position of the boundary between the surfaces 16C2 and 16D4 and in the position of the boundary between the surfaces 16D4 and 16D3. The bottom surface of the first layer 20A bends to correspond to the shape of the top surface of the pole layer 16 so as to face toward the surfaces 16C2, 16D4 and 16D3 of the pole layer 16, the gap layer 18 being disposed between the bottom surface of the first layer 20A and the surfaces 16C2, 16D4 and 16D3. The gap layer 18 disposed between the top surface of the pole layer 16 and the bottom surface of the first layer 20A also bends to correspond to the shape of the top surface of the pole layer 16. In the embodiment, the throat height TH is the distance between the medium facing surface 30 and the point at which the gap layer 18 first bends when seen from the medium facing surface 30, that is, the distance between the medium facing surface 30 and the point at which the bottom surface of the first layer 20A first bends when seen from the medium facing surface 30. The reason will now be described. In the region from the medium facing surface 30 to the point at which the gap layer 18 first bends when seen from the medium facing surface 30, the flux leakage between the pole layer 16 and the shield layer 20 is greater, compared with the flux leakage between the pole layer 16 and the shield layer 20 in any other region.

Furthermore, it is the flux leakage between the pole layer 16 and the shield layer 20 in the region from the medium facing surface 30 to the point at which the gap layer 18 first bends when seen from the medium facing surface 30 that contributes to writing of data. Therefore, it is appropriate that the throat height TH is defined as the distance from the medium facing surface 30 to the point at which the gap layer 18 first bends when seen from the medium facing surface 30.

An end of the yoke layer 20B of the shield layer 20 closer to the medium facing surface 30 is located farther from the medium facing surface 30 than the boundary between the surfaces 16D3 and 16D4 of the pole layer 16.

As shown in FIG. 1, the end face of the pole layer 16 located in the medium facing surface 30 has: a first region 41; and a second region 42 that is located farther from the substrate 1 than the first region 41 and that is connected to the first region 41. In FIG. 1, a broken line indicates the boundary between the first region 41 and the second region 42.

The first region 41 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The width of the end face of the pole layer 16 located in the medium facing surface 30 decreases as the distance from the first side A1 decreases. Each of the third side A3 and the fourth side A4 forms an angle that falls within a range of 5 to 15 degrees inclusive, for example, with respect to the direction orthogonal to the top surface of the substrate 1.

The second region 42 has a uniform width that is equal to the length of the second side A2 and that defines the track width. Two sides of the second region 42 opposed to each other in the direction of width are orthogonal to the top surface of the substrate 1. In the medium facing surface 30, the nonmagnetic metal layer 13 exists on both sides of the second region 42 opposed to each other in the direction of track width. The second region 42 has a thickness that falls within a range of 20 to 100 nm inclusive, for example, which is the same as the thickness of the nonmagnetic metal layer 13. The width of the second region 42, that is, the track width, falls within a range of 0.05 to 0.20 µm inclusive, for example.

The gap layer 18 touches the surface 16C2 of the first portion 16C farther from the substrate 1, the second front end face 16D4, and the surface 16D3 of the second portion 16D farther from the substrate 1.

Reference is now made to FIG. 6A to FIG. 15A, FIG. 6B to FIG. 15B, and FIG. 16 to describe a method of manufacturing the magnetic head of the embodiment. FIG. 6A to FIG. 15A are cross-sectional views of layered structures obtained in manufacturing process of the magnetic head, the cross sections being orthogonal to the medium facing surface and the substrate. FIG. 6B to FIG. 15B are cross-sectional views of portions of the layered structures near the medium facing surface, the cross sections being parallel to the medium facing surface. The portions closer to the substrate 1 than the first encasing layer 51 are omitted in FIG. 6A to FIG. 15A and FIG. 6B to FIG. 15B. FIG. 16 is a view for illustrating the encasing groove and a mask for forming the encasing groove.

According to the method of manufacturing the magnetic head of the embodiment, as shown in FIG. 3, the insulating layer 2, the bottom shield layer 3 and the bottom shield gap film 4 are first formed one by one on the substrate 1. Next, the MR element 5 and leads (not shown) connected to the MR element 5 are formed on the bottom shield gap film 4. Next, the top shield gap film 6 is formed to cover the MR element 5 and the leads. Next, the first top shield layer 7, the nonmagnetic layer 81, the second top shield layer 82, and the insulating layer 83 are formed one by one on the top shield gap film 6. Next, the coil 9 and the insulating layers 10 and 11 are formed on the insulating layer 83. Next, the top surfaces of the coil 9 and the insulating layers 10 and 11 are flattened by CMP, for example.

FIG. 6A and FIG. 6B illustrate the following step. In the step, first, a nonmagnetic layer 51P is formed on the flattened top surfaces of the coil 9 and the insulating layers 10 and 11. The groove 51a will be formed in the nonmagnetic layer 51P later and the nonmagnetic layer 51P will be thereby formed into the first encasing layer 51. The nonmagnetic layer 51P corresponds to the first nonmagnetic layer of the invention. Next, the etching stopper layer 52 is formed by sputtering, for example, on the nonmagnetic layer 51P. Next, a photoresist layer having a thickness of 1.0 µm, for example, is formed on the etching stopper layer 52. The photoresist layer is then patterned to form a mask 53 for patterning the etching stopper layer 52.

FIG. 7A and FIG. 7B illustrate the following step. In the step, first, the etching stopper layer 52 is selectively etched, using the mask 53. The etching stopper layer 52 patterned through this etching extends from the medium facing surface 30 to a point located at a specific distance, such as 0.1 to 0.3 µm, from the medium facing surface 30. That is, the etching stopper layer 52 is disposed in a region on the nonmagnetic layer 51P that faces toward one of surfaces of the first portion 16C of the pole layer 16 that will be formed later, the one of the surfaces being closer to the substrate 1. Next, a nonmagnetic layer 12P is formed on the entire top surface of the layered structure. The groove 12a will be formed in the nonmagnetic layer 12P later and the nonmagnetic layer 12P will be thereby formed into the second encasing layer 12. The nonmagnetic layer 12P corresponds to the second nonmagnetic layer of the invention.

Figures 8A, 8B:
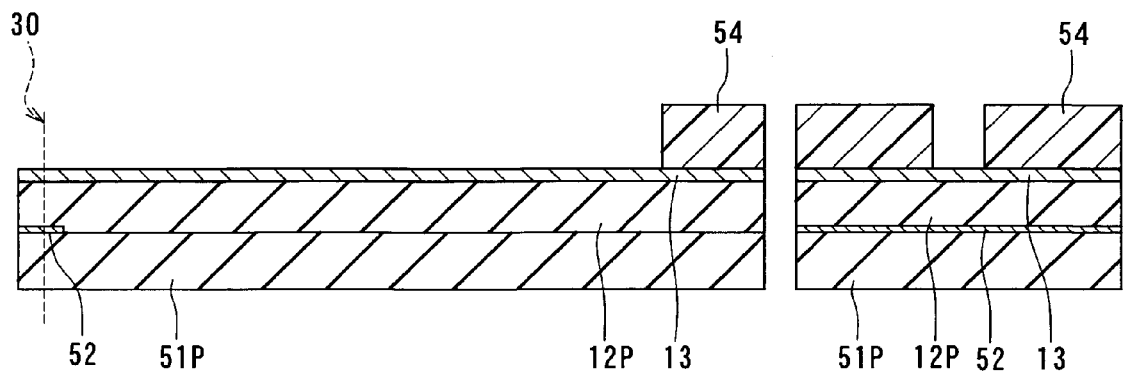
FIG. 8A and FIG. 8B are views for illustrating a step that follows the step shown in FIG. 7A and FIG. 7B.

FIG. 8A and FIG. 8B illustrate the following step. In the step, first, the nonmagnetic metal layer 13 is formed by sputtering, for example, on the nonmagnetic layer 12P. The thickness of the nonmagnetic metal layer 13 at this time falls within a range of 20 to 100 nm, for example.

Next, a photoresist layer having a thickness of 1.0 µm, for example, is formed on the nonmagnetic metal layer 13. The photoresist layer is then patterned to form a mask 54 for making the encasing groove 55. The mask 54 has an opening that has a shape corresponding to the encasing groove 55.

Figures 9A, 9B:
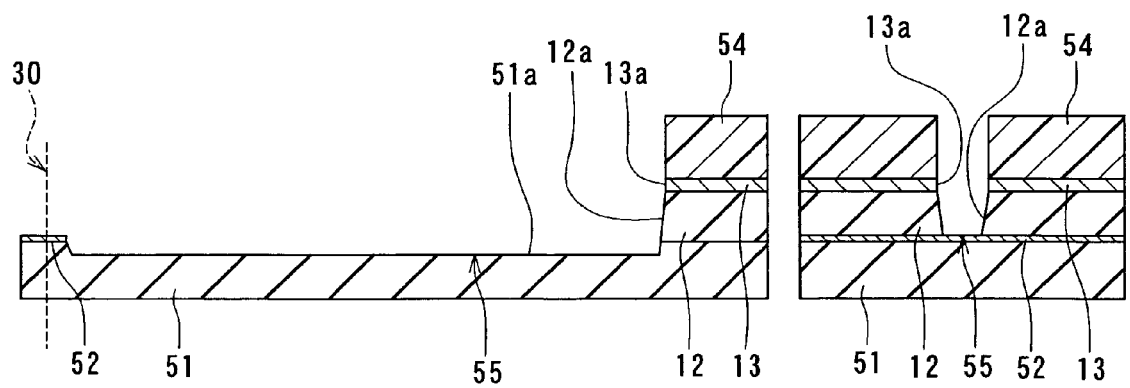
FIG. 9A and FIG. 9B are views for illustrating a step that follows the step shown in FIG. 8A and FIG. 8B.

FIG. 9A and FIG. 9B illustrate the following step. In the step, first, a portion of the nonmagnetic metal layer 13 is etched, using the mask 54. The opening 13a that penetrates is thereby formed in the nonmagnetic metal layer 13. The opening 13a has a shape corresponding to the plane geometry of the pole layer 16 to be formed later. Furthermore, a portion of the nonmagnetic layer 12P exposed from the opening 13a of the nonmagnetic metal layer 13 is selectively etched so as to form the groove 12a in the nonmagnetic layer 12P. The groove 12a penetrates the nonmagnetic layer 12P. Furthermore, a portion of the nonmagnetic layer 51P exposed from the groove 12a is selectively etched so as to form the groove 51a in the nonmagnetic layer 51P. The etching stopper layer 52 has a function of stopping the above-mentioned etching. Therefore, a portion of the nonmagnetic layer 51P located below the etching stopper layer 52 will not be etched. As a result, a difference in level is created between the top surface of the etching stopper layer 52 and the bottom of the groove 51a. Next, the mask 54 is removed. The nonmagnetic layer 12P is formed into the second encasing layer 12 by forming the groove 12a therein. The nonmagnetic layer 51P is formed into the first encasing layer 51 by forming the groove 51a therein. In addition, the encasing groove 55 is made up of the grooves 51a and 12a and the opening 13a. The bottom of the encasing groove 55 includes a portion that faces toward the one of the surfaces of the first portion 16C of the pole layer 16 that will be formed later, the one of the surfaces being closer to the substrate 1. This portion of the bottom of the encasing groove 55 is formed of the top surface of the etching stopper layer 52. The etching stopper layer 52 corresponds to the bottom forming layer of the invention. The bottom of the encasing groove 55 includes a portion that faces toward one of surfaces of the second portion 16D of the pole layer 16 that will be formed later, the one of the surfaces being closer to the substrate 1. This portion of the bottom of the encasing groove 55 is formed in the first encasing layer 51. The nonmagnetic metal layer 13 will be the reference that indicates the level at which etching to be performed later for forming the surfaces 16C2, 16D3 and 16D4 of the pole layer 16 is stopped. The edge of the opening 13a of the nonmagnetic metal layer 13 is located directly above the edge of the groove 12a located in the top surface of the second encasing layer 12.

The etching of each of the nonmagnetic metal layer 13, the nonmagnetic layer 12P and the nonmagnetic layer 51P is performed by reactive ion etching or ion beam etching, for example. If reactive ion etching is employed, it is preferable to use an etching gas containing a first gas that contains chlorine (Cl) or bromin (Br) and a second gas that contains fluorine (F). The first gas includes any of $BCl_3$, $Cl_2$, $BBr_3$ and HCl, for example. The second gas includes any of $CF_4$, $C_2F_6$, $SF_6$ and $CHF_3$, for example. The etching for forming the groove 12a in the nonmagnetic layer 12P is performed such that the walls of the groove 12a corresponding to both sides of the track width defining portion 16A of the pole layer 16 each form an angle that falls within a range of 5 to 15 degrees inclusive, for example, with respect to the direction orthogonal to the top surface of the substrate 1.

FIG. 16 shows a top view illustrating the plane geometries of the mask 54 and the encasing groove 55 and a cross-sectional view illustrating the mask 54 and the encasing groove 55 in relation to each other.

FIG. 10A and FIG. 10B illustrate the following step. In the step, first, the nonmagnetic film 14 is formed on the entire top surface of the layered structure. The nonmagnetic film 14 is formed in the encasing groove 55, too. The nonmagnetic film 14 is formed by sputtering or chemical vapor deposition (hereinafter referred to as CVD), for example. It is possible to control the thickness of the nonmagnetic film 14 with precision. If the nonmagnetic film 14 is formed by CVD, it is preferred to employ a method called 'atomic layer CVD' (ALCVD) in which formation of a single atomic layer is repeated. In this case, it is possible to control the thickness of the nonmagnetic film 14 with higher precision. When ALCVD is employed to form the nonmagnetic film 14, it is preferred to use alumina, in particular, as the material of the nonmagnetic film 14. If the nonmagnetic film 14 is made of a semiconductor material, it is preferred to form the nonmagnetic film 14 by ALCVD at a low temperature (around 200° C.) or by low-pressure CVD at a low temperature. The semiconductor material as the material of the nonmagnetic film 14 is preferably undoped polycrystalline silicon or amorphous silicon.

Next, the polishing stopper layer 15 is formed on the entire top surface of the layered structure by sputtering or ALCVD, for example. The polishing stopper layer 15 is formed in the encasing groove 55, too. The polishing stopper layer 15 indicates the level at which polishing of the polishing step to be performed later is stopped.

FIG. 11A and FIG. 11B illustrate the following step. In the step, first, a magnetic layer 16P to be the pole layer 16 is formed on the polishing stopper layer 15. The magnetic layer 16P is formed such that the top surface thereof is located higher than the top surfaces of the nonmagnetic metal layer 13, the nonmagnetic film 14 and the polishing stopper layer 15. The magnetic layer 16P is formed by frame plating, for example. Alternatively, the magnetic layer 16P may be formed through making an unpatterned plating layer and then patterning this plating layer by etching. Before plating, a seed layer made of a magnetic material may be formed on the polishing stopper layer 15. This seed layer is used as an electrode for plating. If the seed layer is formed, the seed layer will be a first layer of the pole layer 16 and the plating layer will be a second layer of the pole layer later. If the polishing stopper layer 15 is made of a conductive material, the layer 15 is used as an electrode for plating, too. If the polishing stopper layer 15 is used as the electrode for plating, it is not absolutely necessary to provide the seed layer.

Figures 12A, 12B:
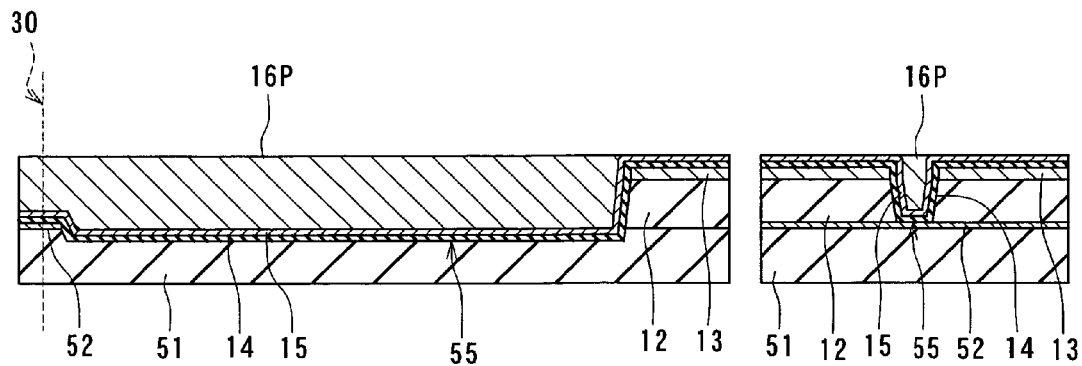
FIG. 12A and FIG. 12B are views for illustrating a step that follows the step shown in FIG. 1A and FIG. 11B.

FIG. 12A and FIG. 12B illustrate the following step. In the step, first, if the seed layer is provided, the seed layer except a portion below the plating layer is removed by ion beam etching, for example. Next, a coating layer not shown made of alumina, for example, and having a thickness of 0.5 to 1.2 μm, for example, is formed on the entire top surface of the layered structure. Next, the coating layer and the magnetic layer 16P are polished by CMP, for example, so that the polishing stopper layer 15 is exposed, and the top surfaces of the polishing stopper layer 15 and the magnetic layer 16P are thereby flattened. If the coating layer and the magnetic layer 16P are polished by CMP, such a slurry is used that polishing is stopped when the polishing stopper layer 15 is exposed, such as an alumina-base slurry.

Figures 13A, 13B:
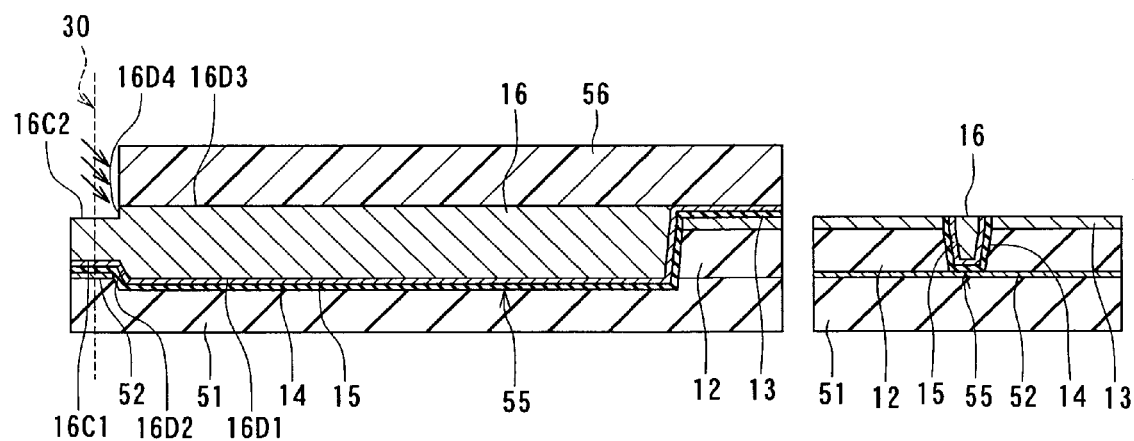
FIG. 13A and FIG. 13B are views for illustrating a step that follows the step shown in FIG. 12A and FIG. 12B.

FIG. 13A and FIG. 13B illustrate the following step. In the step, first, a photoresist layer having a thickness of 1.0 μm, for example, is formed on the entire top surface of the layered structure. The photoresist layer is then patterned to form a mask 56 for etching a portion of the magnetic layer 16P. The mask 56 covers the top surface of the magnetic layer 16P except the regions in which the surface 16C2 and the second front end face 16D4 will be formed. The distance between the medium facing surface 30 and an end of the mask 56 closer to the medium facing surface 30 falls within a range of 0.1 to 0.5 μm inclusive, for example. Next, the portion of the magnetic layer 16P is etched by ion beam etching, for example, using the mask 56. As a result, the surfaces 16C2 and 16D3 and the second front end face 16D4 are formed in the top surfaces of the magnetic layer 16P, and the magnetic layer 16P is thereby formed into the pole layer 16. When the portion of the magnetic layer 16P is etched by ion beam etching, the direction in which ion beams move should form an angle that falls within a range of 40 to 55 degrees inclusive, for example, with respect to the direction orthogonal to the top surface of the substrate 1. It is thereby possible that the second front end face 16D4 forms an angle that falls within a range of 80 to 90 degrees inclusive with respect to the top surface of the substrate 1. In addition, this etching is performed such that one of the sides of the end face of the pole layer 16 located in the medium facing surface 30, the one of the sides being farther from the substrate 1, is disposed at a height that falls within the range between the height at which the top surface of the nonmagnetic metal layer 13 as initially formed is located and the height at which the bottom surface thereof is located. Therefore, the nonmagnetic metal layer 13 serves as the reference that indicates the level at which this etching is stopped. The portion of the magnetic layer 16P is etched in the manner thus described, so that each of the track width and the thickness of the pole layer 16 taken in the medium facing surface 30 is controlled to be nearly uniform. It is thereby possible to control the thickness of the pole layer 16 and the track width with precision. Next, the mask 56 is removed.

The surfaces 16C1 and 16D1 and the first front end face 16D2 are formed in the bottom surface of the pole layer 16. The surface 16C1 is located above the etching stopper layer 52. The surface 16D1 is located above the bottom of the groove 51a formed in the first encasing layer 51. The front end face 16D2 is located in a region that faces toward one of sidewalls of the groove 51a closer to the medium facing surface 30.

Figures 14A, 14B:
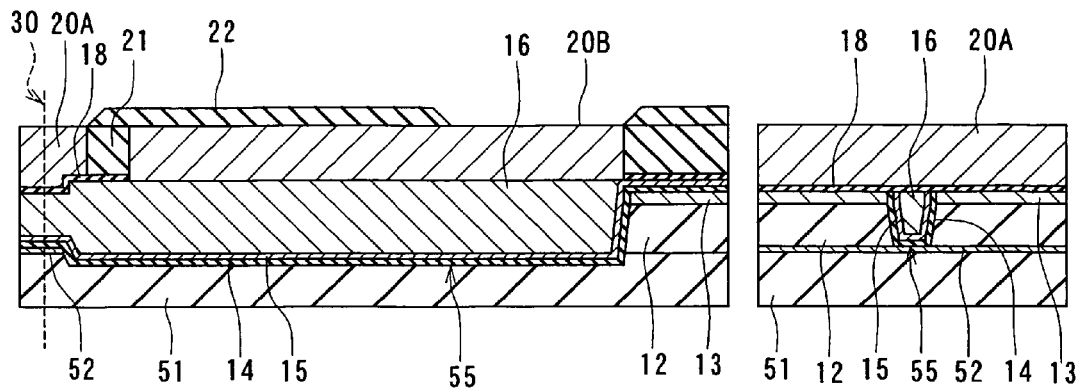
FIG. 14A and FIG. 14B are views for illustrating a step that follows the step shown in FIG. 13A and FIG. 13B.

FIG. 14A and FIG. 14B illustrate the following step. In the step, first, the gap layer 18 is formed on the entire top surface of the layered structure. The gap layer 18 is formed by sputtering or CVD, for example. If the gap layer 18 is formed by CVD, it is preferred to employ ALCVD. If the gap layer 18 is formed by ALCVD, it is preferred that the gap layer 18 is made of alumina. The gap layer 18 formed by ALCVD exhibits a good step coverage. Therefore, it is possible to form the gap layer 18 that is uniform on the uneven pole layer 16 by forming the gap layer 18 by ALCVD.

Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. The first layer 20A and the yoke layer 20B may be formed by frame plating or by making a magnetic layer through sputtering and then selectively etching the magnetic layer. Selective etching of the magnetic layer may be performed by, for example, making an alumina layer on the magnetic layer, making a mask on the alumina layer by frame plating, and etching the alumina layer and the magnetic layer using the mask. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened. Next, the insulating layer 22 is formed on regions of the top surfaces of the yoke layer 20B and the nonmagnetic layer 21 on which the coil 23 is to be disposed.

Figures 15A, 15B:
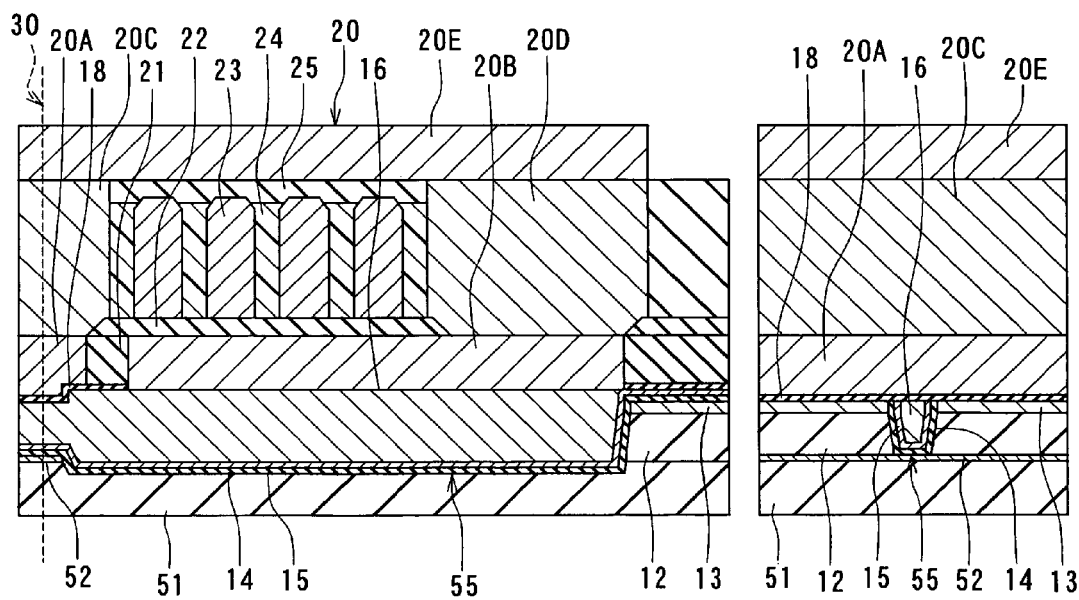
FIG. 15A and FIG. 15B are views for illustrating a step that follows the step shown in FIG. 14A and FIG. 14B.
Figure 16:
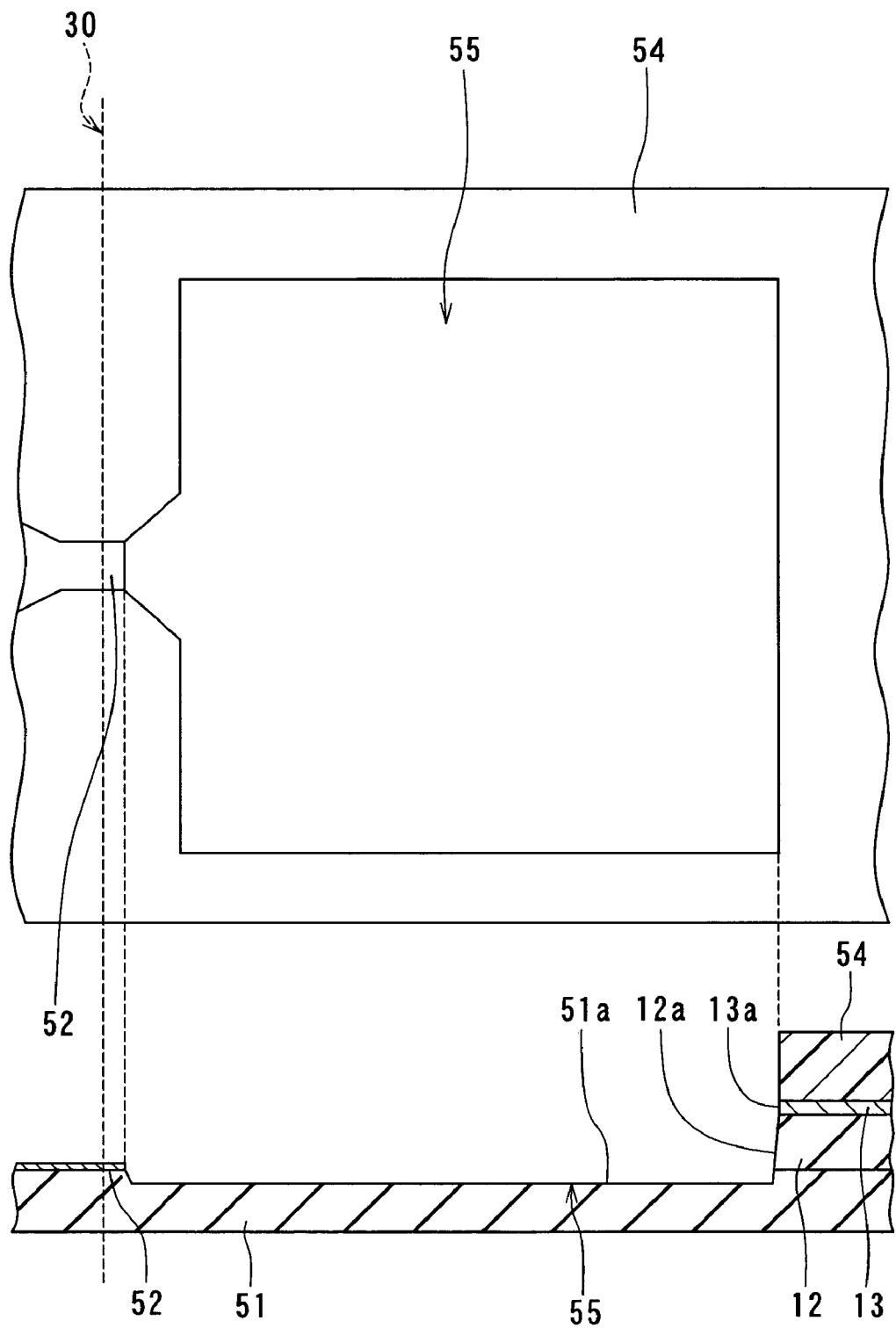
FIG. 16 illustrates an encasing groove of the magnetic head of the first embodiment of the invention and a mask for forming the encasing groove.

FIG. 15A and FIG. 15B illustrate the following step. In the step, first, the coil 23 is formed by frame plating, for example, on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 having a thickness of 4 to 4.5 μm, for example, is formed on the entire top surface of the layered structure. Next, the insulating layer 25 is polished by CMP, for example, so that the second layer 20C and the coupling layer 20D are exposed, and the top surfaces of the second layer 20C, the coupling layer 20D and the insulating layer 25 are thereby flattened. Next, the third layer 20E is formed by frame plating, for example, to complete the shield layer 20.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

The operation and effects of the magnetic head of the embodiment will now be described. The magnetic head writes data on a recording medium by using the write head and reads data written on the recording medium by using the read head. In the write head, the coil 23 generates a magnetic field that corresponds to the data to be written on the medium. The pole layer 16 and the shield layer 20 form a magnetic path through which a magnetic flux corresponding to the magnetic field generated by the coil 23 passes. The pole layer 16 allows the flux corresponding to the field generated by the coil 23 to pass and generates a write magnetic field used for writing the data on the medium through the use of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is disposed forward of the end face of the pole layer 16 along the direction T of travel of the recording medium (that is, on the air-outflow-end side of the slider) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent a direction of magnetization of the bit pattern already written on the medium from being changed due to the effect of the above-mentioned flux. According to the embodiment, an improvement in linear recording density is thus achieved.

According to the embodiment, as shown in FIG. 1, the end face of the pole layer 16 located in the medium facing surface 30 has a width that decreases as the distance from the first side A1 decreases. It is thereby possible to prevent the problems resulting from the skew.

According to the embodiment, the pole layer 16 incorporates the first portion 16C and the second portion 16D. The first portion 16C has the end face located in the medium facing surface 30, and has a thickness that does not change in accordance with the distance from the medium facing surface 30. The second portion 16D is located farther from the medium facing surface 30 than the first portion 16C and has a thickness greater than that of the first portion 16C. As a result, according to the embodiment, it is possible to introduce a magnetic flux of great magnitude to the medium facing surface 30 through the pole layer 16 while the thickness of the pole layer 16 taken in the medium facing surface 30 is reduced. It is thereby possible to achieve a sufficient overwrite property. To improve the overwrite property, it is preferred that the distance from the medium facing surface 30 to the boundary between the first portion 16C and the second portion 16D is small to some extent. Therefore, it is preferred that this distance falls within a range of 0.1 to 0.5 µm inclusive, for example.

According to the embodiment, the surface 16C1 (the bottom surface) of the first portion 16C closer to the substrate 1 is located farther from the substrate 1 than the surface 16D1 (the bottom surface) of the second portion 16D closer to the substrate 1. The surface 16C2 (the top surface) of the first portion 16C farther from the substrate 1 is located closer to the substrate 1 than the surface 16D3 (the top surface) of the second portion 16D farther from the substrate 1. That is, according to the embodiment, a stepped portion is created in each of the top and bottom surfaces of the pole layer 16 such that the thickness of the pole layer 16 decreases as the distance from the medium facing surface 30 decreases. If a stepped portion is formed only in one of the top and bottom surfaces of the pole layer 16, it is required to increase the difference in level in the stepped portion to some extent so as to introduce a magnetic flux of great magnitude to the medium facing surface 30 through the pole layer 16 while the thickness of the pole layer 16 taken in the medium facing surface 30 is reduced. However, it is thereby likely that flux leakage from the pole layer 16 occurs near the stepped portion. If the flux leaking from the pole layer 16 reaches the medium facing surface 30 and further leaks to the outside from the medium facing surface 30, the effective track width is increased and problems resulting from the skew arise. According to the embodiment, in contrast, the stepped portions are formed in both of the top and bottom surfaces of the pole layer 16. Consequently, it is possible to make the difference in level in each of the stepped portions smaller, compared with the case in which the stepped portion is formed only in one of the top and bottom surfaces of the pole layer 16. As a result, according to the embodiment, it is possible to more effectively introduce a magnetic flux of great magnitude to the medium facing surface 30 through the pole layer 16 while the thickness of the pole layer 16 taken in the medium facing surface 30 is reduced, compared with the case in which the stepped portion is formed only in one of the top and bottom surfaces of the pole layer 16.

To prevent flux leakage from the pole layer 16 in a neighborhood of the stepped portion of each of the top and bottom surfaces of the pole layer 16, it is preferred that the difference in level 's1' of the bottom surface of the pole layer 16 and the difference in level 's2' of the top surface of the pole layer 16 are not very large. Therefore, each of the differences in level s1 and s2 preferably falls within a range of 0.05 to 0.3 µm inclusive, for example.

The pole layer 16 incorporates the track width defining portion 16A and the wide portion 16B. The track width defining portion 16A has the end face located in the medium facing surface 30. The wide portion 16B is located farther from the medium facing surface 30 than the track width defining portion 16A and has a width greater than the width of the track width defining portion 16A. As a result, according to the embodiment, both side surfaces of the pole layer 16 that are opposed to each other in the direction of track width are bent such that the width of the pole layer 16 decreases as the distance from the medium facing surface 30 decreases.

According to the embodiment as thus described, the four surfaces of the pole layer 16 including the top and bottom surfaces and the side surfaces opposed to each other in the direction of track width are bent such that the cross-sectional area of the magnetic path of the pole layer 16 decreases as the distance from the medium facing surface 30 decreases.

As a result, according to the embodiment, it is possible to effectively introduce a magnetic flux of great magnitude to the medium facing surface 30 through the pole layer 16 while the thickness of the pole layer 16 taken in the medium facing surface 30 is reduced. In addition, according to the embodiment, it is possible to increase components in the direction orthogonal to the medium facing surface 30 among components of the write magnetic field generated from the end face of the pole layer 16 located in the medium facing surface 30. It is thereby possible to improve the overwrite property.

According to the embodiment, the encasing groove 55 is formed in advance wherein the encasing groove 55 has the bottom having a shape corresponding to the shape of the bottom surface of the pole layer 16 and has the sidewalls having shapes corresponding to the shapes of the side surfaces of the pole layer 16. The pole layer 16 is then formed such that at least a portion thereof is placed in the encasing groove 55. As a result, according to the embodiment, it is possible to form the pole layer 16 having the bending bottom surface and sidewalls with precision. According to the embodiment, it is possible to form the bottom surface of the pole layer 16 with precision even if the difference in level s1 of the stepped portion of the bottom surface of the pole layer 16 is small. If the pole layer 16 is divided into two upper and lower portions at the level of the height of the surface 16C1 and these two portions are formed of separate layers, it is difficult to make the lower layer thin. It is therefore difficult to reduce the difference in level s1, too.

According to the embodiment, the etching stopper layer 52 is provided in advance between the nonmagnetic layer 51P to be the first encasing layer 51 and the nonmagnetic layer 12P to be the second encasing layer 12. The nonmagnetic metal layer 13, the nonmagnetic layer 12P and the nonmagnetic layer 51P are then etched through the use of the single mask 54 so as to form the encasing groove 55 having the stepped portion in the bottom. According to the embodiment, it is thereby possible to define the location of the boundary between the first portion 16C and the second portion 16D of the pole layer 16 with precision.

According to the embodiment, the surface (the top surface) 16C2 of the first portion 16C farther from the substrate 1 is located closer to the substrate 1 than the surface (the top surface) 16D3 of the second portion 16D farther from the substrate 1. The end face of the pole layer 16 located in the medium facing surface 30 has the first region 41 and the second region 42 that is located farther from the substrate 1 than the first region 41 and that is connected to the first region 41. The second region 42 has a uniform width that defines the track width. The surface 16D3 of the second portion 16D farther from the substrate 1 is formed by polishing such as CMP. The surface 16C2 of the first portion 16C farther from the substrate 1 is formed by etching such as ion beam etching. Etching for forming the surface 16C2 is performed only on a portion of the magnetic layer 16P near the medium facing surface 30 after the top surface of the magnetic layer 16P is flattened by CMP, for example. It is thereby possible to perform this etching with precision. Therefore, according to the embodiment, it is possible to control the thickness of the first portion 16C, that is, the thickness of the pole layer 16 taken in the medium facing surface 30, with precision. Furthermore, it is thereby possible to control the track width with precision.

According to the embodiment, in particular, etching of the portion of the magnetic layer 16P is performed such that the one of the sides of the end face of the pole layer 16 located in the medium facing surface 30, the one of the sides being farther from the substrate 1, is disposed at a height that falls within the range between the height at which the top surface of the nonmagnetic metal layer 13 as initially formed is located and the height at which the bottom surface thereof is located. In this case, the track width remains the same, regardless of the location of the one of the sides of the end face of the pole layer 16 located in the medium facing surface 30 within the range between the height at which the top surface of the nonmagnetic metal layer 13 as initially formed is located and the height at which the bottom surface thereof is located.

Furthermore, the rate at which the magnetic layer 16P made of a magnetic metal material is etched and the rate at which the nonmagnetic metal layer 13 made of a nonmagnetic metal material is etched are nearly equal. Therefore, according to the embodiment, it is possible to etch the top surfaces of the magnetic layer 16P and the nonmagnetic metal layer 13 with precision. It is thereby possible to control the thickness of the pole layer 16 taken in the medium facing surface 30 with precision.

The foregoing features of the embodiment make it possible to form the pole layer 16 with precision that is capable of preventing the problems resulting from the skew and capable of introducing a magnetic flux of great magnitude to the medium facing surface 30.

According to the embodiment, the throat height TH is not defined by the end of the first layer 20A farther from the medium facing surface 30 but by the point at which the gap layer 18 first bends when seen from the medium facing surface 30, that is, the point at which the bottom surface of the first layer 20A first bends when seen from the medium facing surface 30. As a result, it is possible to reduce the throat height TH while the volume of the first layer 20A is sufficiently increased. It is thereby possible to improve the overwrite property.

Flux leakage from the pole layer 16 is likely to occur in a neighborhood of the second front end face 16D4 since the thickness of the pole layer 16 changes therein. If this leakage flux reaches the medium facing surface 30 and further leaks to the outside from the medium facing surface 30, the effective track width will increase and/or the problems resulting from the skew will occur. According to the embodiment, the shield layer 20 has the portion located between the second front end face 16D4 and the medium facing surface 30 in the region closer to the substrate 1 than the surface 16D3 of the second portion 16D of the pole layer 16 farther from the substrate 1. Therefore, the flux leaking from the neighborhood of the second front end face 16D4 of the pole layer 16 is taken in by the shield layer 20. It is thereby possible that the flux leaking from somewhere in the middle of the pole layer 16 is prevented from leaking to the outside from the medium facing surface 30.

According to the embodiment, the magnetic head comprises the yoke layer 20B that touches the surface of the second portion 16D of the pole layer 16 farther from the substrate 1. An end of the yoke layer 20B closer to the medium facing surface 30 is located farther from the medium facing surface 30 than the location of the boundary between the surfaces 16D3 and 16D4 of the pole layer 16. Therefore, a magnetic layer made up of a combination of the pole layer 16 and the yoke layer 20B being considered, the thickness of this magnetic layer is reduced by two steps as the distance from the medium facing surface 30 decreases. As a result, it is possible to introduce a magnetic flux of great magnitude to the medium facing surface 30 while preventing saturation of flux halfway through the magnetic layer.

In a magnetic head for perpendicular magnetic recording, it is known that there sometimes occurs a phenomenon in which data stored on a recording medium is erased by a magnetic field produced by the pole layer due to residual magnetization of the pole layer except when writing is performed, which is hereinafter called a pole erase phenomenon. The cause of the pole erase phenomenon will now be briefly described. Typically, the pole layer is magnetized such that the directions of magnetization are parallel to the medium facing surface in a majority of regions (magnetic domains) of the pole layer except when writing is performed. However, in the track with defining portion of the pole layer, it is likely that the directions of residual magnetization are orthogonal to the medium facing surface except when writing is performed. Data stored on the recording medium is then erased by a magnetic field produced by the pole layer due to residual magnetization in the direction orthogonal to the medium facing surface. The likelihood of the pole erase phenomenon depends on the shape of a portion of the pole layer near the medium facing surface. For example, the smaller the track width or the greater the neck height, the more likely it is that the pole erase phenomenon occurs.

In the embodiment, the top and bottom surfaces of the pole layer 16 bend in the neighborhood of the medium facing surface 30. In the neighborhood of the top and bottom surfaces of the pole layer 16, magnetization in the pole layer 16 tends to be directed to the direction parallel to the top or bottom surface. According to the embodiment, it is thereby possible to suppress generation of residual magnetization in the direction orthogonal to the medium facing surface 30 in a portion of the pole layer 16 near the medium facing surface 30 except when writing is performed. As a result, it is possible to suppress the occurrence of the pole erase phenomenon. If the pole layer 16 is formed by plating, the directions of crystal axes in the pole layer 16 are made uneven in a neighborhood of the stepped portion of the bottom surface of the pole layer 16. This also contributes to suppression of generation of residual magnetization in the direction orthogonal to the medium facing surface 30 in the portion of the pole layer 16 near the medium facing surface 30 except when writing is performed.

To suppress the occurrence of the pole erase phenomenon, it is preferred that the distance from the medium facing surface 30 to the boundary between the first portion 16C and the second portion 16D is small to some extent. In this regard, too, it is preferred that this distance falls within a range of 0.1 to 0.5 µm inclusive, as mentioned above.

If the difference in level s1 of the bottom surface of the pole layer 16 and the difference in level s2 of the top surface of the pole layer 16 are too large, the magnetic domains are divided in a neighborhood of each of the stepped portions and it is likely that residual magnetization in the direction orthogonal to the medium facing surface 30 is produced in the first portion 16C except when writing is performed. Therefore, it is preferred that the differences in level s1 and s2 are not very large. In this regard, too, it is preferred that each of the differences in level s1 and s2 fall within a range of 0.05 to 0.3 µm inclusive, as mentioned above.

According to the embodiment, the pole layer 16 is disposed in the encasing groove 55 with the nonmagnetic film 14 and the polishing stopper layer 15 disposed between the pole layer 16 and the encasing groove 55. Consequently, the pole layer 16 is smaller than the encasing groove 55 in width. It is thereby possible to easily form the encasing groove 55 and to easily reduce the width of the pole layer 16 and the width of the top surface of the track width defining portion 16A that defines the track width, in particular. As a result, according to the embodiment, it is possible to easily implement the track width that is smaller than the minimum track width that can be formed by photolithography and to control the track width with accuracy.

MODIFICATION EXAMPLES

Figure 17:
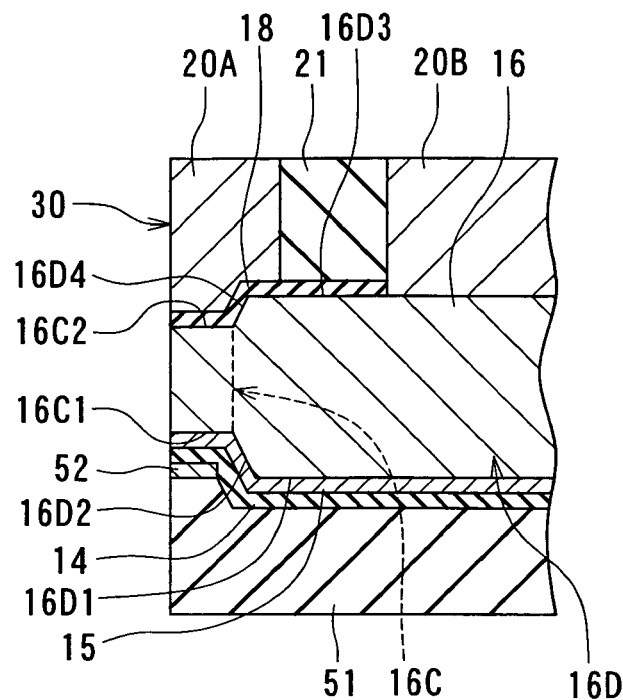
FIG. 17 is a cross-sectional view illustrating a first modification example of the magnetic head of the first embodiment of the invention.

First to fourth modification examples of the embodiment will now be described. FIG. 17 is a cross-sectional view illustrating a portion of the pole layer 16 near the medium facing surface 30 and a portion around this portion of a magnetic head of the first modification example. In the first modification example, the second front end face 16D4 of the pole layer 16 is tilted with respect to the direction orthogonal to the top surface of the substrate 1 such that the thickness of the pole layer 16 gradually increases as the distance from the medium facing surface 30 increases in the region in which the front end face 16D4 is located. The second front end face 16D4 preferably forms an angle that is equal to or greater than 30 degrees and smaller than 80 degrees with respect to the top surface of the substrate 1. In the first modification example, when a portion of the magnetic layer 16P is etched by ion beam etching to form the surfaces 16C2 and 16D4, the direction in which ion beams move forms an angle of 75 degrees, for example, with respect to the direction orthogonal to the top surface of the substrate 1. In this case, the second front end face 16D4 forms an angle of approximately 45 degrees with respect to the top surface of the substrate 1. The remainder of configuration, function and effects of the first modification example are similar to those of the magnetic head illustrated in FIG. 1 to FIG. 5.

Figure 18:
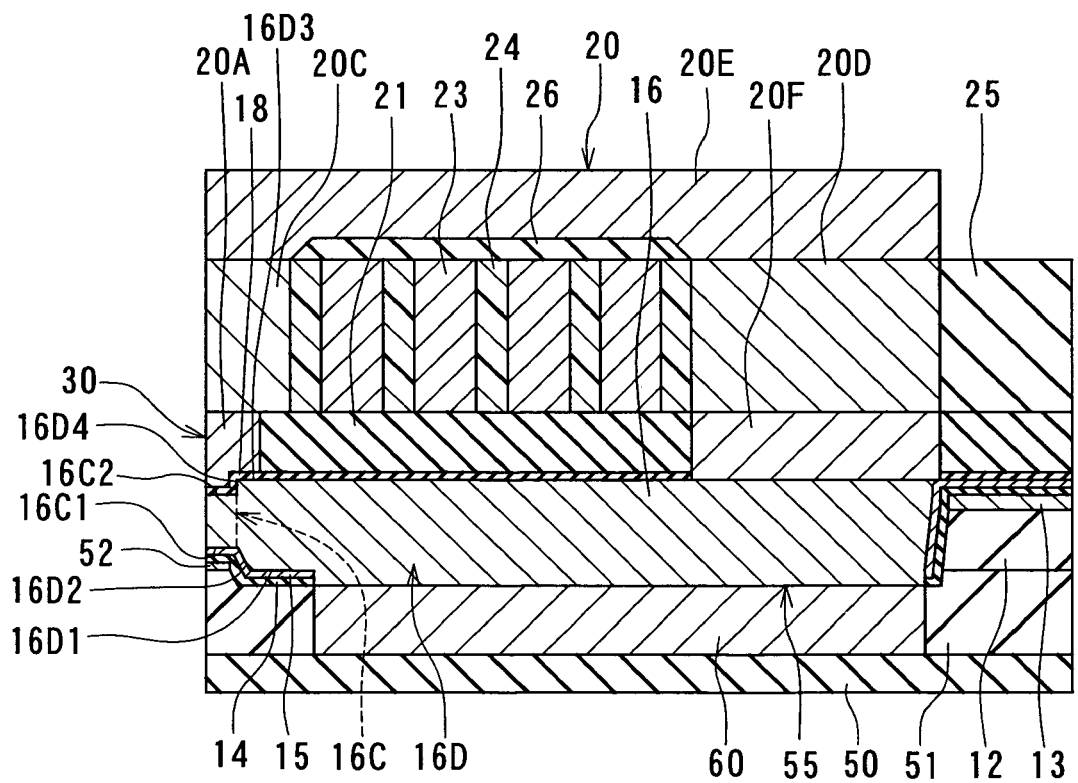
FIG. 18 is a cross-sectional view illustrating a second modification example of the magnetic head of the first embodiment of the invention.

FIG. 18 illustrates a cross section of the main part of a magnetic head of the second modification example, the cross section being orthogonal to the medium facing surface and the substrate. FIG. 18 shows only portions located higher than the coil 9 and the insulating layers 10 and 11. In the second modification example, an insulating layer 50 covering the coil 9 and the insulating layers 10 and 11 is provided, and a lower yoke layer 60 made of a magnetic material is provided on the insulating layer 50. The insulating layer 50 is made of alumina, for example. An end of the lower yoke layer 60 closer to the medium facing surface 30 is located at a distance from the medium facing surface 30. In the second modification example, the first encasing layer 51 is provided to cover the lower yoke layer 60. A portion of the encasing groove 55 reaches the top surface of the lower yoke layer 60. On the top surface of the lower yoke layer 60, portions of the nonmagnetic film 14 and the polishing stopper layer 15 placed in the encasing groove 55 are selectively removed by etching. The bottom surface of the pole layer 16 placed in the encasing groove 55 touches the top surface of the lower yoke layer 60.

In the second modification example, a coupling layer 20F is provided in place of the yoke layer 20B illustrated in FIG. 3. The coupling layer 20F is made of a material the same as that of the yoke layer 20B. The bottom surface of the coupling layer 20F touches the top surface of the pole layer 16. The top surface of the coupling layer 20F touches the bottom surface of the coupling layer 20D. The coupling layer 20F is disposed only in a region below the coupling layer 20D. The nonmagnetic layer 21 is disposed around the coupling layer 20F. In the second modification example, the insulating layer 22 is not provided, and the coil 23 is disposed on the nonmagnetic layer 21. In the second modification example, the top surfaces of the second layer 20C, the coupling layer 20D, the coil 23, and the insulating layers 24 and 25 are flattened. The magnetic head of the second modification example comprises an insulating layer 26 located on the coil 23 and the insulating layer 24. A portion of the third layer 20E is disposed on the insulating layer 26. The remainder of configuration, function and effects of the second modification example are similar to those of the magnetic head illustrated in FIG. 1 to FIG. 5.

Figure 19:
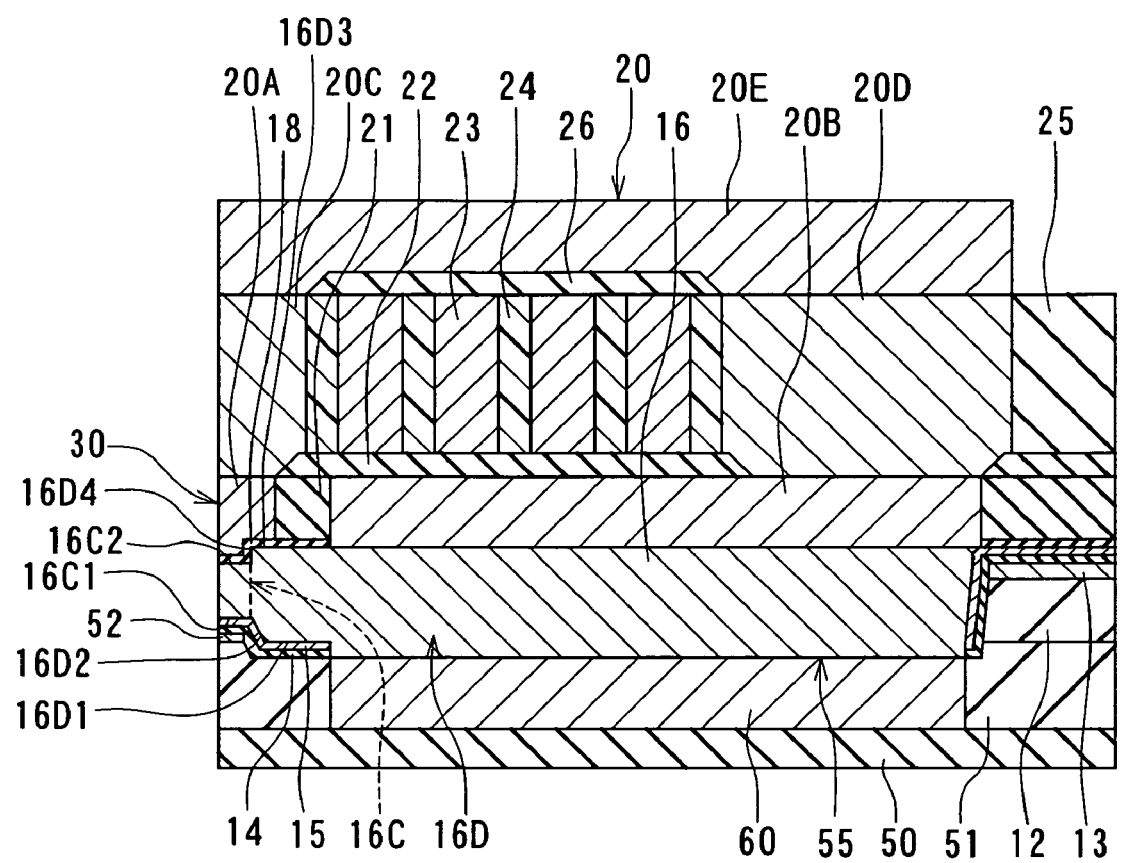
FIG. 19 is a cross-sectional view illustrating a third modification example of the magnetic head of the first embodiment of the invention.

FIG. 19 shows a cross section of the main part of a magnetic head of the third modification example, the cross section being orthogonal to the medium facing surface and the substrate. FIG. 19 shows only portions located higher than the coil 9 and the insulating layers 10 and 11. In the third modification example, the yoke layer 20B is provided in place of the coupling layer 20F of the second modification example. In the third modification example, the insulating layer 22 is provided on regions of the top surfaces of the yoke layer 20B and the nonmagnetic layer 21 where the coil 23 is disposed. The coil 23 is disposed on the insulating layer 22. In the third modification example, the top surfaces of the second layer 20C, the coupling layer 20D, the coil 23, and the insulating layers 24 and 25 are flattened, and the insulating layer 26 placed on the coil 23 and the insulating layer 24 is provided, as in the second modification example. A portion of the third layer 20E is disposed on the insulating layer 26. The remainder of configuration, function and effects of the magnetic head of the third modification example are similar to those of the second modification example.

Figure 20:
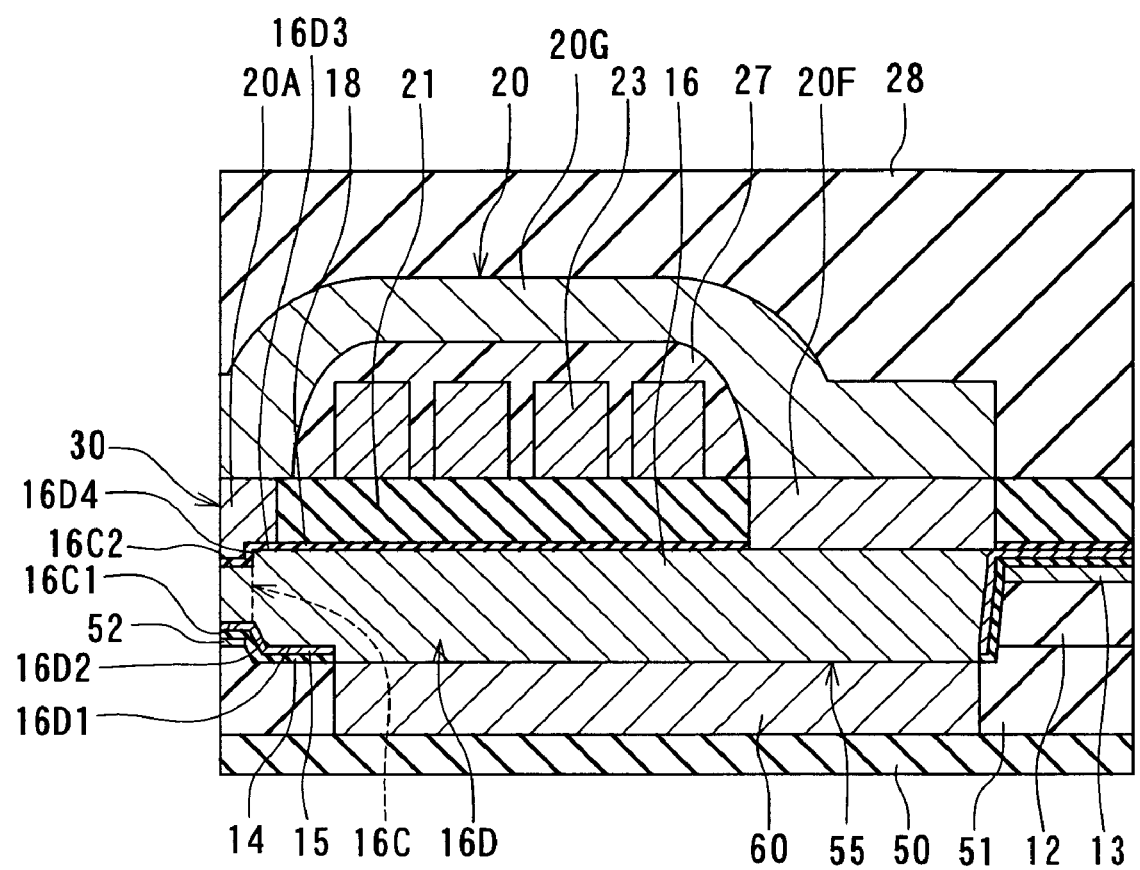
FIG. 20 is a cross-sectional view illustrating a fourth modification example of the magnetic head of the first embodiment of the invention.

FIG. 20 shows a cross section of the main part of a magnetic head of the fourth modification example, the cross section being orthogonal to the medium facing surface and the substrate. FIG. 20 shows only portions located higher than the coil 9 and the insulating layers 10 and 11. The magnetic head of the fourth modification example comprises an insulating layer 27 covering at least part of the coil 23 in place of the insulating layers 24, 25 and 26 of the second modification example. The shield layer 20 of the fourth modification example comprises a second layer 20G in place of the second layer 20C, the coupling layer 20D and the third layer 20E of the second modification example. The second layer 20G has an end located in the medium facing surface 30, and is disposed to couple the first layer 20A to the coupling layer 20F. The second layer 20G includes a portion located on a side of the at least part of the coil 23 covered with the insulating layer 27, the side being opposite to the pole layer 16. The second layer 20G includes a portion located between the medium facing surface 30 and the coil 23. In this portion, the distance between the end located in the medium facing surface 30 and the other end increases as the distance from the first layer 20A increases. The second layer 20G may be made of any of CoFeN, CoNiFe, NiFe, and CoFe, for example. The magnetic head of the fourth modification example comprises an insulating layer 28 disposed to cover the second layer 20G. The insulating layer 28 is made of alumina, for example. The remainder of configuration, function and effects of the magnetic head of the fourth modification example are similar to those of the second modification example.

FIG. 18 to FIG. 20 illustrate the examples in which the second front end face 16D4 of the pole layer 16 is nearly orthogonal to the top surface of the substrate 1. However, in any of the second to fourth modification examples, the second front end face 16D4 may be tilted with respect to the direction orthogonal to the top surface of the substrate 1 such that the thickness of the pole layer 16 gradually increases as the distance from the medium facing surface 30 increases in the region in which the front end face 16D4 is located.

In any of the first to fourth modification examples, the first layer 20A of the shield layer 20 may be located only in a region above the first portion 16C of the pole layer 16.

Second Embodiment

A magnetic head and a method of manufacturing the same of a second embodiment of the invention will now be described. Reference is now made to FIG. 21A to FIG. 29A and FIG. 21B to FIG. 29B to describe the method of manufacturing the magnetic head of the second embodiment. FIG. 21A to FIG. 29A each illustrate a cross section of a layered structure obtained in the course of manufacturing process of the magnetic head, the cross section being orthogonal to the medium facing surface and the substrate. FIG. 21B to FIG. 29B each illustrate a cross section of a portion of the layered structure near the medium facing surface, the cross section being parallel to the medium facing surface. In FIG. 21A to FIG. 29A and FIG. 21B to FIG. 29B, portions located higher than the coil 9 and the insulating layers 10 and 11 are only shown.

Figures 21A, 21B:
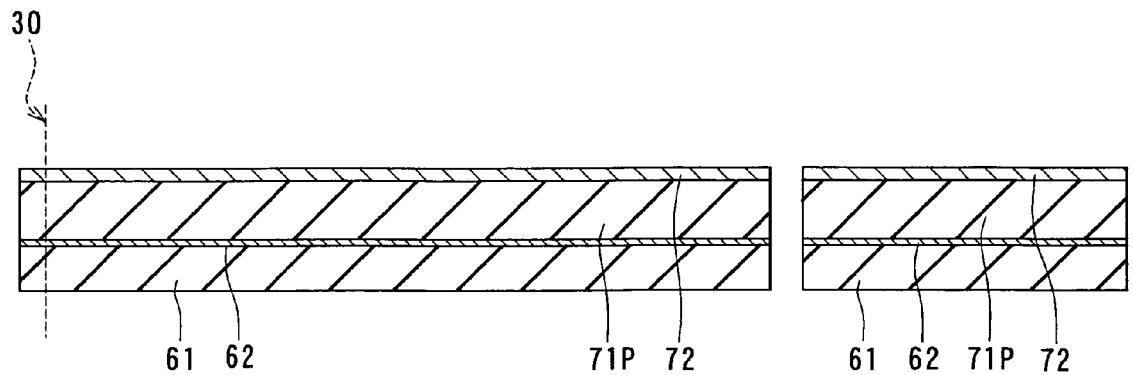
FIG. 21A and FIG. 21B are views for illustrating a step of a method of manufacturing a magnetic head of a second embodiment of the invention.

The method of manufacturing the magnetic head of the second embodiment includes the steps up to the step of flattening the top surfaces of the coil 9 and the insulating layers 10 and 11 that are the same as those of the first embodiment. FIG. 21A and FIG. 21B illustrate the following step. In the step, first, an insulating layer 61 made of alumina, for example, is formed on the flattened top surfaces of the coil 9 and the insulating layers 10 and 11. Next, an etching stopper layer 62 is formed on the insulating layer 61 by sputtering, for example. The material and the thickness of the etching stopper layer 62 are the same as those of the etching stopper layer 52 of the first embodiment. Next, a nonmagnetic layer 71P is formed on the etching stopper layer 62. The nonmagnetic layer 71P will be formed into an encasing layer 71 by forming a groove 71a therein later. The nonmagnetic layer 71P has a thickness that falls within a range of 0.4 to 0.45 µm inclusive, for example, when formed. The material of the nonmagnetic layer 71P is the same as that of the second encasing layer 12 of the first embodiment. Next, a nonmagnetic metal layer 72 is formed on the nonmagnetic layer 71P by sputtering, for example. The material and the thickness of the nonmagnetic metal layer 72 are the same as those of the nonmagnetic metal layer 13 of the first embodiment.

Figures 22A, 22B:
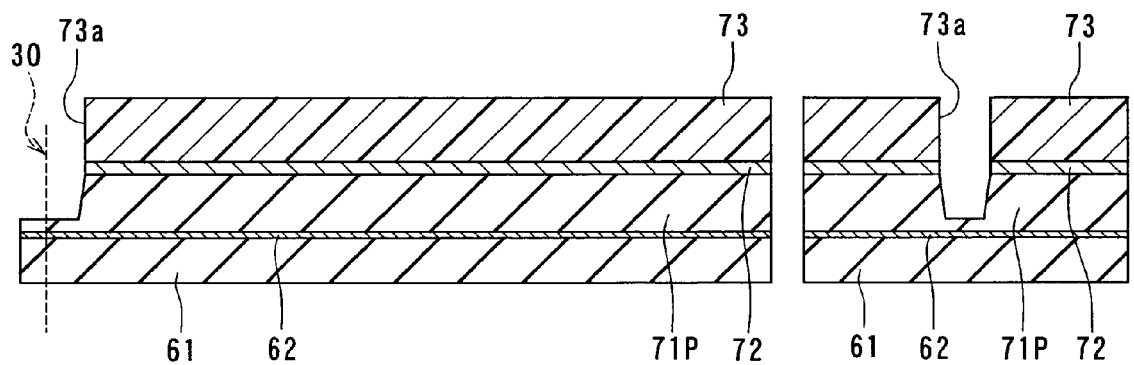
FIG. 22A and FIG. 22B are views for illustrating a step that follows the step shown in FIG. 21A and FIG. 21B.

FIG. 22A and FIG. 22B illustrate the following step. In the step, first, a photoresist layer having a thickness of 1.0 µm, for example, is formed on the nonmagnetic metal layer 72. The photoresist layer is then patterned to form a mask 73. The mask 73 has an opening 73a. The opening 73a has a shape corresponding to a portion of the encasing groove 55 to be formed later including a portion in which the first portion 16C of the pole layer 16 will be placed. Next, portions of the nonmagnetic metal layer 72 and the nonmagnetic layer 71P are etched, using the mask 73. This etching step is called a first etching step for forming the encasing groove 55. The first etching step is completed before the bottom of the groove formed in the nonmagnetic layer 71P by etching reaches the etching stopper layer 62. The depth of the groove formed in the nonmagnetic layer 71P by the first etching step falls within a range of 0.2 to 0.35 µm inclusive, for example. Through the first etching step, the portion of the encasing groove 55 in which the first portion 16C of the pole layer 16 will be placed is formed. Next, the mask 73 is removed.

Figure 30:
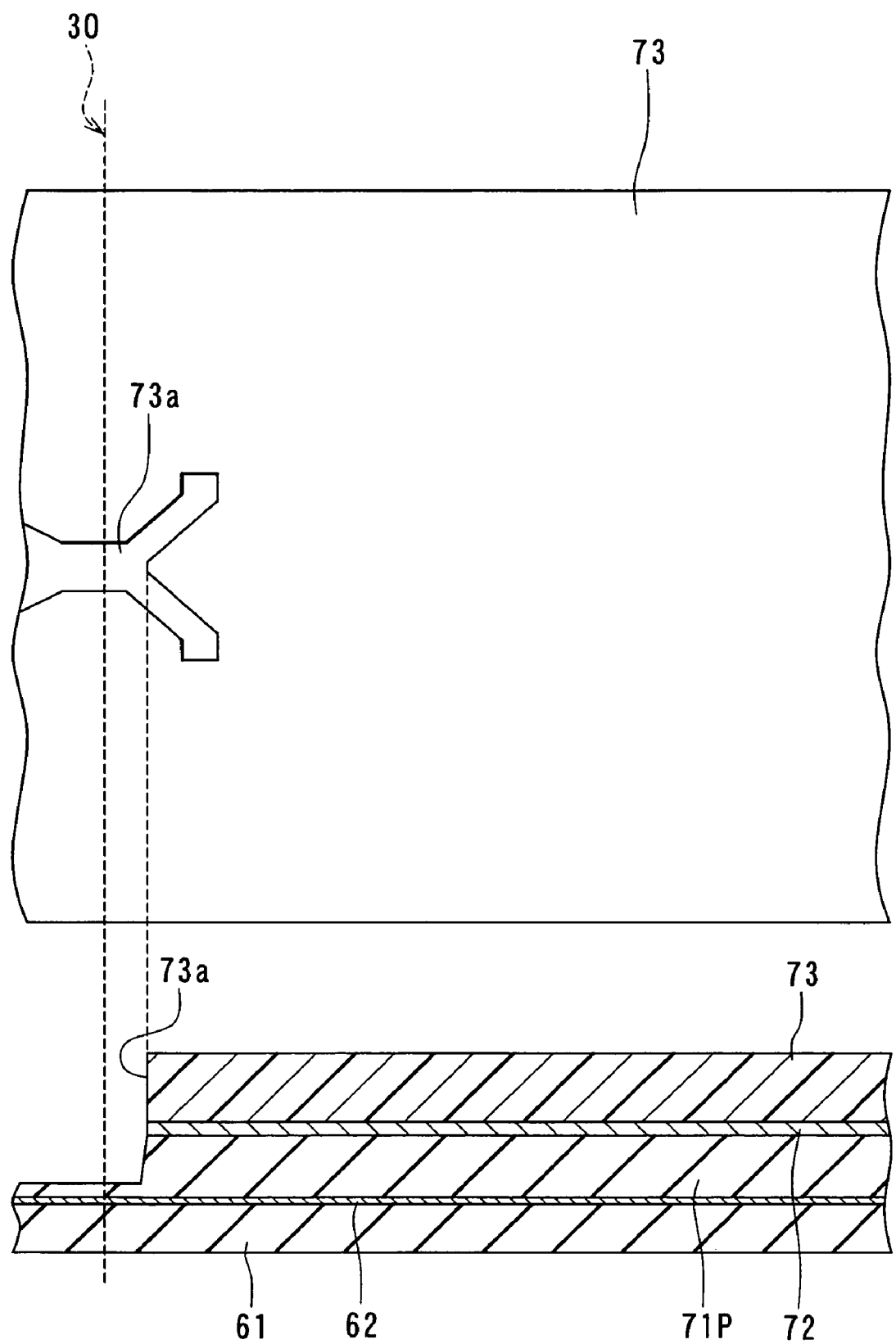
FIG. 30 is a view for illustrating a mask used for a first etching step of the method of manufacturing the magnetic head of the second embodiment of the invention.

FIG. 30 shows a top view illustrating the plane geometry of the mask 73 and a cross-sectional view illustrating the mask 73 in relation to each other.

FIG. 23A and FIG. 23B illustrate the following step. In the step, first, a photoresist layer having a thickness of 1.0 µm, for example, is formed on the entire top surface of the layered structure. The photoresist layer is then patterned to form a mask 74. The mask 74 has an opening 74a. The opening 74a has a shape corresponding to the encasing groove 55 to be formed later except a portion in which the first portion 16C of the pole layer 16 will be placed.

FIG. 24A and FIG. 24B illustrate the following step. In the step, first, portions of the nonmagnetic metal layer 72 and the nonmagnetic layer 71P are etched, using the mask 74. This etching step is called a second etching step for forming the encasing groove 55. The etching stopper layer 62 has a function of stopping the second etching step. That is, etching no more proceeds after the bottom of the groove 71a formed in the nonmagnetic layer 71P by etching reaches the etching stopper layer 62. The second etching step is thus performed until the bottom of the groove 71a reaches the etching stopper layer 62. Through the second etching step, the portion of the encasing groove 55 in which the second portion 16D of the pole layer 16 will be placed is formed. Next, the mask 74 is removed.

Figure 31:
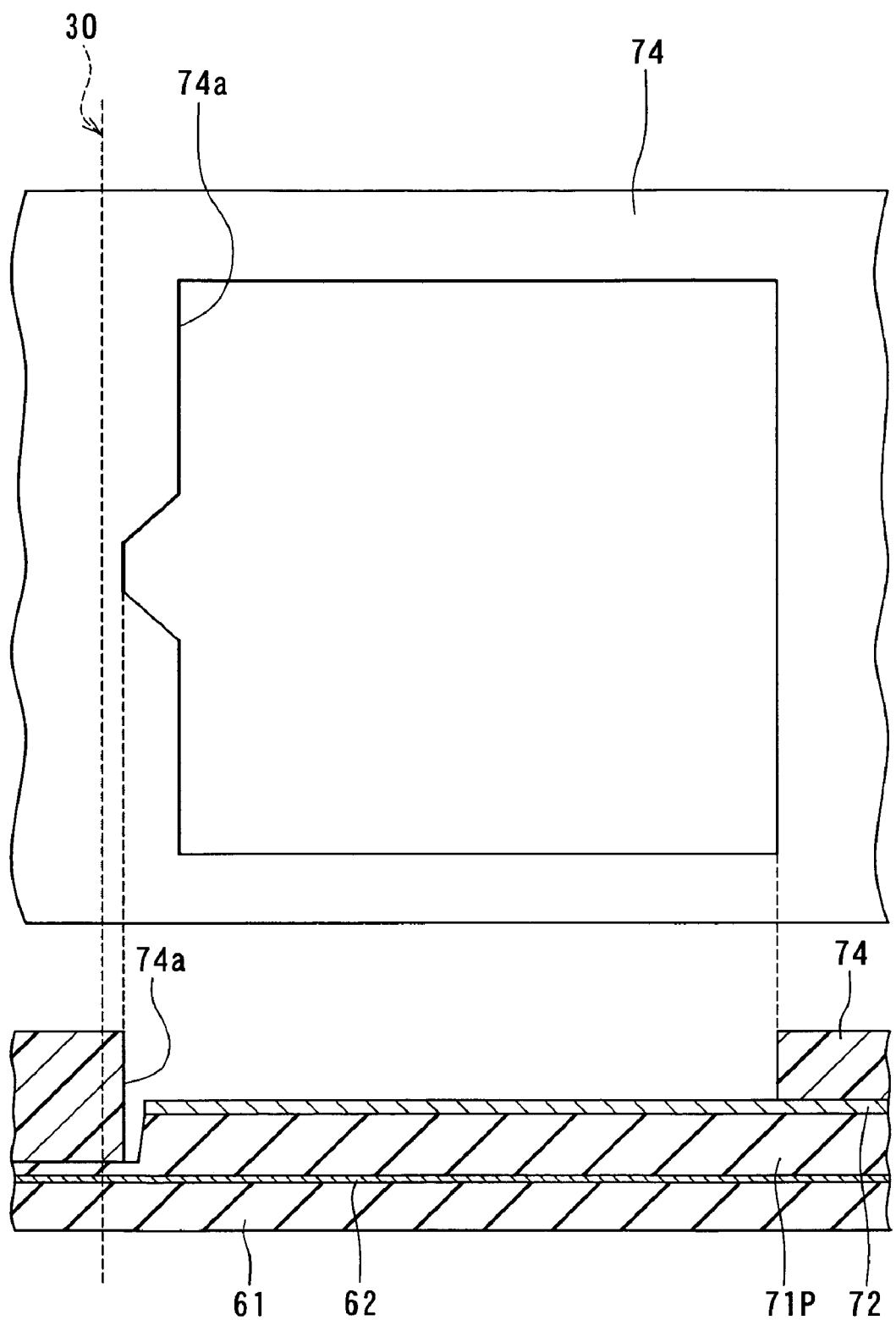
FIG. 31 is a view for illustrating a mask used for a second etching step of the method of manufacturing the magnetic head of the second embodiment of the invention.

FIG. 31 shows a top view illustrating the plane geometry of the mask 74 and a cross-sectional view illustrating the mask 74 in relation to each other.

The opening 72a that penetrates is formed in the nonmagnetic metal layer 72 through the first and second etching steps. The opening 72a has a shape corresponding to the plane geometry of the pole layer 16 to be formed later. It is preferred that the inner wall of the opening 72a is orthogonal to the top surface of the substrate 1. In addition, through the first and second etching steps, the groove 71a is formed in the nonmagnetic layer 71P. The nonmagnetic layer 71P is formed into an encasing layer 71 by forming the groove 71a therein. Furthermore, the encasing groove 55 is made up of the groove 71a and the opening 72a. The etching stopper layer 62, the encasing layer 71 and the nonmagnetic metal layer 72 make up the encasing section of the second embodiment. The encasing section incorporates the encasing groove 55 that is made of a nonmagnetic material, that opens in the top surface thereof, and that accommodates at least a portion of the pole layer 16. The etching stopper layer 62 and the encasing layer 71 define the shapes of the bottom and sidewalls of the encasing groove 55. The nonmagnetic metal layer 72 defines the plane geometry of the encasing groove 55. A stepped portion is formed at the bottom of the encasing groove 55, the stepped portion corresponding to the stepped portion in the bottom surface of the pole layer 16 that will be formed later. The bottom of the encasing groove 55 includes a portion that faces toward one of the surfaces of the first portion 16C of the pole layer 16 closer to the substrate 1. This portion of the bottom of the encasing groove 55 is formed in the encasing layer 71. The bottom of the encasing groove 55 includes a portion that faces toward one of the surfaces of the second portion 16D of the pole layer 16 closer to the substrate 1. This portion of the bottom of the encasing groove 55 is formed of the top surface of the etching stopper layer 62. The etching stopper layer 62 corresponds to the bottom forming layer of the invention. The nonmagnetic metal layer 72 will be the reference that indicates the level at which etching to be performed later for forming the surfaces 16C2, 16D3 and 16D4 of the pole layer 16 is stopped. The edge of the opening 72a of the nonmagnetic metal layer 72 is located directly above the edge of the groove 71a located in the top surface of the encasing layer 71.

The conditions for the first and second etchings are the same as those for etching of the nonmagnetic metal layer 13 and the nonmagnetic layers 12P and 51P of the first embodiment.

Figures 25A, 25B:
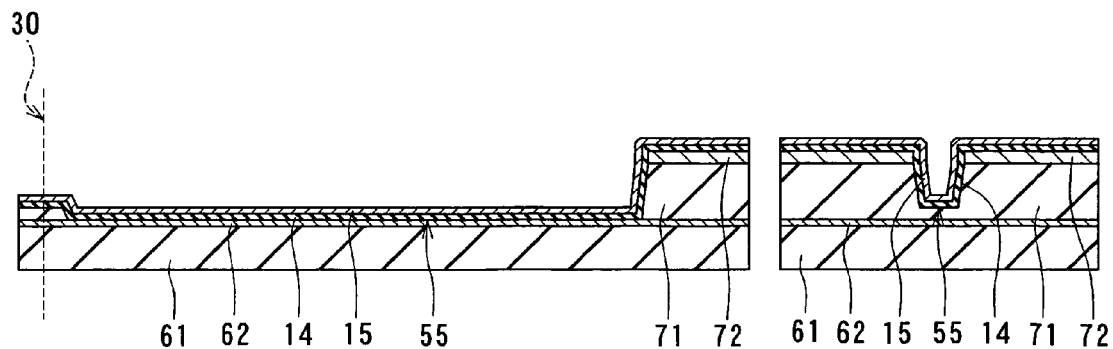
FIG. 25A and FIG. 25B are views for illustrating a step that follows the step shown in FIG. 24A and FIG. 24B.

FIG. 25A and FIG. 25B illustrate the following step. In the step, first, the nonmagnetic film 14 is formed on the entire top surface of the layered structure. The nonmagnetic film 14 is formed in the encasing groove 55, too. Next, the polishing stopper layer 15 is formed on the entire top surface of the layered structure. The polishing stopper layer 15 is formed in the encasing groove 55, too. The polishing stopper layer 15 indicates the level at which polishing of the polishing step to be performed later is stopped. The methods of forming the nonmagnetic film 14 and the polishing stopper layer 15 are the same as those of the first embodiment.

Figures 26A, 26B:
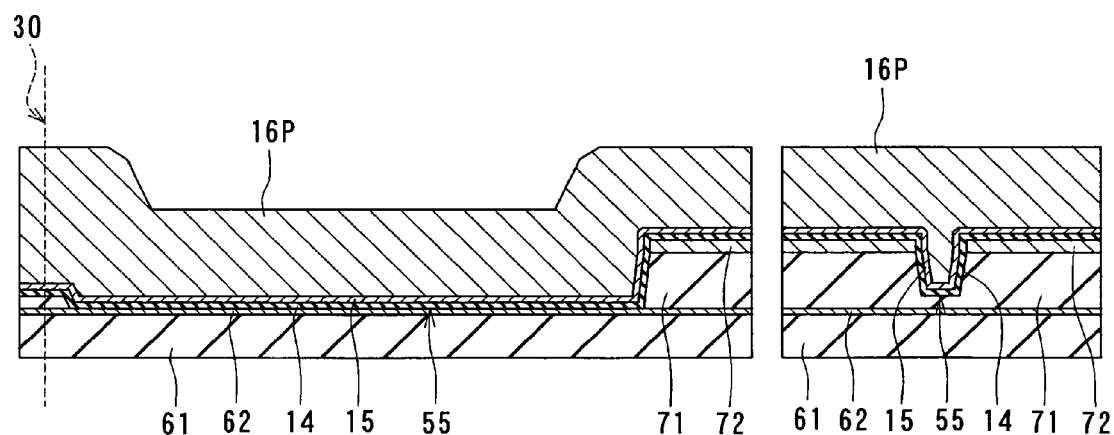
FIG. 26A and FIG. 26B are views for illustrating a step that follows the step shown in FIG. 25A and FIG. 25B.

FIG. 26A and FIG. 26B illustrate the following step. In the step, first, the magnetic layer 16P to be the pole layer 16 is formed on the polishing stopper layer 15. The magnetic layer 16P is formed such that the top surface thereof is located higher than the top surfaces of the nonmagnetic metal layer 72, the nonmagnetic film 14 and the polishing stopper layer 15. The magnetic layer 16P is formed by a method the same as that of the first embodiment.

Figures 27A, 27B:
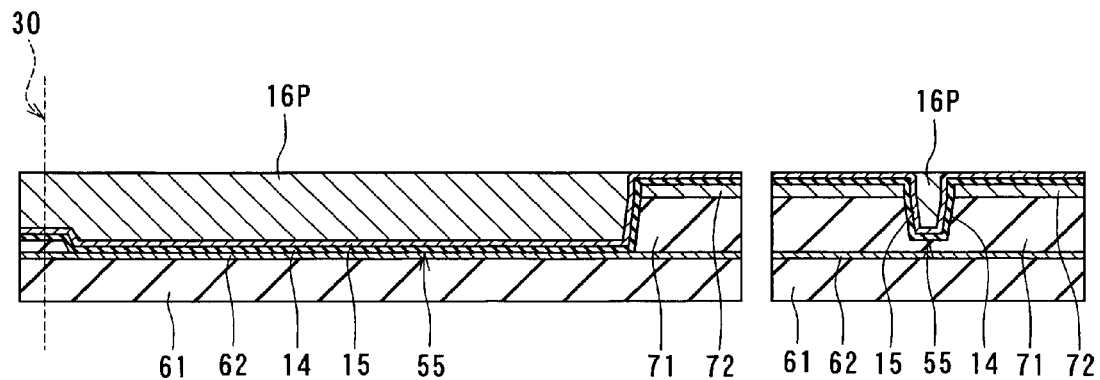
FIG. 27A and FIG. 27B are views for illustrating a step that follows the step shown in FIG. 26A and FIG. 26B.

FIG. 27A and FIG. 27B illustrate the following step. In the step, first, if there exists the seed layer, the seed layer except a portion below the plating layer is removed by ion beam etching, for example. Next, a coating layer not shown made of alumina, for example, and having a thickness of 0.5 to 1.2 µm, for example, is formed on the entire top surface of the layered structure. Next, the coating layer and the magnetic layer 16P are polished by CMP, for example, so that the polishing stopper layer 15 is exposed, and the top surfaces of the polishing stopper layer 15 and the magnetic layer 16P are thereby flattened. If the coating layer and the magnetic layer 16P are polished by CMP, such a slurry is used that polishing is stopped when the polishing stopper layer 15 is exposed, such as an alumina-base slurry.

Figures 28A, 28B:
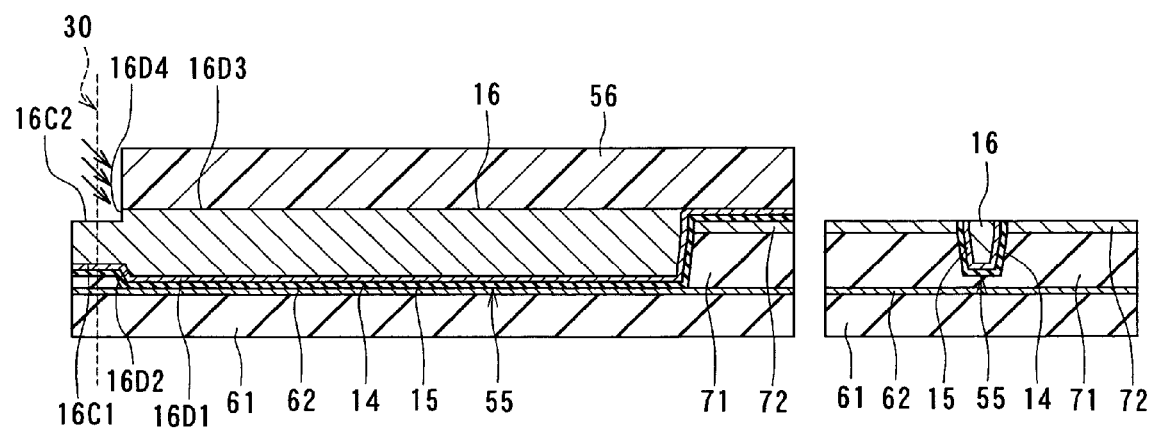
FIG. 28A and FIG. 28B are views for illustrating a step that follows the step shown in FIG. 27A and FIG. 27B.

FIG. 28A and FIG. 28B illustrate the following step. In the step, first, a photoresist layer having a thickness of 1.0 µm, for example, is formed on the entire top surface of the layered structure. The photoresist layer is then patterned to form the mask 56 for etching a portion of the magnetic layer 16P. The mask 56 covers the top surface of the magnetic layer 16P except the regions in which the surface 16C2 and the second front end face 16D4 will be formed. The distance between the medium facing surface 30 and an end of the mask 56 closer to the medium facing surface 30 falls within a range of 0.1 to 0.5 µm inclusive, for example. Next, the portion of the magnetic layer 16P is etched by ion beam etching, for example, using the mask 56. As a result, the surfaces 16C2 and 16D3 and the second front end face 16D4 are formed in the top surface of the magnetic layer 16P, and the magnetic layer 16P is thereby formed into the pole layer 16. The conditions for this etching are the same as those of the first embodiment. In addition, this etching is performed such that one of the sides of the end face of the pole layer 16 located in the medium facing surface 30, the one of the sides being farther from the substrate 1, is disposed at a height that falls within the range between the height at which the top surface of the nonmagnetic metal layer 72 as initially formed is located and the height at which the bottom surface thereof is located. Therefore, the nonmagnetic metal layer 72 serves as the reference that indicates the level at which this etching is stopped. The portion of the magnetic layer 16P is etched in the manner thus described, so that each of the track width and the thickness of the pole layer 16 taken in the medium facing surface 30 is controlled to be nearly uniform. It is thereby possible to control the thickness of the pole layer 16 and the track width with precision. Next, the mask 56 is removed. The surfaces 16C1 and 16D1 and the first front end face 16D2 are formed in the bottom surface of the pole layer 16.

Figures 29A, 29B:
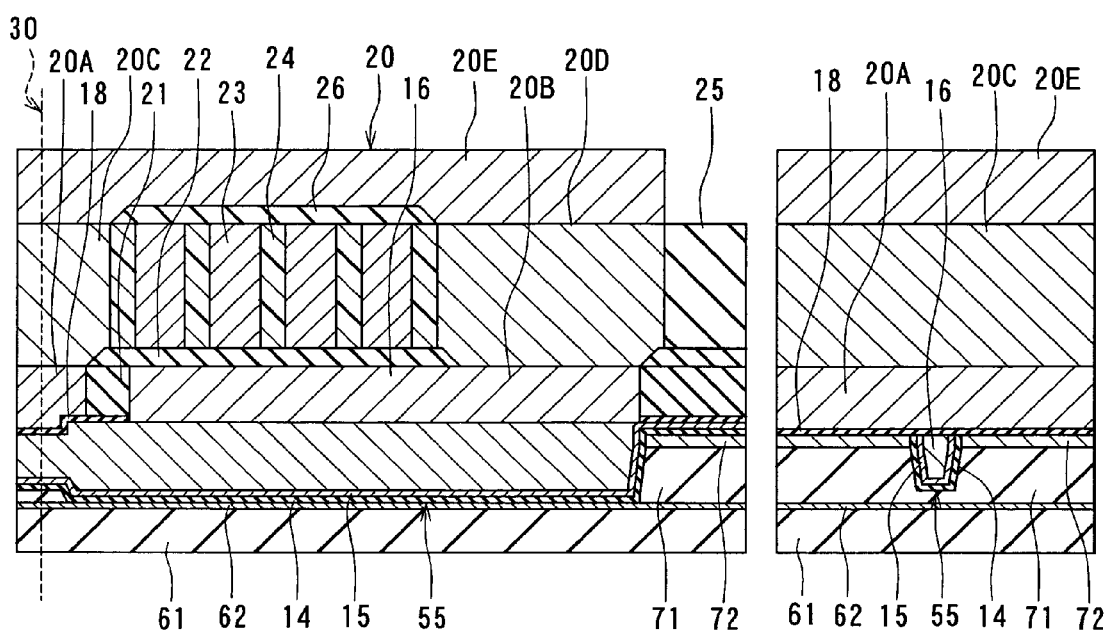
FIG. 29A and FIG. 29B are views for illustrating a step that follows the step shown in FIG. 28A and FIG. 28B.

FIG. 29A and FIG. 29B illustrate the following step. In the step, first, the gap layer 18 is formed on the entire top surface of the layered structure. The gap layer 18 is formed by a method the same as that of the first embodiment. Next, a portion of the gap layer 18 away from the medium facing surface 30 is selectively etched to form an opening in the gap layer 18. Next, the first layer 20A is formed on the gap layer 18, and the yoke layer 20B is formed on a portion of the pole layer 16 where the opening of the gap layer 18 is formed. The first layer 20A and the yoke layer 20B are formed by methods the same as those of the first embodiment. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened. Next, the insulating layer 22 is formed on regions of the top surfaces of the yoke layer 20B and the nonmagnetic layer 21 on which the coil 23 is to be disposed.

Next, the coil 23 is formed by frame plating, for example, on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 having a thickness of 4 to 4.5 µm, for example, is formed on the entire top surface of the layered structure. Next, the insulating layer 25 is polished by CMP, for example, so that the second layer 20C, the coupling layer 20D and the coil 23 are exposed, and the top surfaces of the second layer 20C, the coupling layer 20D, the coil 23, and the insulating layers 24 and 25 are thereby flattened. Next, the insulating layer 26 is formed on the coil 23 and the insulating layer 24. Next, the third layer 20E is formed by frame plating, for example, to complete the shield layer 20. A portion of the third layer 20E is disposed on the insulating layer 26.

Next, although not shown, a protection layer is formed to cover the entire top surface of the layered structure. Wiring and terminals are then formed on the protection layer, the substrate is cut into sliders, and the steps including polishing of the medium facing surface 30 and fabrication of flying rails are performed. The magnetic head is thus completed.

In the second embodiment, the encasing groove 55 is formed through the two etching steps including the first and second etching steps. Through the first etching step, the portion of the encasing groove 55 in which the first portion 16C of the pole layer 16 will be placed is formed. Then, through the second etching step, the portion of the encasing groove 55 in which the second portion 16D of the pole layer 16 will be placed is formed. In the second etching step, it is possible to place the mask 74 at a correct location, referring to the location of the groove formed in the first etching step. As a result, according to the second embodiment, it is possible to prevent misalignment of the first portion 16C and the second portion 16D.

In the second embodiment, the bottom of the encasing groove 55 includes the portion that faces toward one of the surfaces of the second portion 16D of the pole layer 16 closer to the substrate 1. This portion of the bottom of the encasing groove 55 is formed of the top surface of the etching stopper layer 62. As a result, according to the second embodiment, it is possible to control the thickness of the second portion 16D with accuracy.

The remainder of configuration, function and effects of the second embodiment are similar to those of the first embodiment. It is possible to provide modification examples of the second embodiment that are similar to the first to fourth modification examples of the first embodiment.

Third Embodiment

A magnetic head and a method of manufacturing the same of a third embodiment of the invention will now be described. Reference is now made to FIG. 32A to FIG. 35A and FIG. 32B to FIG. 35B to describe the method of manufacturing the magnetic head of the third embodiment. FIG. 32A to FIG. 35A each illustrate a cross section of a layered structure obtained in the course of manufacturing process of the magnetic head, the cross section being orthogonal to the medium facing surface and the substrate. FIG. 32B to FIG. 35B each illustrate a cross section of a portion of the layered structure near the medium facing surface, the cross section being parallel to the medium facing surface. In FIG. 32A to FIG. 35A and FIG. 32B to FIG. 35B, portions located higher than the coil 9 and the insulating layers 10 and 11 are only shown.

The method of manufacturing the magnetic head of the third embodiment includes the steps up to the step of flattening the top surfaces of the coil 9 and the insulating layers 10 and 11 that are the same as those of the first embodiment. FIG. 32A and FIG. 32B illustrate the following step. In the step, first, a nonmagnetic layer 91P is formed on the flattened top surfaces of the coil 9 and the insulating layers 10 and 11. The nonmagnetic layer 91P will be formed into an encasing layer 91 by forming a groove 91a therein later. The material of the nonmagnetic layer 91P is the same as that of the second encasing layer 12 of the first embodiment. Next, a nonmagnetic metal layer 92 is formed on the nonmagnetic layer 91P by sputtering, for example. The material and the thickness of the nonmagnetic metal layer 92 are the same as those of the nonmagnetic metal layer 13 of the first embodiment.

FIG. 33A and FIG. 33B illustrate the following step. In the step, first, a photoresist layer having a thickness of 1.0 μm, for example, is formed on the nonmagnetic metal layer 92. The photoresist layer is then patterned to form a mask 93. The mask 93 has an opening 93a. The opening 93a has a shape corresponding to the encasing groove 55 to be formed later. Next, portions of the nonmagnetic metal layer 92 and the nonmagnetic layer 91P are etched, using the mask 93. This etching step is called a first etching step for forming the encasing groove 55. The depth of the groove formed in the nonmagnetic layer 91P by the first etching step falls within a range of 0.2 to 0.35 μm inclusive, for example. Through the first etching step, the portion of the encasing groove 55 in which the first portion 16C of the pole layer 16 will be placed is formed. Next, the mask 93 is removed.

Figure 36:
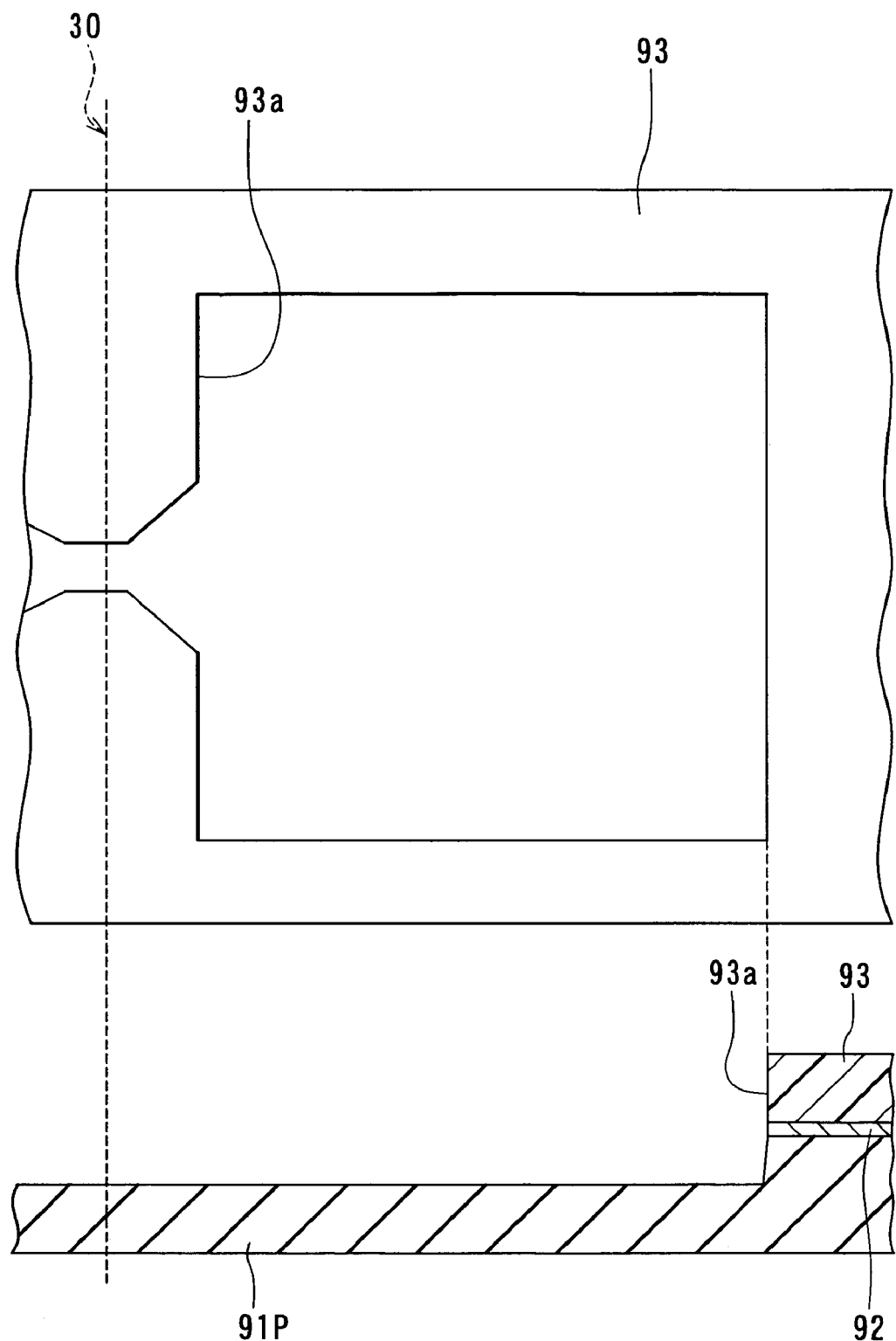
FIG. 36 is a view for illustrating a mask used for a first etching step of the method of manufacturing the magnetic head of the third embodiment of the invention.

FIG. 36 shows a top view illustrating the plane geometry of the mask 93 and a cross-sectional view illustrating the mask 93 in relation to each other.

Figures 34A, 34B:
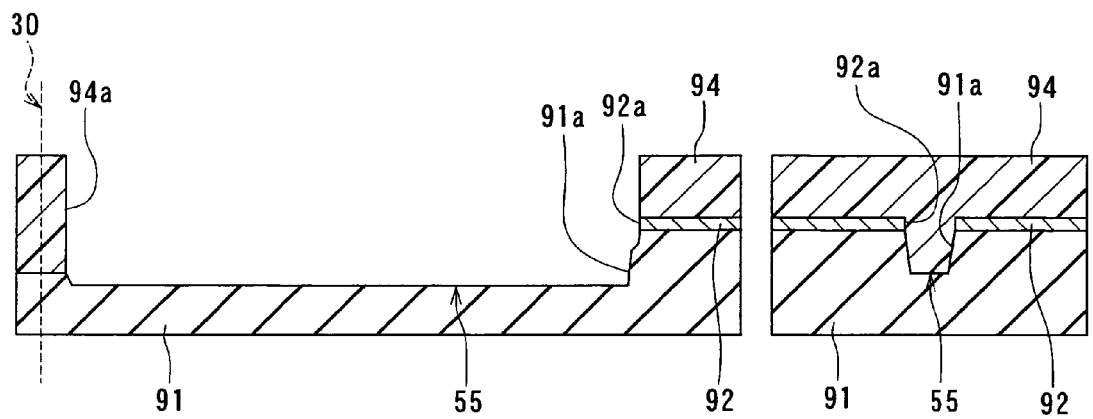
FIG. 34A and FIG. 34B are views for illustrating a step that follows the step shown in FIG. 33A and FIG. 33B.

FIG. 34A and FIG. 34B illustrate the following step. In the step, first, a photoresist layer having a thickness of 1.0 μm, for example, is formed on the entire top surface of the layered structure. The photoresist layer is then patterned to form a mask 94. The mask 94 has an opening 94a. The opening 94a has a shape corresponding to the encasing groove 55 to be formed later except a portion in which the first portion 16C of the pole layer 16 will be placed. Next, portions of the nonmagnetic metal layer 92 and the nonmagnetic layer 91P are etched, using the mask 94. This etching step is called a second etching step for forming the encasing groove 55. In the second etching step, the nonmagnetic layer 91P is etched by the difference in level s1 between the surfaces 16C1 and 16D1 of the pole layer 16 to be formed later. Through the second etching step, the portion of the encasing groove 55 in which the second portion 16D of the pole layer 16 will be placed is formed. Next, the mask 94 is removed.

Figure 37:
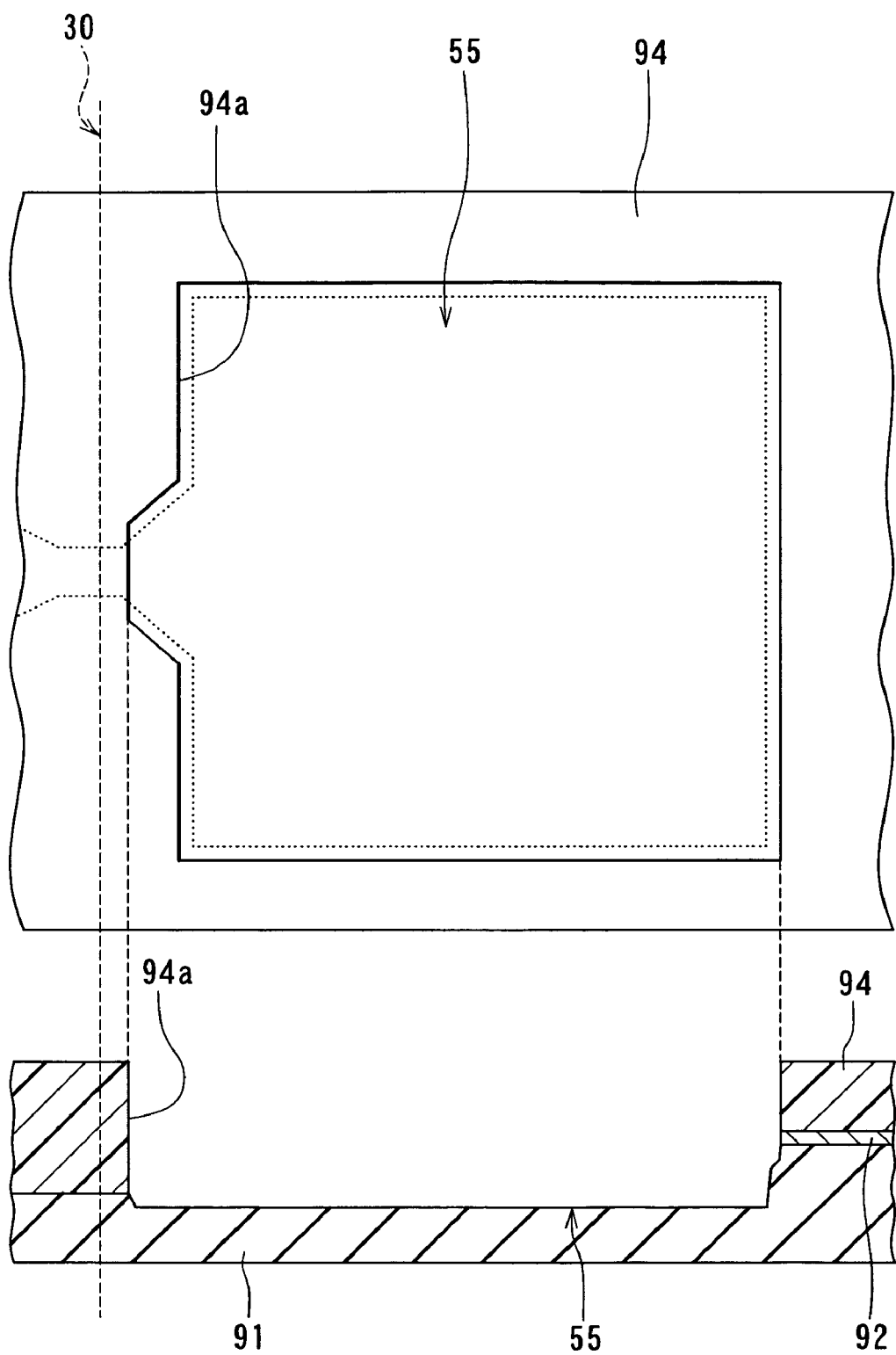
FIG. 37 is a view for illustrating a mask used for a second etching step of the method of manufacturing the magnetic head of the third embodiment of the invention.

FIG. 37 shows a top view illustrating the plane geometry of the mask 94 and a cross-sectional view illustrating the mask 94 in relation to each other. As shown in FIG. 37, it is preferred that the opening 94a of the mask 94 is slightly greater than a portion of the opening (indicated with a broken line in FIG. 37) formed in the nonmagnetic metal layer 92 through the first etching other than the portion in which the first portion 16C of the pole layer 16 will be placed. In this case, however, an end of the second portion 16D of the pole layer 16 to be formed later closer to the medium facing surface 30 is greater in width as compared with the first and second embodiments, and therefore flux leakage from this end is likely to occur. For this reason, in this case, it is preferred that an end of the opening 94a closer to the medium facing surface 30 is located a little farther from the medium facing surface 30 than the boundary between the track width defining portion 16A and the wide portion 16B of the pole layer 16 to be formed later.

The opening 92a that penetrates is formed in the nonmagnetic metal layer 92 through the first and second etching steps. The opening 92a has a shape corresponding to the plane geometry of the pole layer 16 to be formed later. In addition, through the first and second etching steps, the groove 91a is formed in the nonmagnetic layer 91P. The nonmagnetic layer 91P is formed into an encasing layer 91 by forming the groove 91a therein. Furthermore, the encasing groove 55 is made up of the groove 91a and the opening 92a. The encasing layer 91 and the nonmagnetic metal layer 92 make up the encasing section of the third embodiment. The encasing section incorporates the encasing groove 55 that is made of a nonmagnetic material, that opens in the top surface thereof, and that accommodates at least a portion of the pole layer 16. The encasing layer 91 defines the shapes of the bottom and sidewalls of the encasing groove 55. The nonmagnetic metal layer 92 defines the plane geometry of the encasing groove 55. A stepped portion is formed at the bottom of the encasing groove 55, the stepped portion corresponding to the stepped portion in the bottom surface of the pole layer 16 that will be formed later. The nonmagnetic metal layer 92 will be the reference that indicates the level at which etching to be performed later for forming the surfaces 16C2, 16D3 and 16D4 of the pole layer 16 is stopped. The edge of the opening 92a of the nonmagnetic metal layer 92 is located directly above the edge of the groove 91a located in the top surface of the encasing layer 91.

The conditions for the first and second etchings are the same as those for etching of the nonmagnetic metal layer 13 and the nonmagnetic layers 12P and 51P of the first embodiment.

Figures 35A, 35B:
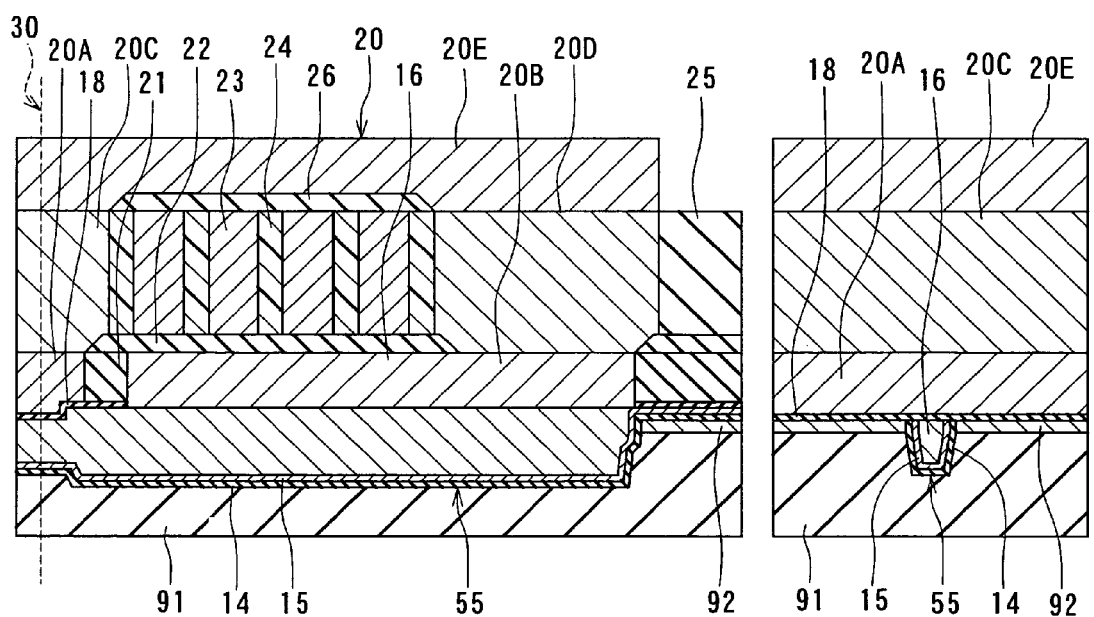
FIG. 35A and FIG. 35B are views for illustrating a step that follows the step shown in FIG. 34A and FIG. 34B.

FIG. 35A and FIG. 35B illustrate the following step. A description of this step is omitted since this step is the same as the one described with reference to FIG. 25A to FIG. 29A and FIG. 25B to FIG. 29B in the second embodiment. In the third embodiment, when the portion of the magnetic layer 16P is etched to form the surfaces 16C2 and 16D3 and the second front end face 16D4 in the top surface of the magnetic layer 16P, this etching is performed such that one of the sides of the end face of the pole layer 16 located in the medium facing surface 30, the one of the sides being farther from the substrate 1, is disposed at a height that falls within the range between the height at which the top surface of the nonmagnetic metal layer 92 as initially formed is located and the height at which the bottom surface thereof is located. The remainder of configuration, function and effects of the third embodiment are similar to those of the second embodiment. It is possible to provide modification examples of the third embodiment that are similar to the first to fourth modification examples of the first embodiment.

Fourth Embodiment

Figure 38:
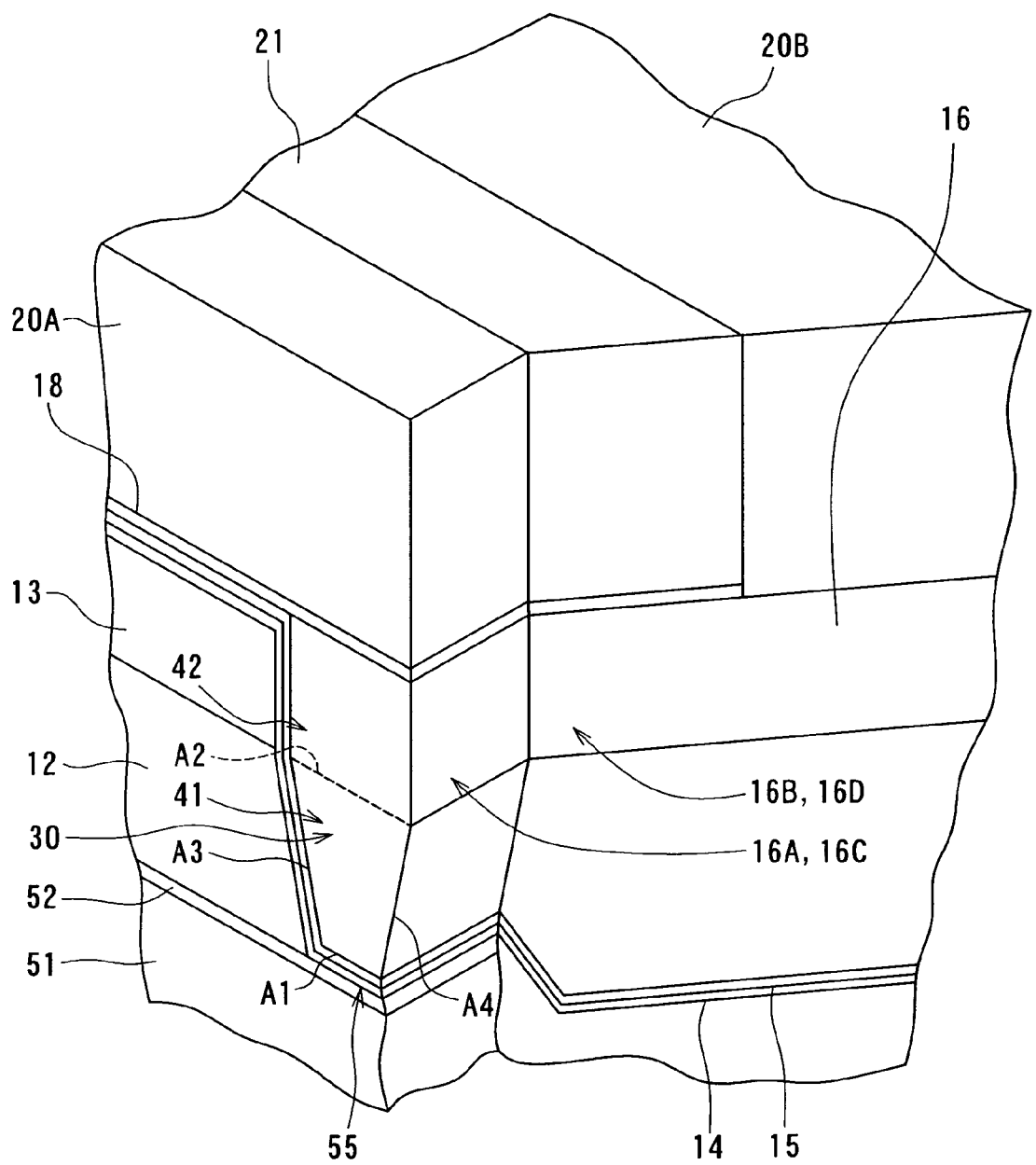
FIG. 38 is a perspective view illustrating a portion of a pole layer of a magnetic head of a fourth embodiment of the invention in a neighborhood of the medium facing surface.
Figure 39:
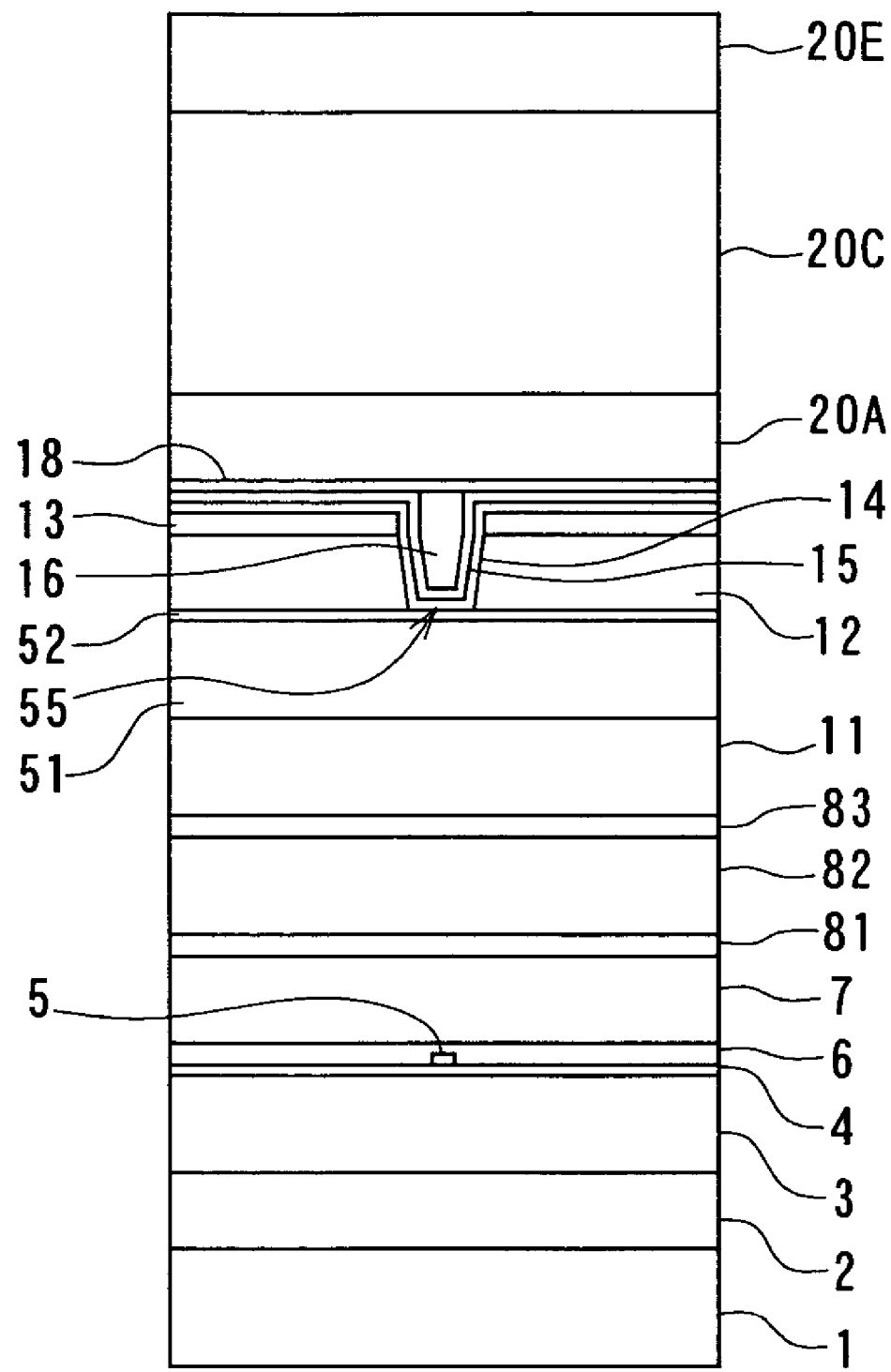
FIG. 39 is a front view of the medium facing surface of the magnetic head of the fourth embodiment of the invention.
Figure 40:
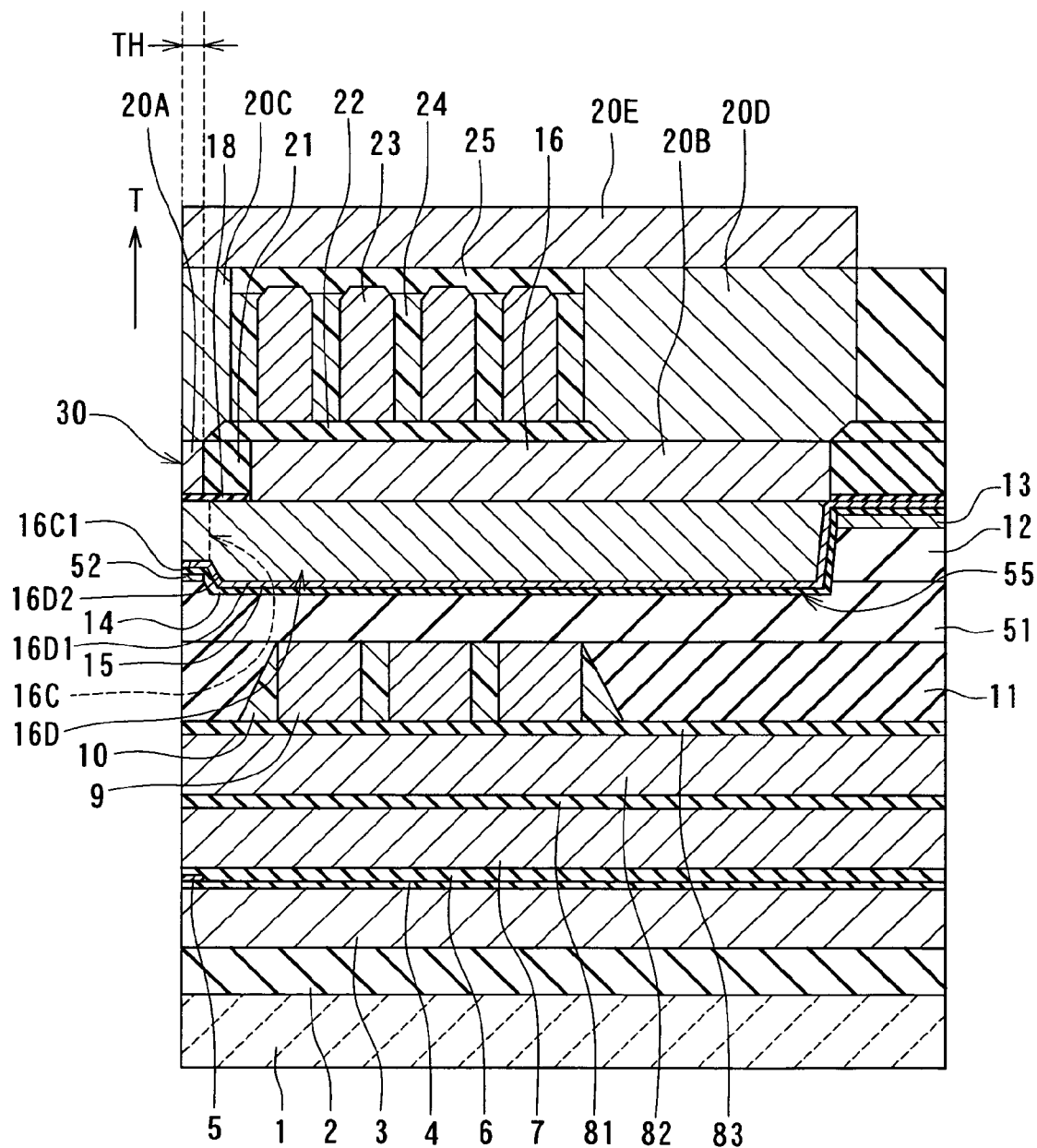
FIG. 40 is a cross-sectional view for illustrating the configuration of the magnetic head of the fourth embodiment of the invention.

Reference is now made to FIG. 38 and FIG. 40 to describe a magnetic head and a method of manufacturing the same of a fourth embodiment of the invention. FIG. 38 is a perspective view illustrating a portion of a pole layer of the magnetic head of the fourth embodiment near the medium facing surface. FIG. 39 is a front view illustrating the medium facing surface of the magnetic head of the embodiment. FIG. 40 is a cross-sectional view illustrating the configuration of the magnetic head of the embodiment. FIG. 40 illustrates a cross section orthogonal to the medium facing surface and a surface of a substrate. The arrow indicated with T in FIG. 40 shows the direction of travel of a recording medium.

In the magnetic head of the fourth embodiment, as shown in FIG. 38 to FIG. 40, there is no stepped portion in the top surface of the pole layer 16 but the top surface of the pole layer 16 is flat. The gap layer 18 is placed on the flat top surface of the pole layer 16, and the first layer 20A of the shield layer 20 is disposed on the gap layer 18. Therefore, the bottom surface of the first layer 20A is flat, too. In the fourth embodiment, the throat height TH is defined by an end of the first layer 20A farther from the medium facing surface 30. That is, the throat height TH is the distance between the medium facing surface 30 and the end of the first layer 20A farther from the medium facing surface 30.

In the fourth embodiment, it is preferred that the difference in level between the surfaces 16C1 and 16D1 falls within a range of 0.05 to 0.30 µm inclusive. The thickness of the first portion 16C falls within a range of 0.10 to 0.30 µm inclusive, for example. The thickness of the second portion 16D falls within a range of 0.15 to 0.60 µm inclusive, for example. The difference in level between the surfaces 16C1 and 16D1 is preferably smaller than the thickness of the first portion 16C.

The method of manufacturing the magnetic head of the fourth embodiment is the same as the method of manufacturing the magnetic head of the first embodiment from which the step illustrated in FIG. 13A and FIG. 13B, that is, the step of forming the surfaces 16C2, 16D3 and 16D4 in the top surface of the magnetic layer 16P is omitted.

In the fourth embodiment, after the top surfaces of the polishing stopper layer 15 and the magnetic layer 16P are flattened as shown in FIG. 12A and FIG. 12B, portions of the polishing stopper layer 15, the nonmagnetic film 14 and the magnetic layer 16P located higher than the top surface of the nonmagnetic metal layer 13 may be removed by etching or polishing.

The remainder of configuration, function and effects of the fourth embodiment except those relating to the nonexistence of a difference in level in the top surface of the pole layer 16 are similar to those of the first embodiment. It is possible to provide modification examples of the fourth embodiment that are similar to the second to fourth modification examples of the first embodiment. The method of forming the encasing groove 55 of the fourth embodiment may be the same as that of the second or third embodiment.

The present invention is not limited to the foregoing embodiments but may be practiced in still other ways. For example, a coil wound around the pole layer 16 in a helical manner may be provided in any of the embodiments in place of the flat-whorl-shaped coils 9 and 23.

In the foregoing embodiments, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;
    a coil for generating a magnetic field corresponding to data to be written on the recording medium;
    a pole layer having an end face located in the medium facing surface, allowing a magnetic flux corresponding to the field generated by the coil to pass therethrough, and generating a write magnetic field for writing the data on the recording medium through the use of a perpendicular magnetic recording system;
    an encasing section made of a nonmagnetic material and having an encasing groove that opens in a top surface thereof and that accommodates at least part of the pole layer; and
    a substrate on which the encasing section, the pole layer and the coil are stacked, wherein:
    the pole layer incorporates: a first portion having the end face located in the medium facing surface; and a second portion that is located farther from the medium facing surface than the first portion and has a thickness greater than a thickness of the first portion;
    a surface of the first portion closer to the substrate is located farther from the substrate than a surface of the second portion closer to the substrate;
    the end face of the pole layer located in the medium facing surface has a side located away from the substrate, this side defining a track width; and
    the encasing section incorporates: an encasing layer that is made of a nonmagnetic material and defines geometries of a bottom and sidewalls of the encasing groove; and a nonmagnetic metal layer that is made of a nonmagnetic metal material, is disposed on the encasing layer, and defines a plane geometry of the encasing groove.

2. The magnetic head according to claim 1, wherein: the first portion includes a portion having a width that is equal to the track width and that does not change in accordance with a distance from the medium facing surface; and a greatest width of the second portion is greater than the track width.

3. The magnetic head according to claim 1, wherein the surface of the first portion closer to the substrate is parallel to a surface of the first portion farther from the substrate.

4. The magnetic head according to claim 1, wherein the end face of the pole layer located in the medium facing surface has a width that decreases as a distance from the substrate decreases.

5. The magnetic head according to claim 4, wherein:
the end face of the pole layer located in the medium facing surface has a first region and a second region connected to the first region and located farther from the substrate than the first region;
the first region has a width that decreases as a distance from the substrate decreases;
the second region has a uniform width that defines the track width; and
in the medium facing surface, the nonmagnetic metal layer exists on both sides of the second region, the sides being opposed to each other in a direction of track width.

6. The magnetic head according to claim 1, wherein a difference in level between the surface of the first portion closer to the substrate and the surface of the second portion closer to the substrate is smaller than the thickness of the first portion.

7. The magnetic head according to claim 1, wherein the thickness of the first portion falls within a range of 0.10 to 0.30 μm inclusive, and a difference in level between the surface of the first portion closer to the substrate and the surface of the second portion closer to the substrate falls within a range of 0.05 to 0.30 μm inclusive.

8. The magnetic head according to claim 1, wherein a surface of the first portion farther from the substrate is located closer to the substrate than a surface of the second portion farther from the substrate.

9. The magnetic head according to claim 8, further comprising: a shield layer having an end face located in the medium facing surface and having a portion that is located away from the medium facing surface and coupled to the pole layer; and a gap layer made of a nonmagnetic material and provided between the pole layer and the shield layer, wherein:
in the medium facing surface, the end face of the shield layer is located forward of the end face of the pole layer along a direction of travel of the recording medium with a specific space created by a thickness of the gap layer;
the second portion has a front end face that couples the surface of the first portion farther from the substrate to the surface of the second portion farther from the substrate; and
the shield layer incorporates a portion that is sandwiched between the front end face and the medium facing surface and located closer to the substrate than the surface of the second portion farther from the substrate.

10. The magnetic head according to claim 8, wherein:
the end face of the pole layer located in the medium facing surface has a first region and a second region connected to the first region and located farther from the substrate than the first region;
the first region has a width that decreases as a distance from the substrate decreases;
the second region has a uniform width that defines the track width; and in the medium facing surface, the nonmagnetic metal layer exists on both sides of the second region, the sides being opposed to each other in a direction of track width.

11. The magnetic head according to claim 8, wherein each of a difference in level between the surface of the first portion closer to the substrate and the surface of the second portion closer to the substrate and a difference in level between the surface of the first portion farther from the substrate and the surface of the second portion farther from the substrate is smaller than the thickness of the first portion.

12. The magnetic head according to claim 8, wherein: the thickness of the first portion falls within a range of 0.10 to 0.30 μm inclusive; a difference in level between the surface of the first portion closer to the substrate and the surface of the second portion closer to the substrate falls within a range of 0.05 to 0.30 μm inclusive; and a difference in level between the surface of the first portion farther from the substrate and the surface of the second portion farther from the substrate falls within a range of 0.05 to 0.30 μm inclusive.

13. The magnetic head according to claim 1 wherein:
the encasing layer includes a first layer and a second layer disposed on the first layer;
the encasing section further incorporates a bottom forming layer selectively disposed on a region of the first layer that faces toward the surface of the first portion of the pole layer closer to the substrate;
a portion of a bottom of the encasing groove is formed of a top surface of the bottom forming layer, the portion facing toward the surface of the first portion of the pole layer closer to the substrate; and
another portion of the bottom of the encasing groove is formed in the first layer, the portion facing toward the surface of the second portion of the pole layer closer to the substrate.

14. The magnetic head according to claim 1 wherein:
the encasing section further incorporates a bottom forming layer located below the encasing layer;
a portion of a bottom of the encasing groove is formed in the encasing layer, the portion facing toward the surface of the first portion of the pole layer closer to the substrate; and
another portion of the bottom of the encasing groove is formed of a top surface of the bottom forming layer, the portion facing toward the surface of the second portion of the pole layer closer to the substrate.

15. A method of manufacturing a magnetic head for perpendicular magnetic recording, the magnetic head comprising:
a medium facing surface that faces toward a recording medium;
a coil for generating a magnetic field corresponding to data to be written on the recording medium;
a pole layer having an end face located in the medium facing surface, allowing a magnetic flux corresponding to the field generated by the coil to pass therethrough, and generating a write magnetic field for writing the data on the recording medium through the use of a perpendicular magnetic recording system;
an encasing section made of a nonmagnetic material and having an encasing groove that opens in a top surface thereof and that accommodates at least part of the pole layer; and
a substrate on which the encasing section, the pole layer and the coil are stacked, wherein:

the pole layer incorporates: a first portion having the end face located in the medium facing surface; and a second portion that is located farther from the medium facing surface than the first portion and has a thickness greater than a thickness of the first portion;

a surface of the first portion closer to the substrate is located farther from the substrate than a surface of the second portion closer to the substrate; and the end face of the pole layer located in the medium facing surface has a side located away from the substrate, this side defining a track width, the method comprising the steps of:

forming the encasing section;

forming the pole layer such that the at least part of the pole layer is placed in the encasing groove of the encasing section; and forming the coil.

16. The method according to claim 15, wherein: the first portion includes a portion having a width that is equal to the track width and that does not change in accordance with a distance from the medium facing surface; and a greatest width of the second portion is greater than the track width.

17. The method according to claim 15, wherein the surface of the first portion closer to the substrate is made parallel to a surface of the first portion farther from the substrate.

18. The method according to claim 15, wherein the end face of the pole layer located in the medium facing surface has a width that decreases as a distance from the substrate decreases.

19. The method according to claim 18, wherein:

the encasing section incorporates: an encasing layer that is made of a nonmagnetic material and defines geometries of a bottom and sidewalls of the encasing groove; and a nonmagnetic metal layer that is made of a nonmagnetic metal material, is disposed on the encasing layer, and defines a plane geometry of the encasing groove;

the end face of the pole layer located in the medium facing surface has a first region and a second region connected to the first region and located farther from the substrate than the first region;

the first region has a width that decreases as a distance from the substrate decreases;

the second region has a uniform width that defines the track width; and, in the step of forming the pole layer, the pole layer is formed such that, in the medium facing surface, the nonmagnetic metal layer exists on both sides of the second region, the sides being opposed to each other in a direction of track width.

20. The method according to claim 15, wherein a difference in level between the surface of the first portion closer to the substrate and the surface of the second portion closer to the substrate is smaller than the thickness of the first portion.

21. The method according to claim 15, wherein the thickness of the first portion falls within a range of 0.10 to 0.30 μm inclusive, and a difference in level between the surface of the first portion closer to the substrate and the surface of the second portion closer to the substrate falls within a range of 0.05 to 0.30 μm inclusive.

22. The method according to claim 15, wherein:

a surface of the first portion farther from the substrate is located closer to the substrate than a surface of the second portion farther from the substrate; and the step of forming the pole layer includes the steps of:

forming a magnetic layer to be the pole layer such that the encasing groove is filled with the magnetic layer; and etching a portion of the magnetic layer so that the magnetic layer is formed into the pole layer by forming the surface of the first portion farther from the substrate and the surface of the second portion farther from the substrate.

23. The method according to claim 22, wherein:

the magnetic head further comprises: a shield layer having an end face located in the medium facing surface and having a portion that is located away from the medium facing surface and coupled to the pole layer; and a gap layer made of a nonmagnetic material and provided between the pole layer and the shield layer;

in the medium facing surface, the end face of the shield layer is located forward of the end face of the pole layer along a direction of travel of the recording medium with a specific space created by a thickness of the gap layer;

the second portion has a front end face that couples the surface of the first portion farther from the substrate to the surface of the second portion farther from the substrate; and the shield layer incorporates a portion that is sandwiched between the front end face and the medium facing surface and located closer to the substrate than the surface of the second portion farther from the substrate, the method further comprising the steps of: forming the gap layer on the pole layer; and forming the shield layer on the gap layer.

24. The method according to claim 22, wherein:

the encasing section incorporates: an encasing layer that is made of a nonmagnetic material and defines geometries of a bottom and sidewalls of the encasing groove; and a nonmagnetic metal layer that is made of a nonmagnetic metal material, is disposed on the encasing layer, and defines a plane geometry of the encasing groove;

the end face of the pole layer located in the medium facing surface has a first region and a second region connected to the first region and located farther from the substrate than the first region;

the first region has a width that decreases as a distance from the substrate decreases;

the second region has a uniform width that defines the track width; and the pole layer is formed in the step of forming the pole layer such that, in the medium facing surface, the nonmagnetic metal layer exists on both sides of the second region, the sides being opposed to each other in a direction of track width.

25. The method according to claim 22, wherein each of a difference in level between the surface of the first portion closer to the substrate and the surface of the second portion closer to the substrate and a difference in level between the surface of the first portion farther from the substrate and the surface of the second portion farther from the substrate is smaller than the thickness of the first portion.

26. The method according to claim 22, wherein: the thickness of the first portion falls within a range of 0.10 to 0.30 μm inclusive; a difference in level between the surface of the first portion closer to the substrate and the surface of the second portion closer to the substrate falls within a range of 0.05 to 0.30 μm inclusive; and a difference in level between the surface of the first portion farther from the substrate and the surface of the second portion farther from the substrate falls within a range of 0.05 to 0.30 µm inclusive.

27. The method according to claim 15, the step of forming the encasing section including the steps of:
- forming a first nonmagnetic layer made of a nonmagnetic material;
- forming an etching stopper layer in a region on the first nonmagnetic layer, the region facing toward the surface of the first portion of the pole layer closer to the substrate, the etching stopper layer having a function of stopping etching performed later;
- forming a second nonmagnetic layer made of a nonmagnetic material on the etching stopper layer and the first nonmagnetic layer; and
- forming the encasing groove in the first and second nonmagnetic layers by etching respective portions of the first and second nonmagnetic layers, wherein:
- in the step of forming the encasing groove, a portion of the first nonmagnetic layer located below the etching stopper layer is not etched;
- a portion of a bottom of the encasing groove is formed of a top surface of the etching stopper layer, the portion facing toward the surface of the first portion of the pole layer closer to the substrate; and
- another portion of the bottom of the encasing groove is formed in the first layer, the portion facing toward the surface of the second portion of the pole layer closer to the substrate.

28. The method according to claim 15, the step of forming the encasing section including:
- the step of forming an etching stopper layer having a function of stopping etching performed later;
- the step of forming a nonmagnetic layer made of a nonmagnetic material on the etching stopper layer;
- the first etching step of forming a portion of the encasing groove in which the first portion of the pole layer is placed by etching a portion of the nonmagnetic layer; and
- the second etching step of forming a portion of the encasing groove in which the second portion of the pole layer is placed by etching a portion of the nonmagnetic layer after the first etching step, wherein:
- the first etching step is completed before a bottom of a groove formed in the nonmagnetic layer by etching reaches the etching stopper layer;
- the second etching step is performed until a bottom of a groove formed in the nonmagnetic layer by etching reaches the etching stopper layer;
- a portion of a bottom of the encasing groove is formed in the nonmagnetic layer, the portion facing toward the surface of the first portion of the pole layer closer to the substrate; and
- another portion of the bottom of the encasing groove is formed of a top surface of the etching stopper layer, the portion facing toward the surface of the second portion of the pole layer closer to the substrate.

29. The method according to claim 15, wherein the step of forming the encasing section includes:
- the step of forming a nonmagnetic layer made of a nonmagnetic material;
- the first etching step of forming a portion of the encasing groove in which the first portion of the pole layer is placed by etching a portion of the nonmagnetic layer; and
- the second etching step of forming a portion of the encasing groove in which the second portion of the pole layer is placed by etching a portion of the nonmagnetic layer after the first etching step.

* * * * *